United States Patent
Nakano

[19]

[11] Patent Number: 6,049,152
[45] Date of Patent: Apr. 11, 2000

[54] MOTOR/GENERATOR

[75] Inventor: Masaki Nakano, Kanagawa, Japan

[73] Assignee: Nissan Motor Co., Ltd., Yokohama, Japan

[21] Appl. No.: 09/275,785

[22] Filed: Mar. 25, 1999

[30] Foreign Application Priority Data

| Mar. 25, 1998 | [JP] | Japan | 10-077449 |
| Mar. 25, 1998 | [JP] | Japan | 10-077478 |
| Mar. 25, 1998 | [JP] | Japan | 10-077508 |
| Jun. 10, 1998 | [JP] | Japan | 10-162380 |

[51] Int. Cl.⁷ ................................................ H02K 16/00
[52] U.S. Cl. .......................... 310/114; 310/261; 310/266; 318/700
[58] Field of Search .................... 310/114, 112, 310/122, 156, 162, 266, 261, 68 R; 318/700, 730

[56] References Cited

U.S. PATENT DOCUMENTS

| 396,355 | 1/1889 | Dyer ........................................ 310/114 |
| 2,666,174 | 1/1954 | Pestarini .................................. 318/700 |
| 4,087,698 | 5/1978 | Myers ........................................ 307/84 |
| 4,407,132 | 10/1983 | Kawakatsu et al. ...................... 60/716 |
| 4,453,447 | 6/1984 | Shinneman ............................. 84/422.4 |
| 4,866,321 | 9/1989 | Blanchard et al. ..................... 310/112 |
| 5,184,040 | 2/1993 | Lim ........................................ 310/114 |
| 5,311,092 | 5/1994 | Fisher ..................................... 310/266 |
| 5,495,131 | 2/1996 | Goldie et al. ............................. 310/12 |
| 5,594,322 | 1/1997 | Rozman et al. .......................... 322/10 |
| 5,744,895 | 4/1998 | Seguchi et al. ......................... 310/266 |
| 5,783,894 | 7/1998 | Wither .................................... 310/266 |
| 5,793,136 | 8/1998 | Redzic ................................... 310/114 |

FOREIGN PATENT DOCUMENTS 8-340663  12/1996  Japan .

*Primary Examiner*—Nestor Ramirez
*Assistant Examiner*—Joseph Waks
*Attorney, Agent, or Firm*—Foley & Lardner

[57] ABSTRACT

Two rotors (3,4) and one stator (2) are arranged coaxially in a three layer construction. A coil unit comprising plural coils (6) arranged at equal angular intervals on a stator (2) is provided. The coil unit forms rotating magnetic fields of identical number to the magnetic pole number of the first rotor (3) according to a first alternating current, and forms rotating magnetic fields of identical number to the magnetic pole number of the second rotor (4) according to a second alternating current. Plural rotors (3, 4) are driven by a single coil unit by supplying a composite current of the first and second alternating currents to the coil unit.

12 Claims, 23 Drawing Sheets

RELATION AT t = 0

FIG. 9A  $B_1 = B_{m1} \cdot \sin(\omega_1 t - \theta)$

FIG. 9B  $B_c$

FIG. 9C  $B_2 = B_{m2} \cdot \sin(\omega_2 t + \alpha - \theta)$

RELATION AT t = 0

FIG. 11A $B_1 = B_{m1} \cdot \sin(2\omega_1 t - 2\theta)$

FIG. 11D $B_2 = B_{m2} \cdot \sin(\omega_2 t + \alpha - \theta)$

RELATION AT t = 0

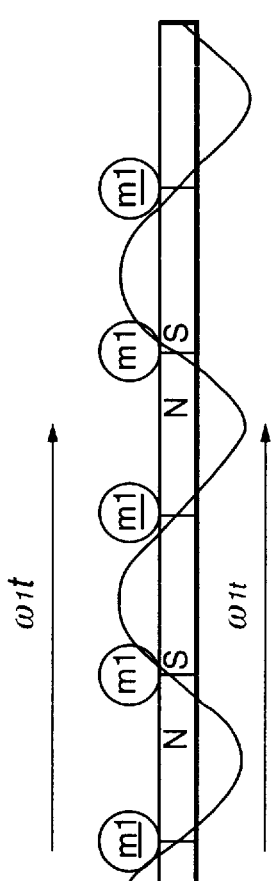
FIG. 15A  $B_1 = Bm_1 \cdot \sin(3\omega_1 t - 3\theta)$
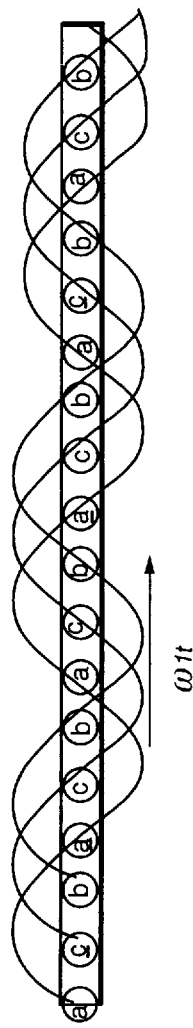
FIG. 15B  $Bc_1$
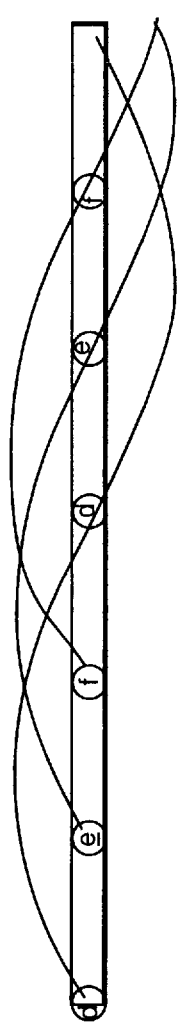
FIG. 15C  $Bc_2$
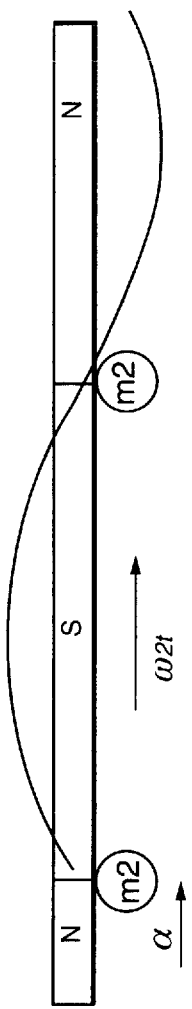
FIG. 15D  $B_2 = Bm_2 \cdot \sin(\omega_2 t + \alpha - \theta)$

STAGE A

STAGE B

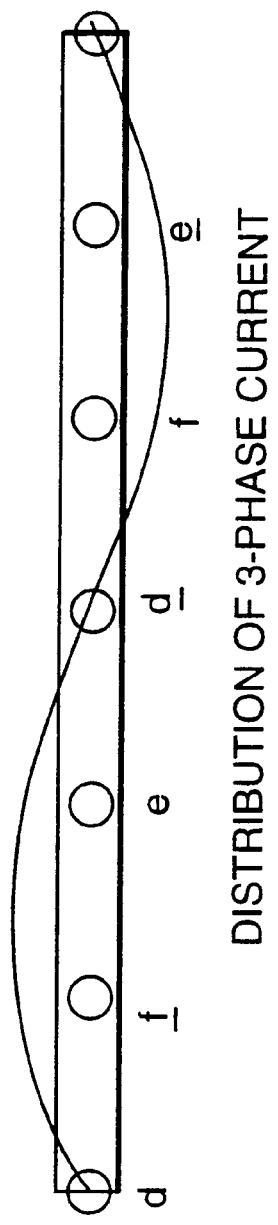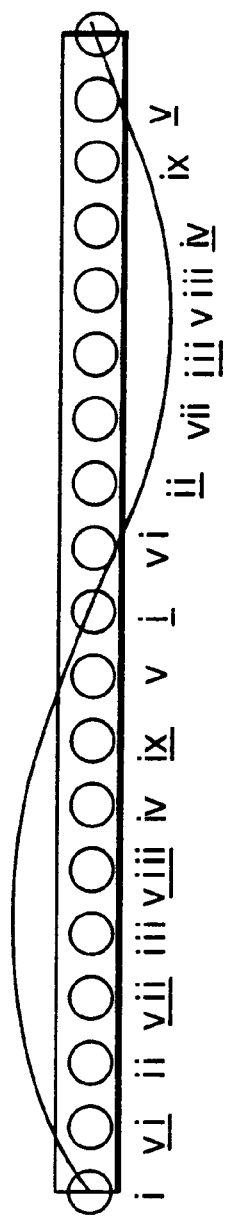
FIG. 18A  DISTRIBUTION OF 3-PHASE CURRENT
FIG. 18B  DISTRIBUTION OF 9-PHASE CURRENT

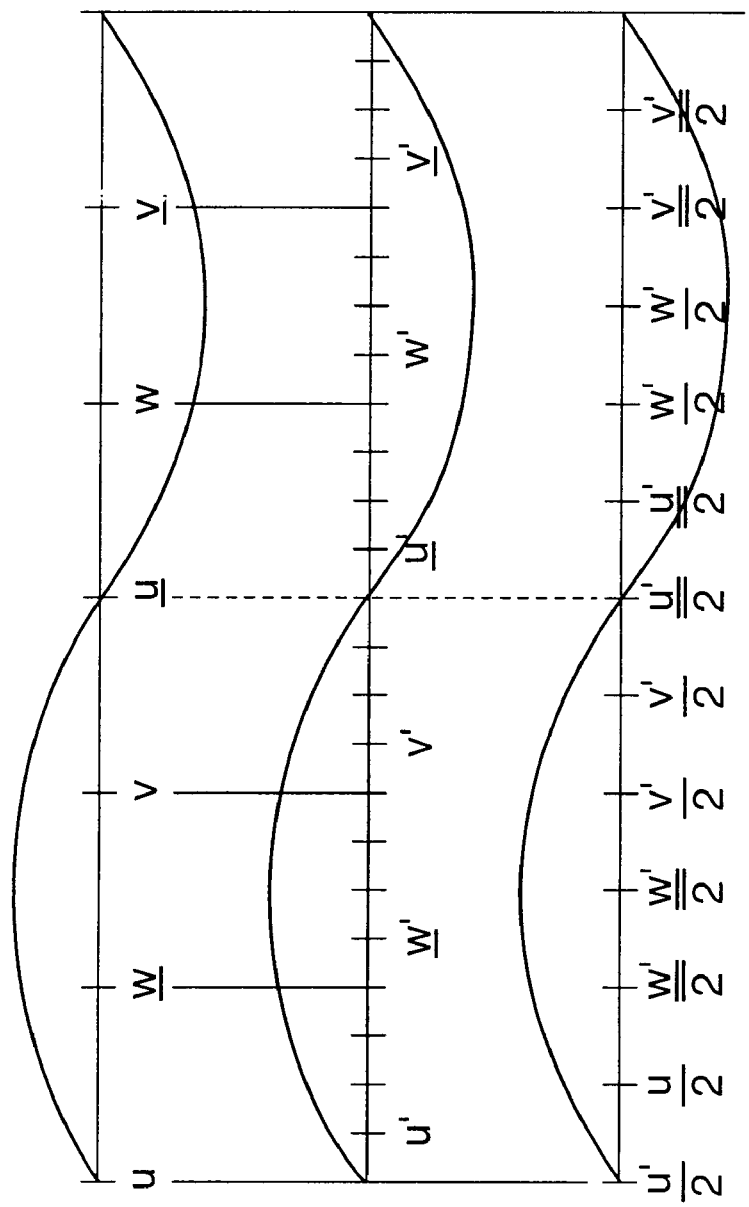

6,049,152

MOTOR/GENERATOR

FIELD OF THE INVENTION

This invention relates to the construction of a motor/generator.

BACKGROUND OF THE INVENTION

Tokkai Hei 8-340663 published by the Japanese Patent Office in 1996 discloses a motor/generator wherein two rotors and one stator are arranged coaixally in three layers. When one of the rotors is used as a motor, the other is used as a generator. In this motor/generator, two sets of coils are installed in the stator for providing a magnetic field for respective rotors, and two sets of inverters, i.e., current controllers, are provided, for controlling respective sets of coils.

SUMMARY OF THE INVENTION

However, in the case of this motor/generator, since two sets of coils and inverters are required, there is a problem in that the current losses such as copper loss and switching loss, is large.

It is therefore an object of this invention to reduce the current loss of such a three-layered motor/generator as described in the prior art.

In order to achieve the above object, this invention provides a motor/generator comprising a first rotor comprising plural magnetic poles and supported free to rotate, a second rotor comprising plural magnetic poles and supported free to rotate coaxially with the first rotor, a stator fixed co-axially with the first rotor, a coil unit comprising plural coils disposed at equal angular intervals on the stator, wherein the coil unit forms rotating magnetic fields of equal number to the number of magnetic poles of the first rotor according to a first alternating current provided thereto, and forms rotating magnetic fields of equal number to the number of magnetic poles of the second rotor according to a second alternating current provided thereto, and a controller functioning to supply a composite electrical current comprising the first alternating current and the second alternating current to the coil unit.

The details as well as other features and advantages of this invention are set forth in the remainder of the specification and are shown in the accompanying drawings.

BRIEF DESCRIPTION OF THE DRAWINGS

FIGS. 15A–15D are diagrams showing a flux density variation in the motor/generator of FIG. 14.

FIGS. 18A and diagram 18B are showing the distribution of alternating currents for driving the motor/generator of FIG. 17.

FIGS. 31A–31C are diagrams which describe possible current settings in the motor/generator of FIG. 27.

DESCRIPTION OF THE PREFERRED EMBODIMENTS

Figure 1:
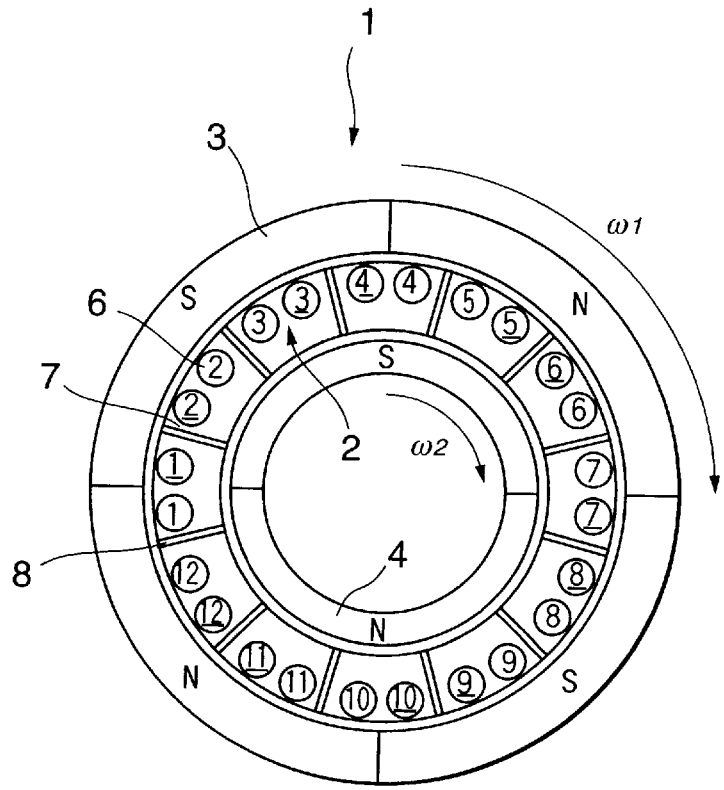
FIG. 1 is a schematic cross-sectional view of a motor/generator according to this invention.

Referring to FIG. 1 of the drawings, the motor/generator 1 according to this invention has a three layer structure wherein rotors 3, 4 are arranged coaxially with a stator 2. The rotor 3 is arranged with a predetermined clearance outside the stator 2 and is hereinafter referred to as outer rotor 3. The rotor 4 is arranged with a predetermined clearance inside the stator 2 and is hereinafter referred to as inner rotor 4.

Figure 3:
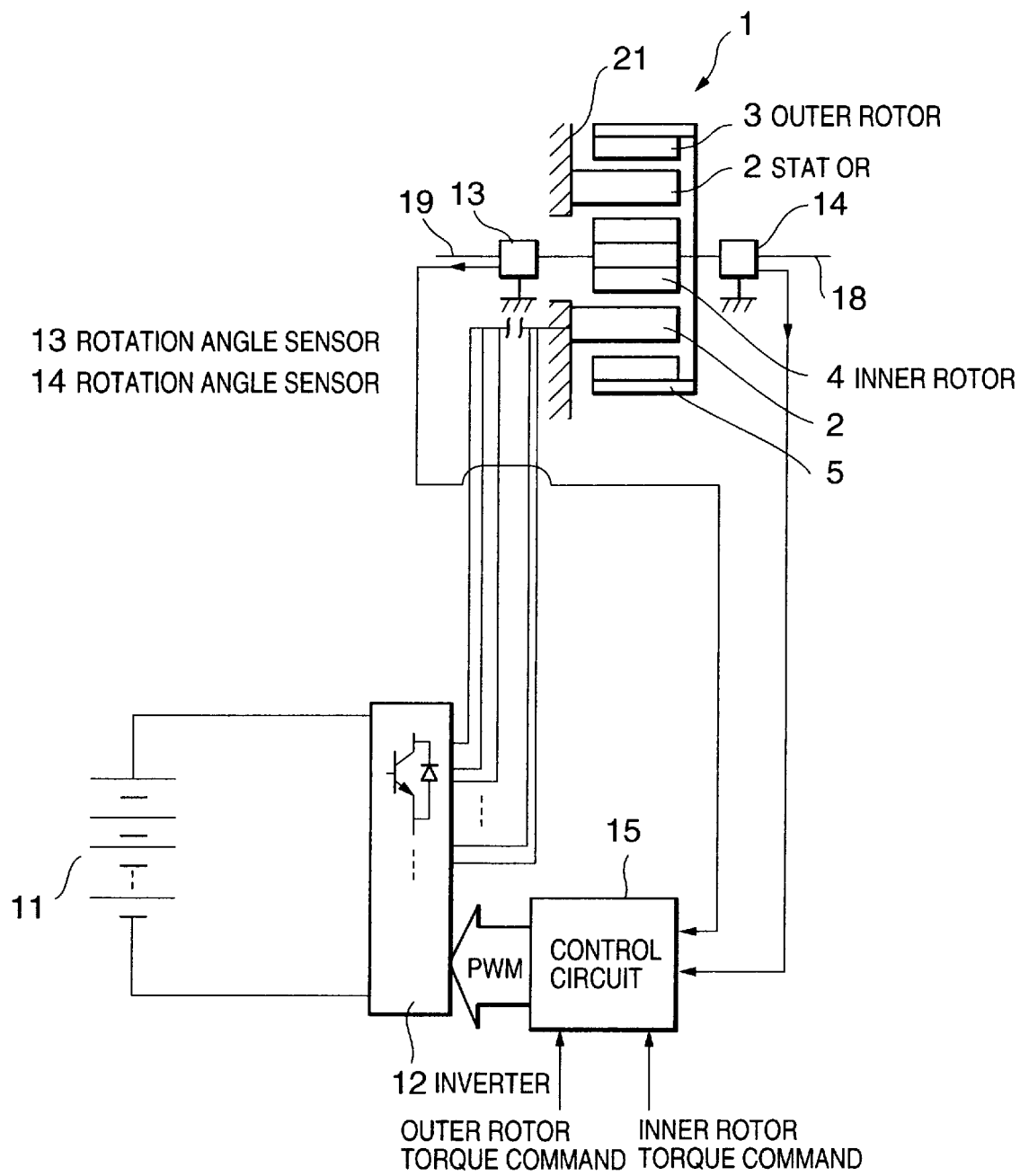
FIG. 3 is a schematic diagram of a control circuit according to this invention.

The stator 2 is fixed to a casing 21 of the motor/generator 1 as shown in FIG. 3. The outer rotor 3 is fixed to a frame 5, and the frame 5 rotates relative to the casing 21 via a shaft 18. The inner rotor 4 rotates relative to the casing 21 via a shaft 19.

As shown in FIG. 1, the inner rotor 4 comprises a pair of permanent magnets, i.e., an S pole which forms a semicircle and an N pole which forms a complementary semicircle.

The outer rotor 3 comprises permanent magnets having twice the number of poles as the rotor 4, and is provided with two S poles and two N poles which are arranged alternately at an angle of 90 degrees.

According to this arrangement, due to the following reason, the permanent magnets of the outer rotor 3 do not exert a rotational torque on the permanent magnets of the inner rotor 4, nor vice-versa.

Suppose that, in the state shown in FIG. 1, the S pole of the inner rotor 4 exerts a rotational torque in a clockwise direction on the N pole and the S pole in the upper part of the outer rotor 3 in the drawing. The permanent magnet N pole and S pole in the lower part of the rotor 3 tend to rotate counterclockwise due to the magnetic force of the N pole of the inner rotor. For this reason, the rotational torque which acts on the N pole and S pole in the upper part of the drawing is offset by the rotational torque acting on the N pole and S pole in the lower part of the drawing, hence a rotational torque does not act operate between the outer rotor 3 and inner rotor 4. That is, the outer rotor 3 and inner rotor both rotate only due to the magnetic force received from the stator 2.

The stator 2 comprises twelve coils 6 wound around cores 7. This number is three times the number of permanent magnets of the outer rotor 3.

The cores 7 are delimited by gaps 8 of a predetermined width formed in the stator 2.

For the sake of convenience, the numbers shown in FIG. 1 are assigned to these twelve coils 6. To distinguish them from part numbers, the symbol # is attached before a number as in the coil #6 to indicate a coil number.

Currents $I_1$–$I_{12}$ are passed into these twelve coils #1–#12.

First, a three phase alternating current is passed into three sets of coils to generate a rotational magnetic field relative to the inner rotor 4. Specifically, a current is passed through the coils #1, #2, #7 and #8 so as to form a virtual coil around a virtual axis which intersects perpendicularly with the rotating axis of the rotor 3 (4). For this purpose, a current Id is passed through the coils #1 and #2 in the reverse direction to the coils #7 and #8 which are situated on the opposite side of the rotation axis of the rotor 3 (4) as center. This is done by directing half a current Id through the coil #7 from the coil #1 and directing the other half of the current Id to the coil #8 from the coil #2. As the coils #1 and #2 are adjacent to each other and the coils #7 and #8 are also adjacent to each other, due to this current supply, the same situation occurs as when the current Id flows through the virtual coil mentioned above, and consequently, an N and a S pole are formed at the two ends of a virtual axis.

Similarly, the coils #3, #4, #9, #10 form one set, and a current Ie flows through these coils as if they formed one virtual coil around another virtual axis rotated by 120 degrees from the aforesaid virtual axis.

Further, the remaining coils #5, #6, #11, #12 form one virtual coil around another virtual axis rotated by 120 degrees, and a current if flows through these coils.

Hence, three virtual coils are formed with winding axes which differ by 120 degrees, and an N pole and S pole region are formed every 180 degrees as in the case of the inner rotor 3. A three-phase alternating current is supplied to these sets of coils, and the resultant virtual coil progressively varies its polarity according to the phase of the current. As a result, two pole rotating magnetic fields are formed enclosing the inner rotor.

In this embodiment, the flow of the current is represented in the form

[#1,#2]=[#7,#8], [#3,#4]=[#9,#10], [#5,#6]=[#11,#12].

A coil with an underlined number means that a current is passed in the reverse direction of a coil with a number which is not underlined.

Next, a three-phase current is passed into three sets of coils by the following combination so as to generate a magnetic field relative to the outer rotor 3.

[1]=[4]=[7]=[10], [2]=[5]=[8]=[11], [3]=[6]=[9]=[12]

In other words, a current Ia is passed to coil #4 from coil #1, and a current Ia is made to flow to coil #10 from coil #7. Considering a line connecting an intermediate point between coil #1 and #4 and an intermediate point between coil #7 and #10 in FIG. 1 as a virtual axis, a virtual coil is formed comprising coil #1 and #4 and a virtual coil is formed comprising coil #7 and #10 around the axis due to the current Ia.

As the flow of current of these virtual coils is in opposite directions, an N pole is formed for example at the two ends of the virtual axis and an S pole is formed near the rotation axis of the rotor 3 (4) in the two sets of virtual coils. Considering this on the periphery relative to the outer rotor 3, it is equivalent to forming N poles and S poles alternately at 90 degrees intervals.

Similarly, for coils #2, #5, #8 and #10, a current Ib is passed. Similarly, for coils #3, #6, #11 and #12, a current Ic is passed. Due to this, four-pole rotating magnetic fields are formed relative to the outer rotor 3.

To satisfy the above conditions, the following currents $I_1$–$I_{12}$ should be passed through the twelve coils 6.

$$I_1 = \frac{1}{2} \cdot Id + Ia$$

$$I_2 = \frac{1}{2} \cdot Id + Ic$$

$$I_3 = \frac{1}{2} \cdot If + Ib$$

$$I_4 = \frac{1}{2} \cdot If + Ia$$

$$I_5 = \frac{1}{2} \cdot Ie + Ic$$

$$I_6 = \frac{1}{2} \cdot Ie + Ib$$

$$I_7 = \frac{1}{2} \cdot Id + Ia$$

$$I_8 = \frac{1}{2} \cdot Id + Ic$$

-continued $$I_9 = \frac{1}{2} \cdot If + Ib$$

$$I_{10} = \frac{1}{2} \cdot If + Ia$$

$$I_{11} = \frac{1}{2} \cdot Ie + Ic$$

$$I_{12} = \frac{1}{2} \cdot Ie + Ib$$

A current in the reverse direction is shown by underlining added to the current symbol.

Figure 2:
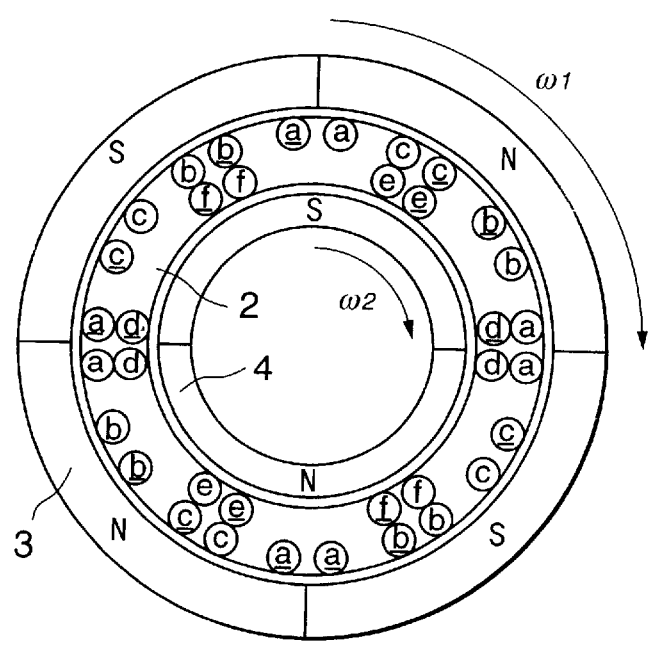
FIG. 2 is a schematic cross-sectional view of a motor/generator in which coils are arranged on the inner circumference and outer circumference of a stator for the purpose of describing a composite current supplied to a motor/generator according to this invention.

Next, referring to FIG. 2, the determination of the currents will be described. FIG. 2 is provided for the purpose of comparison with the motor/generator in FIG. 1. In the motor/generator in FIG. 2, specific coils d, f, e are provided for rotating the inner rotor 4 and specific coils a, c, b are provided for rotating the outer rotor 3.

In other words inner coil d, f, e form rotating magnetic fields relative to the inner rotor 4 and outer coil a, c, b form rotating magnetic fields relative to the outer rotor 3.

To combine these two groups of coils into the one group shown in FIG. 1, of the inner coils in FIG. 2, half of the current passed into the coil d is taken up by each of the coils a and c which are in the vicinity of the coil d, half of the current passed into the coil f is taken up by each of the coils a and c which are in the vicinity of the coil f, and half of the current passed into the coil e is taken up by each of the coils c and b which are in the vicinity of the coil e. The equations for the currents $I_1$–$I_{12}$ mentioned above are mathematical expressions of this concept. However, the currents may be set by other methods described hereafter.

When this current setting is applied, two rotating magnetic fields can be formed simultaneously, i.e., rotating magnetic fields relative to the inner rotor 4 and rotating magnetic fields relative to the outer rotor 3, despite the use of one set of coils. Also, the rotating magnetic fields which the stator 2 forms relative to the outer rotor 3 do not give a rotational torque to the permanent magnets of the inner rotor 4, and the rotating magnetic fields which the stator 2 forms relative to the inner rotor 4 do not give a rotational torque to the permanent magnets of the outer rotor 3. This point is verified by theoretical analysis described later.

The frequency of the currents Id, If, Ie is set based on a target rotation speed of the inner rotor 4 and that of the currents Ia, Ic, Ib is set based on a target rotation speed of the outer rotor 3.

Control of the motor/generator 1 is performed by a controller shown in FIG. 3.

Figure 4:
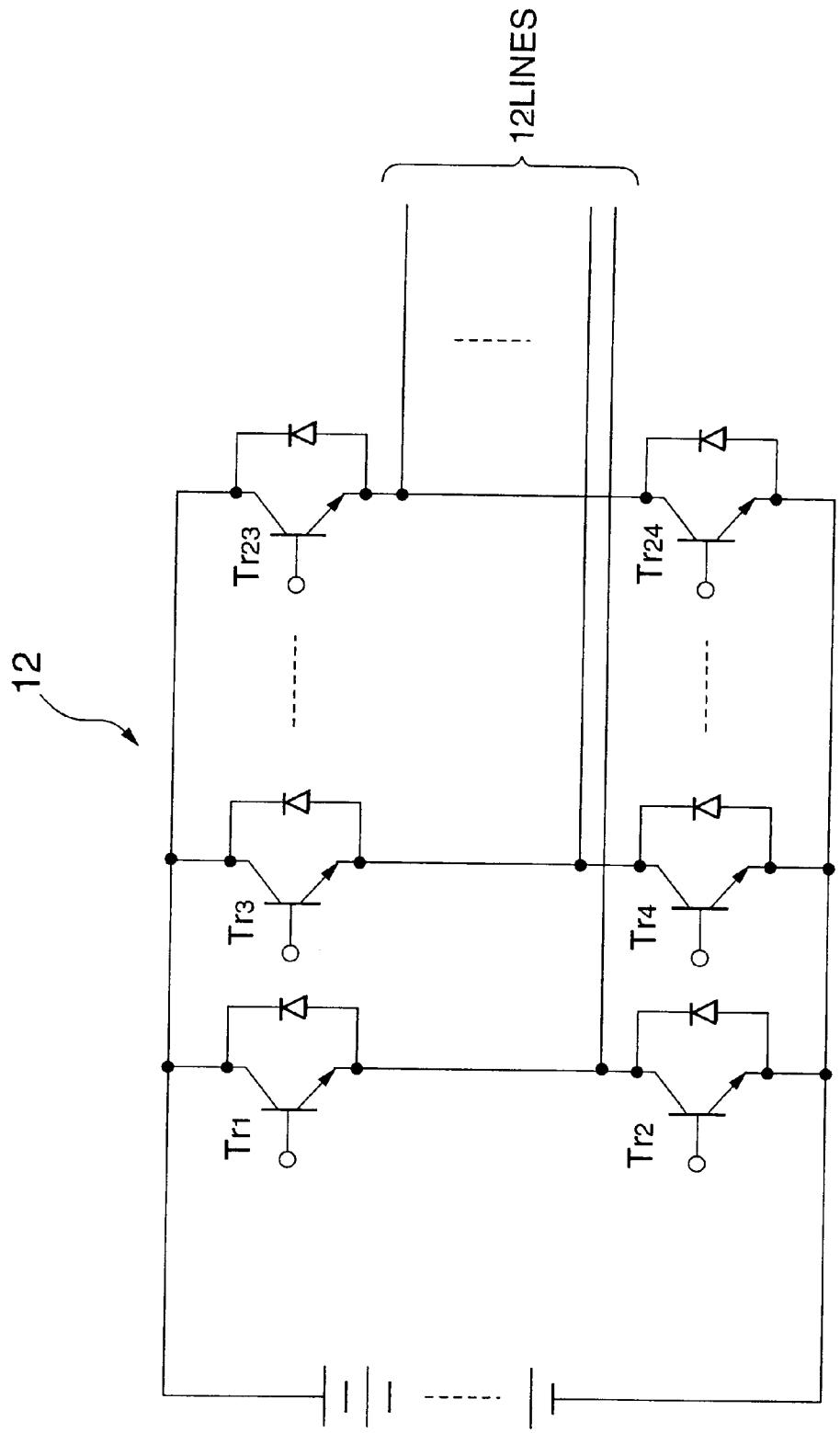
FIG. 4 is a circuit diagram of an inverter according to this invention.

The controller comprises an inverter 12 to convert the direct current of a battery power source 11 into alternating currents in order to supply the stator 2 with the currents $I_1$–$I_{12}$. This inverter 12 is a twelve-phase inverter comprising twenty four transistors $Tr_1$–$Tr_{24}$ and the same number of diodes as shown in FIG. 4. This inverter 12 may be obtained by modifying an ordinary three-phase inverter to have twelve phases.

An ON/OFF signal supplied to each gate of the inverter 12, i.e., base of the transistors, is a pulse width modulation (PWM) signal.

Rotation angle sensors 14 and 13 to detect the phase of the rotors 3 and 4 are installed, and signals from these sensors 13 and 14 are input into a control circuit 15.

The PWM signal is generated in the control circuit 15 based on positive or negative torque command values input to the control circuit 15 specifying the desired torque to be exerted on the outer rotor 3 and inner rotor 4.

In this way, in this motor/generator, two rotors 3 and 4 and one stator 2 are arranged coaxially in three layers, a series of coils 6 is provided in the stator 2, and currents are passed to these coils 6 so as to generate rotating magnetic fields inside and outside which are equal in number to the number of magnetic poles of the rotors 3 and 4.

Therefore, when one of the rotors 3 and 4 is driven as a motor and the other is driven as a generator, a current differential between the motor drive force and the generator drive force may passed into the coils 6. It is not necessary to provide specific coils for the rotors 3 and 4 separately as in the aforesaid prior art. Hence, current losses are largely reduced.

Further, as the rotation of two rotors 3 and 4 can be controlled by a single inverter 12, the cost of the inverter can be reduced, and as the power switching transistor capacitance of the inverter is reduced, switching efficiency improves.

Figure 5:
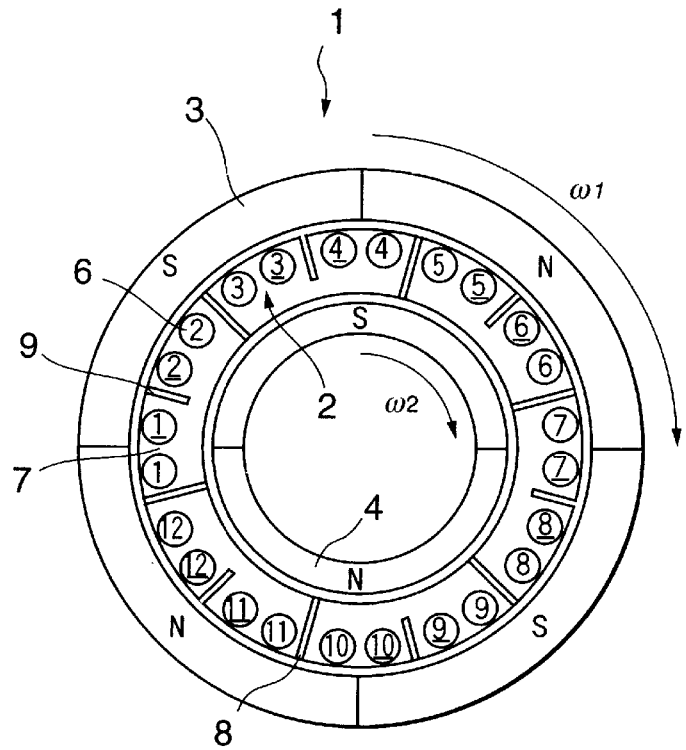
FIG. 5 is similar to FIG. 1, but showing a second embodiment of this invention.

Next, a second embodiment of the invention will be described referring to FIG. 5.

In FIG. 1, there were twelve cores, i.e., the same number as the number of the coils 6, but in this embodiment, two of the coils 6 are wound on one core 7. However, a slit 9 is provided in the central part of the core 7 in order to avoid interference between the magnetic flux generated by the two adjacent coils 6.

By forming the stator 2 in this way, the total number of cores 7 is half that of the cores 7 of the aforesaid first embodiment, so the number of production steps of a motor/generator decreases.

Figure 6:
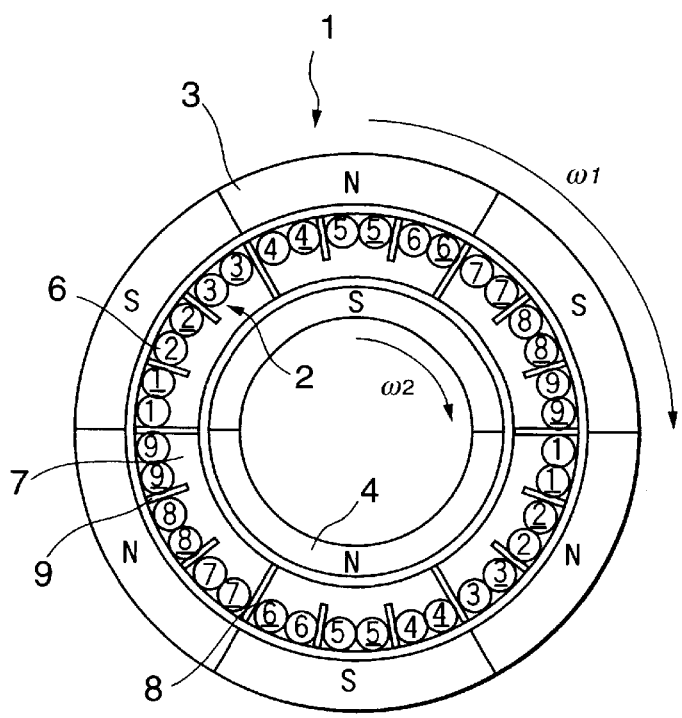
FIG. 6 is similar to FIG. 1, but showing a third embodiment of this invention.

Next, a third embodiment of the invention will be described referring to FIG. 6.

In the aforesaid first and second embodiments, the ratio of the number of magnetic poles in the outer rotor 3 and inner rotor 4 was 2:1, but in this embodiment, the magnetic pole number ratio is 3:1. In other words six magnetic poles are provided for the outer rotor 3, and S and N poles alternate every 60 degrees.

When the magnetic pole number ratio is 3:1, the permanent magnets of the outer rotor 3 are unaffected by the rotation torque from the rotating magnetic fields which the stator 2 forms relative to the inner rotor 4, but the permanent magnets of the inner rotor 4 are, unlike the case where the magnetic pole number ratio is 2:1, affected by the rotating magnetic fields which the stator 2 forms relative to the outer rotor 3, so the torque acting on the inner rotor 4 fluctuates as it rotates. This fluctuation of torque is a function of the phase difference ($\omega_1$–$\omega_2$) of the outer rotor 3 and inner rotor 4 as explained later.

Therefore, this torque fluctuation can be canceled by previously applying an amplitude modulation to the alternating currents which generate the rotating magnetic fields relative to the outer rotor 3 so as to cancel the torque fluctuation.

Therefore even in this embodiment where the magnetic pole number ratio is 3:1, the same effect can basically be obtained as when the magnetic pole number ratio is 2:1.

The construction where three coils are assigned with respect to one magnetic pole of the outer rotor 3 is identical to that of the aforesaid first and second embodiments. In this case, there will be eighteen of the coils 6 in the stator 2. To reduce the total number of the cores 7, the slits 9 are formed at positions where they divide each of the cores 7 into three parts in a circumferential direction. In this way, a number of the cores 7 equal to one third of the total number of the coils 6 are arranged across predetermined gaps 8 at equidistant intervals on the circumference.

The following currents $I_1$–$I_{18}$ are passed through these eighteen coils 6.

$$I_1 = Ia + Id \quad I_{10} = \underline{Ia} + \underline{Id}(=I_1)$$
$$I_2 = Ic \quad I_{11} = \underline{Ic}(=I_2)$$
$$I_3 = Ib \quad I_{12} = \underline{Ib}(=I_3)$$
$$I_4 = \underline{Ia} + \underline{If} \quad I_{13} = \underline{Ia} + If(=I_4)$$
$$I_5 = Ic \quad I_{14} = \underline{Ic}(=I_5)$$
$$I_6 = Ib \quad I_{15} = Ib(=I_6)$$
$$I_7 = Ia + Ie \quad I_{16} = \underline{Ia} + \underline{Ie}(=I_7)$$
$$I_8 = \underline{Ic} \quad I_{17} = Ic(=I_8)$$
$$I_9 = Ib \quad I_{18} = \underline{Ib}(=I_9)$$

Herein, current numbers with underlining show currents in the reverse direction. The currents Ia–If corresponds to the currents passed to the coils a–f in FIG. 14.

In the above equations, $I_{10}$–$I_{18}$ are the reverse of $I_1$–$I_9$. Hence, where the magnetic pole number ratio is 3:1, the phase is reversed over half the circumference.

Despite the fact that an eighteen-phase current is required, as the current phase is reversed every 180 degrees, an inverter which generates a nine-phase alternating current can be used to generate the above specified currents $I_1$–$I_{18}$. The inverter can therefore be constructed from eighteen transistors and eighteen diodes, the number of transistors and diodes can be reduced in comparison to the aforesaid first and second embodiments.

Figure 7:
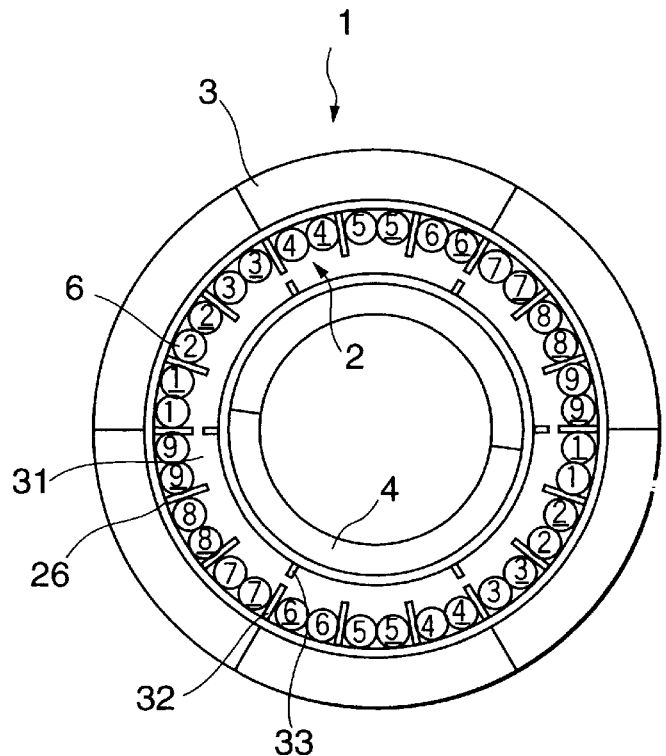
FIG. 7 is similar to FIG. 1, but showing a fourth embodiment of this invention.

Next, a fourth embodiment of this invention will be described referring to FIG. 7.

In this embodiment, the number of manufacturing steps of the motor/generator is further reduced compared to the third embodiment by winding the coils 6 on a single core 31.

No gap 8 is provided in this embodiment, but wide slits 32, 33 are formed instead at every three of the coils 6 in the core 31, and the magnetic resistance is thereby increased.

Although the magnetic pole number ratio was 2:1 in the first and second embodiments, and 3:1 in the third and fourth embodiments, other magnetic pole number ratio settings are possible. It will be appreciated from the following theoretical analysis that the outer rotor 3 and inner rotor 4 can be driven using a series of coils 6 whatever the magnetic pole number ratio may be.

Next, the theoretical analysis of the driving forces acting on the rotors will be performed with respect to the magnetic pole number ratios.

(1) N(2p-2p) type

First, describing the notation N(2p-2p), 2p on the left represents the number of magnetic poles of the permanent magnets of the outer rotor 3, and 2p on the right represents the number of magnetic poles of the permanent magnets of the inner rotor 4. Accordingly, the magnetic pole number ratio N(2p-2p) means a motor/generator wherein the magnetic polymer ratio of the outer rotor 3 and inner rotor 4 is 1:1.

N is a positive integer. If N is 1, the magnetic pole number of both the outer rotor 3 and inner rotor 4 is two, and if N is 2, the magnetic pole number of both the outer rotor 3 and inner rotor 4 is four.

Figure 8:
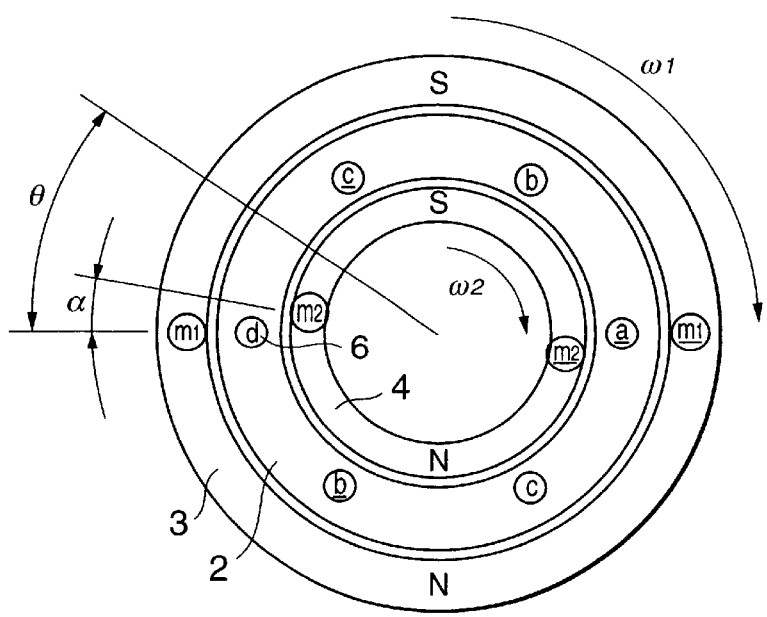
FIG. 8 is a schematic cross-sectional view of a motor/generator used as a model for theoretically analyzing the principle of this invention.

FIG. 8 shows the case of a motor/generator wherein N is 1.

(1-1) Basic Formulae

In FIG. 8, if the permanent magnets of the outer rotor 3 (hereafter abbreviated as outer magnets) $m_1$ and the permanent magnets of the inner rotor 4 (hereafter abbreviated as inner magnets) $m_2$ are replaced by equivalent coils, the magnetic flux densities $B_1$, $B_2$ of the permanent magnets may be represented by the following equations (1) and (2).

$$B_1 = Bm_1 \cdot \sin(\omega_1 \cdot t - \theta) = \mu \cdot Im_1 \cdot \sin(\omega_1 \cdot t - \theta) \tag{1}$$

$$B_2 = Bm_2 \cdot \sin(\omega_2 \cdot t\alpha - \theta) = \mu \cdot Im_2 \cdot \sin(\omega_2 \cdot t + \alpha - \theta) \tag{2}$$

where, $Bm_1$, $Bm_2$ = magnetic flux amplitudes, $\mu$ = magnetic permeability, $Im_1$ = equivalent direct current of outer magnets, $Im_2$ = equivalent direct current of inner magnets, $\omega_1$ = rotational angular velocity of outer magnets, $\omega_2$ = rotational angular velocity of inner magnets, $\alpha$ = phase difference of outer and inner magnets (when t=0), and t = elapsed time from time when phase of outer magnets and stator coil coincided.

If the current passed through the stator is a three-phase alternating current, the magnetic flux density Bc due to the stator coil is expressed by the following equation (3).

$$Bc = \mu \cdot n \cdot \left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\} \tag{3}$$

where, n = coil constant.

In equation (3), Ica(t), Icb(t), Icc(t) are currents which are different in phase by 120 degrees.

Figure 9:
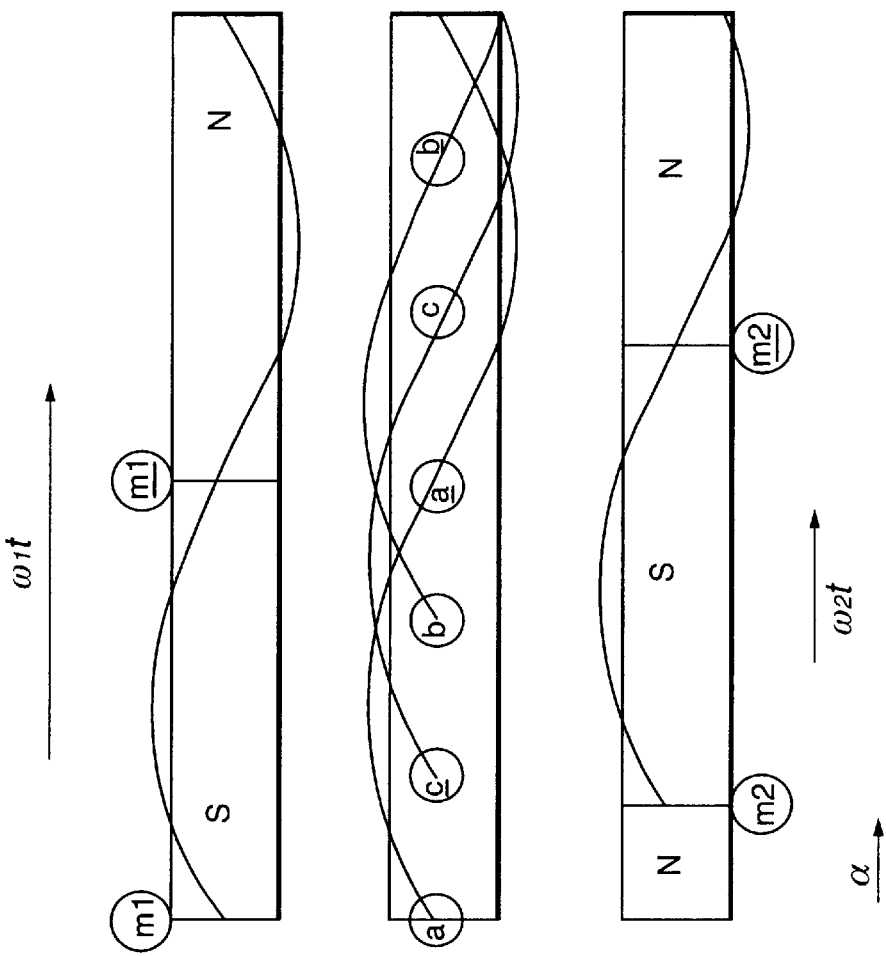
FIGS. 9A–9C are diagrams showing a variation of the flux density in the motor/generator of FIG. 8.

The variation of the aforesaid magnetic flux densities $B_1$, $B_2$ and Bc is shown in FIGS. 9A–9C. The magnetic flux density changes as a sine-wave, and a total magnetic flux density B at an angle __ is expressed by the following equation (4).

$$B = B_1 + B_2 + Bc \tag{4}$$
$$= \mu \cdot Im_1 \cdot \sin(\omega_1 \cdot t - \theta) + \mu \cdot Im_2 \cdot \sin(\omega_2 \cdot t + \alpha - \theta) + \mu \cdot n \cdot$$
$$\left\{ Ica(t) \cdot \sin\theta + Icb(t) \cdot \sin\left(\theta - \frac{2\pi}{3}\right) + Icc(t) \cdot \sin\left(\theta - \frac{4\pi}{3}\right) \right\}$$

Here, let the torque acting on the outer rotor 3 be $\tau_1$. If the force which acts on a semicircle of the outer rotor 3 is $f_1$, the force which then acts the other semicircle is also $f_1$. Accordingly, the force acting on the whole circumference is $2f_1$, and the torque $\tau_1$ may be expressed by the following equation.

$$\tau_1 = 2f_1 \cdot r_1$$

where, $r_1$ = distance to outer magnets from center shaft of outer rotor.

Here, the force $f_1$ is a drive force which occurs when a direct current $Im_1$ is generated in a magnetic field of magnetic flux density B. From the above equation, it is seen that there is a directly proportional relation between the torque $\tau_1$ and the drive force $f_1$. As an equivalent direct current is formed for each semicircle, $f_1$ is given by the following equation.

$$f_1 = Im_1 \cdot B$$

where, $\theta = \omega_1 \cdot t_o$.

From this equation and equation (4), $f_1$ may be expressed by the following equation (5).

$$f_1 = Im_1 \cdot \left[\left[\mu \cdot Im_2 \cdot \sin(\omega_2 \cdot t + \alpha - \omega_1 \cdot t) + \mu \cdot n \cdot \left\{Ica(t) \cdot \sin(\omega_1 \cdot t) + \right.\right.\right. \tag{5}$$
$$\left.\left.\left. Icb(t) \cdot \sin\left(\omega_1 \cdot t - \frac{2\pi}{3}\right) + Icc(t) \cdot \sin\left(\omega_1 \cdot t - \frac{4\pi}{3}\right)\right\}\right]\right]$$

Similarly, if the force acting on the semicircle of the inner rotor 4 is $f_2$, the force acting on the whole rotor is $2f_2$, so the torque $\tau_2$ acting on the inner magnets $m_2$ may be expressed by the following equation.

$$\tau_2 = 2f_2 \cdot r_2$$

where, $r_2$=distance from center axis of inner rotor 4 to the inner magnets $m_2$., Here, the force $f_2$ is the drive force due to an equivalent direct current $Im_2$ in a magnetic field of magnetic flux density B. As an equivalent direct current is formed for each semicircle, $f_2$ is given by the following equation.

$$f_2 = Im_2 \cdot B$$

where, $\theta = \omega_2 \cdot t + \alpha$.

From this equation and equation (4), $f_2$ may be expressed by the following equation (6)

$$f_2 = \tag{6}$$
$$Im_2 \cdot \left[\mu \cdot Im_1 \cdot \sin(\omega_1 \cdot t - \omega_2 \cdot t - \alpha) + \mu \cdot n \cdot \left\{Ica(t) \cdot \sin(\omega_2 \cdot t + \alpha) + \right.\right.$$
$$\left.\left. Icb(t) \cdot \sin\left(\omega_2 \cdot t + \alpha - \frac{2\pi}{3}\right) + Icc(t) \cdot \sin\left(\omega_2 \cdot t + \alpha - \frac{4\pi}{3}\right)\right\}\right]$$

(1-2) When External Rotating Magnetic Fields are Applied

In order to pass currents in the coils a, b, c each of which has a phase difference of $\beta$ with respect to the rotating outer magnets $m_1$, alternating currents Ica(t), Icb(t), Icc(t) in equation (3) are set by the following equations (7A)–(7C).

$$Ica(t) = Ic \cdot \cos(\omega_1 \cdot t - \beta) \tag{7A}$$

$$Icb(t) = Ic \cdot \cos\left(\omega_1 \cdot t - \beta - \frac{2\pi}{3}\right) \tag{7B}$$

$$Icc(t) = Ic \cdot \cos\left(\omega_1 \cdot t - \beta - \frac{4\pi}{3}\right) \tag{7C}$$

where,

Ic=amplitude of alternating currents, and $\beta$=phase difference.

The drive force $f_1$, $f_2$ is calculated by substituting equations (7A)–(7C) in equations (5)–(6).

$$f_1 = Im_1 \cdot \{\mu \cdot Im_2 \cdot \sin(\omega_2 \cdot t + \alpha - \omega_1 \cdot t)\} + \mu \cdot n \cdot Ic \cdot$$
$$\left\{\cos(\omega_1 \cdot t - \beta) \cdot \sin(\omega_1 \cdot t) + \cos\left(\omega_1 \cdot t - \beta - \frac{2\pi}{3}\right) \cdot \sin\left(\omega_1 \cdot t - \frac{2\pi}{3}\right) + \right.$$
$$\left. \cos\left(\omega_1 \cdot t - \beta - \frac{4\pi}{3}\right) \cdot \sin\left(\omega_1 \cdot t - \frac{4\pi}{3}\right)\right\}$$

Here, the above equation may be rewritten using the formula $$\cos (a+b) = \tfrac{1}{2} \{\sin (2a+b) - \sin (b)\}.$$

$$f_1 = Im_1 \cdot [\mu \cdot Im_2 \cdot \sin(\omega_2 \cdot t + \alpha - \omega_1 \cdot t) + \mu \cdot n \cdot Ic \cdot \tag{8}$$
$$\left[\frac{1}{2} \cdot \{\sin(2\omega_1 \cdot t - \beta) + \sin\beta\} + \frac{1}{2} \cdot \left[\sin\left\{2\left(\omega_1 \cdot t - \frac{2\pi}{3}\right) - \beta\right\} + \sin\beta\right] + \frac{1}{2} \cdot \left[\sin\left\{2\left(\omega_1 \cdot t - \frac{4\pi}{3}\right) - \beta\right\} + \sin\beta\right]\right]$$
$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot\right.$$
$$\left.\left[3\sin\beta + \sin\left\{2\left(\omega_1 \cdot t - \frac{2\pi}{3}\right) - \beta\right\} + \sin\left\{2\left(\omega_1 \cdot t - \frac{4\pi}{3} - \beta\right)\right\}\right]\right]$$
$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot\right.$$
$$\left.\left\{3\sin\beta + \sin\left(2\omega_1 \cdot t - \frac{4\pi}{3} - \beta\right) + \sin\left(2\omega_1 \cdot t - \frac{4\pi}{3}\right) - \beta\right\}\right]$$
$$= Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot\right.$$
$$\left.\left\{3\sin\beta + \sin\left(2\omega_1 \cdot t - \beta - \frac{2\pi}{3}\right) + \sin\left(2\omega_1 \cdot t - \beta - \frac{4\pi}{3}\right)\right\}\right]$$
$$= -Im_1 \cdot \left[\mu \cdot Im_2 \cdot \sin\{(\omega_2 - \omega_1) \cdot t - \alpha\} - \frac{3}{2} \cdot \mu \cdot n \cdot Ic \cdot \sin\beta\right]$$

Equation (8) has a form wherein the first terms which is a torque fluctuation amount due to the effect of the magnetic field of the inner magnets is added to the second term which is a constant torque.

Also, $f_2$ may be rewritten by the following equation.

$$f_2 = Im_2 \cdot B$$
$$= Im_2 \cdot [\mu \cdot Im_1 \cdot \sin(\omega_1 \cdot t - \omega_2 \cdot t - \alpha) + \mu \cdot n \cdot Ic \cdot \{\cos(\omega_1 \cdot t - \beta) \cdot$$
$$\sin(\omega_2 \cdot t + \alpha) + \cos\left(\omega_1 \cdot t - \frac{2\pi}{3} - \beta\right) \cdot \sin\left(\omega_2 \cdot t - \frac{2\pi}{3} + \alpha\right) +$$
$$\cos\left(\omega_1 \cdot t - \frac{4\pi}{3} - \beta\right) \cdot \sin\left(\omega_2 \cdot t - \frac{4\pi}{3} + \alpha\right)\}]$$

Here, the above equation may be rewritten using the formula $$\cos (a) \cdot \sin (b) = \tfrac{1}{2} \{\sin (a+b) - \sin (a-b)\}.$$

$$f_2 = Im_2 \cdot \left[\mu \cdot Im_1 \cdot \sin(\omega_1 \cdot t - \omega_2 \cdot t - \alpha) + \mu \cdot n \cdot Ic \cdot \frac{1}{2} \cdot \right. \tag{9}$$
$$\{\sin(\omega_1 \cdot t - \beta + \omega_2 \cdot t + \alpha) - \sin(\omega_1 \cdot t - \beta - \omega_2 \cdot t - \alpha) +$$
$$\sin\left(\omega_1 \cdot t - \frac{2\pi}{3} - \beta + \omega_2 \cdot t - \frac{2\pi}{3} + \alpha\right) -$$
$$\sin\left(\omega_1 \cdot t - \frac{2\pi}{3} - \beta - \omega_2 \cdot t + \frac{2\pi}{3} - \alpha\right) +$$
$$\sin\left(\omega_1 \cdot t - \frac{4\pi}{3} - \beta + \omega_2 \cdot t - \frac{4\pi}{3} + \alpha\right) -$$
$$\left.\sin\left(\omega_1 \cdot t - \frac{4\pi}{3} - \beta - \omega_2 \cdot t + \frac{4\pi}{3} - \alpha\right)\}\right]$$
$$= Im_2 \cdot [\mu \cdot Im_1 \cdot \sin(\omega_1 \cdot t - \omega_2 \cdot t - \alpha) + \mu \cdot n \cdot Ic \cdot$$
$$\frac{1}{2}[\sin\{(\omega_1 + \omega_2) \cdot t + \alpha - \beta\} - \sin\{(\omega_1 - \omega_2) \cdot t - \alpha - \beta\} +$$
$$\sin\left\{(\omega_1 - \omega_2) \cdot t - \frac{4\pi}{3} + \alpha - \beta\right\} - \sin\{(\omega_1 - \omega_2) \cdot$$

-continued $$t - \alpha + \beta\} + \sin\{(\omega_1 + \omega_2) \cdot t - \frac{8\pi}{3} + \alpha - \beta\} -$$

$$\sin\{(\omega_1 - \omega_2) \cdot t - \alpha - \beta\}]]$$

$$= Im_2 \cdot \left[\mu \cdot Im_1 \cdot \sin(\omega_1 \cdot t - \omega_2 \cdot t - \alpha) - \frac{3}{2} \cdot \mu \cdot n \cdot Ic \cdot \right.$$

$$\sin\{(\omega_1 - \omega_2) \cdot t - \alpha - \beta\} + \mu \cdot n \cdot Ic \cdot \frac{1}{2} \cdot$$

$$[\sin\{(\omega_1 + \omega_2) \cdot t + \alpha - \beta\} + \sin\{(\omega_1 + \omega_2) \cdot t +$$

$$\alpha - \beta - \frac{2\pi}{3}\} + \sin\{(\omega_1 + \omega_2) \cdot t + \alpha - \beta - \frac{4\pi}{3}\}]]$$

$$= \mu \cdot Im_2 \cdot \left[Im_1 \cdot \sin\{(\omega_1 - \omega_2) \cdot t - \alpha\} - \frac{3}{2} \cdot n \cdot Ic \cdot \right.$$

$$\sin\{(\omega_1 - \omega_2) \cdot t - \alpha - \beta\}]$$

(1-3) When Inner Rotating Magnetic Fields are Applied

In order to pass currents in the coils a, b, c each of which has a phase difference of $\gamma$ with respect to the rotating inner magnets $m_2$, alternating currents Ica(t), Icb(t), Icc(t) in the above equation (3) are set by the following equations (10A)–(10C).

$$Ica(t) = Ic \cdot \cos(\omega_2 \cdot t - \gamma) \quad (10A)$$

$$Icb(t) Ic \cdot \cos\left(\omega_2 \cdot t - \gamma - \frac{2\pi}{3}\right) \quad (10B)$$

$$Icc(t) Ic \cdot \cos\left(\omega_2 \cdot t - \gamma - \frac{4\pi}{3}\right) \quad (10C)$$

where,

Ic=amplitude of alternating currents, and $\gamma$=phase difference.

The drive force $f_1$, $f_2$ is calculated by substituting equations (10A)–(10C) in equations (5)–(6).

$$f_1 = Im_1 \cdot \left[\mu \cdot Im_2 \cdot \sin\left[\omega_2 \cdot t + \alpha - \omega_1 \cdot t + \right.\right.$$

$$\mu \cdot n \cdot Ic \cdot \left\{\cos(\omega_2 \cdot t - \gamma) \cdot \sin(\omega_1 \cdot t) + \cos\left(\omega_2 \cdot t - \gamma - \frac{2\pi}{3}\right) \cdot \right.$$

$$\left.\sin\left(\omega_1 \cdot t - \frac{2\pi}{3}\right) + \cos\left(\omega_2 \cdot t - \gamma - \frac{4\pi}{3}\right) \cdot \sin\left(\omega_1 \cdot t - \frac{4\pi}{3}\right)\right\}\right]$$

Here, the above equation may be rewritten using the formula $$\cos(a) \cdot \sin(b) = \frac{1}{2} \cdot \{\sin(a+b) - \sin(a-b)\}$$

$$f_1 = Im_1 \cdot \left[\mu \cdot Im_2 \cdot \sin(\omega_2 \cdot t + \alpha - \omega_1 \cdot t) + \frac{1}{2} \cdot \mu \cdot n \cdot Ic \cdot \right. \quad (11)$$

$$\{\sin(\omega_2 \cdot t - \gamma + \omega_1 \cdot t) - \sin(\omega_2 \cdot t - \gamma - \omega_1 \cdot t) +$$

$$\sin\left(\omega_2 \cdot t - \gamma - \frac{2\pi}{3} + \omega_1 \cdot t - \frac{2\pi}{3}\right) -$$

$$\sin\left(\omega_2 \cdot t - \gamma - \frac{2\pi}{3} - \omega_1 \cdot t + \frac{2\pi}{3}\right) +$$

$$\sin\left(\omega_2 \cdot t - \gamma - \frac{4\pi}{3} + \omega_1 \cdot t - \frac{4\pi}{3}\right) -$$

$$\sin\left(\omega_2 \cdot t - \gamma - \frac{4\pi}{3} - \omega_1 \cdot t + \frac{4\pi}{3}\right)\}]$$

-continued $$= Im_1 \cdot \left[\mu \cdot Im_2 \cdot \sin\{(\omega_2 - \omega_1) \cdot t + \alpha\} + \frac{1}{2} \cdot \mu \cdot n \cdot Ic \cdot \right.$$

$$[\sin\{(\omega_2 + \omega_1) \cdot t - \gamma\} - \sin\{(\omega_2 - \omega_1) \cdot t - \gamma\} +$$

$$\sin\left\{(\omega_2 + \omega_1) \cdot t - \gamma - \frac{4\pi}{3}\right\} - \sin\{(\omega_2 - \omega_1) \cdot t - \gamma\} +$$

$$\sin\left\{(\omega_2 + \omega_1) \cdot t - \gamma - \frac{8\pi}{3}\right\} - \sin\{(\omega_2 - \omega_1) \cdot t - \gamma\}]]$$

$$= Im_1 \cdot \left[\mu \cdot Im_2 \cdot \sin\{(\omega_2 - \omega_1) \cdot t + \alpha\} - \frac{3}{2} \cdot \mu \cdot n \cdot Ic \cdot \right.$$

$$\sin\{(\omega_2 - \omega_1) \cdot t - \gamma\} + \frac{1}{2} \cdot \mu \cdot n \cdot Ic \cdot [\sin\{(\omega_2 + \omega_1) \cdot$$

$$t - \gamma\} + \sin\left\{(\omega_2 + \omega_1) \cdot t - \gamma - \frac{2\pi}{3}\right\} +$$

$$\sin\left\{(\omega_2 + \omega_1) \cdot t - \gamma - \frac{4\pi}{3}\right\}]]$$

$$= -\mu \cdot Im_1 \cdot \left[Im_2 \cdot \sin\{(\omega_1 - \omega_2) \cdot t - \alpha\} - \frac{3}{2} \cdot n \cdot Ic \cdot \right.$$

$$\sin\{(\omega_1 - \omega_2) \cdot t + \gamma\}]$$

Equation (11) shows that a torque fluctuation occurs only in the outer magnets.

Also, $f_2$ may be rewritten by the following equation.

$$f_2 = Im_2 \cdot \left[\mu \cdot Im_1 \cdot \sin(\omega_2 \cdot t - \omega_1 \cdot t - \alpha) + \right.$$

$$\mu \cdot n \cdot Ic \cdot \left\{\cos(\omega_2 \cdot t - \gamma) \cdot \sin(\omega_2 \cdot t + \alpha) + \right.$$

$$\cos\left(\omega_2 \cdot t - \gamma - \frac{2\pi}{3}\right) \cdot \sin\left(\omega_2 \cdot t + \alpha - \frac{2\pi}{3}\right) +$$

$$\left.\cos\left(\omega_2 \cdot t - \gamma - \frac{4\pi}{3}\right) \cdot \sin\left(\omega_2 \cdot t + \alpha - \frac{4\pi}{3}\right)\right\}]$$

Here, the above equation may be rewritten using the formula $$\cos(a) \cdot \sin(b) = \frac{1}{2} \cdot \{\sin(a+b) - \sin(a-b)\}.$$

$$f_2 = Im_2 \cdot [\mu \cdot Im_1 \cdot \sin(\omega_1 \cdot t - \omega_2 \cdot t - \alpha) - \quad (12)$$

$$\frac{3}{2} \cdot \mu \cdot n \cdot Ic \cdot \sin(-\alpha - \gamma) +$$

$$\frac{1}{2} \cdot \mu \cdot n \cdot Ic \cdot \{\sin(2 \cdot \omega_2 \cdot t + \alpha - \gamma) \cdot$$

$$\sin\left(2 \cdot \omega_2 \cdot t + \alpha - \gamma - \frac{2\pi}{3}\right) +$$

$$\sin\left(2 \cdot \omega_2 \cdot t + \alpha - \gamma - \frac{4\pi}{3}\right)\}]$$

$$= \mu \cdot Im_2 \cdot [Im_1 \cdot \sin\{(\omega_1 - \omega_2) \cdot t - \alpha\} +$$

$$\frac{3}{2} \cdot n \cdot Ic \cdot \sin(\alpha + \gamma)]$$

Equation (12) has a form wherein the first term which is a torque fluctuation amount due to the effect of the magnetic field of the inner magnets is added to the second term which is a constant torque.

(1-4) When the Outer Rotating Magnetic Fields and Inner Rotating Magnetic Fields are Applied Together The above Ica(t), Icb(t), Icc(t) are set to pass a current through the coils 6 in synchronism with the outer magnets and inner magnets.

$$Ica(t) = Ic \cdot \cos(\omega_1 \cdot t - \beta) + Ic_2 \cdot \cos(\omega_2 \cdot t - \gamma) \quad (13A)$$

$$Icb(t) = Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right) \quad (13B)$$

$$Icb(t) = Ic \cdot \cos\left(\omega_1 \cdot t - \beta - \frac{4\pi}{3}\right) + Ic_2 \cdot \cos\left(\omega_2 \cdot t - \gamma - \frac{4\pi}{3}\right) \quad (13C)$$

The drive forces $f_1$, $f_2$ are calculated by the following equations (14), (15).

$$\begin{aligned}
f_1 &= Im_1 \cdot [\mu \cdot Im_2 \cdot \sin(\omega_2 \cdot t + \alpha - \omega_1 \cdot t) + \\
&\quad \mu \cdot n \cdot [\{Ic \cdot \cos(\omega_1 \cdot t - \beta) + \\
&\quad Ic_2 \cdot \cos(\omega_2 \cdot t - \gamma)\} \cdot \sin(\omega_1 \cdot t) + \\
&\quad \left\{Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right)\right\} \cdot \\
&\quad \sin\left(\omega_1 \cdot t - \frac{2\pi}{3}\right) + \left\{Ic \cdot \cos\left(\omega_1 \cdot t - \beta - \frac{4\pi}{3}\right) + \right. \\
&\quad \left. Ic_2 \cdot \cos\left(\omega_2 \cdot t - \gamma - \frac{4\pi}{3}\right)\right\} \cdot \sin\left(\omega_1 \cdot t - \frac{4\pi}{3}\right)]] \\
&= Im_1 \cdot [\mu \cdot Im_2 \cdot \sin(\omega_2 \cdot t + \alpha - \omega_1 \cdot t) + \\
&\quad \mu \cdot n \cdot \{Ic \cdot \cos(\omega_1 \cdot t - \beta) \cdot \sin(\omega_1 \cdot t) + \\
&\quad Ic_2 \cdot \cos(\omega_2 \cdot t - \gamma) \cdot \sin(\omega_1 \cdot t) + \\
&\quad Ic \cdot \cos\left(\omega_1 \cdot t - \beta - \frac{2\pi}{3}\right) \cdot \sin\left(\omega_1 \cdot t - \frac{2\pi}{3}\right) + \\
&\quad Ic_2 \cdot \cos\left(\omega_2 \cdot t - \gamma - \frac{2\pi}{3}\right) \cdot \sin\left(\omega_1 \cdot t - \frac{2\pi}{3}\right) + \\
&\quad Ic \cdot \cos\left(\omega_1 \cdot t - \beta - \frac{4\pi}{3}\right) \cdot \sin\left(\omega_1 \cdot t - \frac{4\pi}{3}\right) + \\
&\quad Ic_2 \cos\left(\omega_2 \cdot t - \gamma - \frac{4\pi}{3}\right) \cdot \sin\left(\omega_1 \cdot t - \frac{4\pi}{3}\right)\}] \\
&= Im_1 \cdot [\mu \cdot Im_2 \cdot \sin(\omega_2 \cdot t + \alpha - \omega_1 \cdot t) + \\
&\quad \mu \cdot n \cdot [Ic \cdot \{\cos(\omega_1 \cdot t - \beta) \cdot \sin(\omega_1 \cdot t) + \\
&\quad \cos\left(\omega_1 \cdot t - \beta - \frac{2\pi}{3}\right) \cdot \sin\left(\omega_1 \cdot t - \frac{2\pi}{3}\right) + \\
&\quad \cos\left(\omega_1 \cdot t - \beta - \frac{4\pi}{3}\right) \cdot \sin\left(\omega_1 \cdot t - \frac{4\pi}{3}\right)\} + \\
&\quad Ic_2 \cdot \{\cos(\omega_2 \cdot t - \gamma) \cdot \sin(\omega_1 \cdot t) + \\
&\quad \cos\left(\omega_2 \cdot t - \gamma - \frac{2\pi}{3}\right) \cdot \sin\left(\omega_1 \cdot t - \frac{2\pi}{3}\right) + \\
&\quad \cos\left(\omega_2 \cdot t - \gamma - \frac{4\pi}{3}\right) \cdot \sin\left(\omega_1 \cdot t - \frac{4\pi}{3}\right)\}]] \\
&= Im_1 \cdot [\mu \cdot Im_2 \cdot \sin(\omega_2 \cdot t + \alpha - \omega_1 \cdot t) + \\
&\quad \mu \cdot n \cdot \left[Ic \cdot \left(\frac{3}{2} \cdot \sin\beta\right) + Ic_2 \cdot \left[\frac{3}{2} \cdot \sin\{(\omega_1 - \omega_2)t + \gamma\}\right]\right]]
\end{aligned} \quad (14)$$

Equation (14) has a form wherein a torque fluctuation is added to a constant torque according to a rotation phase difference $\beta$ relative to the outer magnets $m_1$.

$$\begin{aligned}
f_2 &= Im_2 \cdot [\mu \cdot Im_1 \cdot \sin(\omega_1 \cdot t - \omega_2 \cdot t - \alpha) + \\
&\quad \mu \cdot n \cdot [\{Ic \cdot \cos(\omega_1 \cdot t - \beta) + \\
&\quad Ic_2 \cdot \cos(\omega_2 \cdot t - \gamma)\} \cdot \sin(\omega_2 \cdot t + \alpha) + \\
&\quad \left\{Ic \cdot \cos\left(\omega_1 \cdot t - \beta - \frac{2\pi}{3}\right) + Ic_2 \cdot \cos\left(\omega_2 \cdot t - \gamma - \frac{2\pi}{3}\right)\right\} \cdot \\
&\quad \sin\left(\omega_2 \cdot t + \alpha - \frac{2\pi}{3}\right) + \left\{Ic \cdot \cos\left(\omega_1 \cdot t - \beta - \frac{4\pi}{3}\right) + \right. \\
&\quad \left. Ic_2 \cdot \cos\left(\omega_2 \cdot t - \gamma - \frac{4\pi}{3}\right)\right\} \cdot \sin\left(\omega_2 \cdot t + \alpha - \frac{4\pi}{3}\right)]] \\
&= Im_2 \cdot [\mu \cdot Im_1 \cdot \sin(\omega_1 \cdot t - \omega_2 \cdot t - \alpha) + \\
&\quad \mu \cdot n \cdot \{Ic \cdot \cos(\omega_1 \cdot t - \beta) \cdot \sin(\omega_2 \cdot t + \alpha) + \\
&\quad Ic_2 \cdot \cos(\omega_2 \cdot t - \gamma) \cdot \sin(\omega_2 \cdot t + \alpha) + \\
&\quad Ic \cdot \cos\left(\omega_1 \cdot t - \beta - \frac{2\pi}{3}\right) \cdot \sin\left(\omega_2 \cdot t + \alpha - \frac{2\pi}{3}\right) + \\
&\quad Ic_2 \cdot \cos\left(\omega_2 \cdot t - \gamma - \frac{2\pi}{3}\right) \cdot \sin\left(\omega_2 \cdot t + \alpha - \frac{2\pi}{3}\right) + \\
&\quad Ic \cdot \cos\left(\omega_1 \cdot t - \beta - \frac{4\pi}{3}\right) \cdot \sin\left(\omega_2 \cdot t + \alpha - \frac{4\pi}{3}\right) + \\
&\quad Ic_2 \cdot \cos\left(\omega_2 \cdot t - \gamma - \frac{4\pi}{3}\right) \cdot \sin\left(\omega_2 \cdot t + \alpha - \frac{4\pi}{3}\right)\}] \\
&= Im_2 \cdot [\mu \cdot Im_1 \cdot \sin(\omega_1 \cdot t - \omega_2 \cdot t - \alpha) + \\
&\quad \mu \cdot n \cdot [Ic \cdot \{\cos(\omega_1 \cdot t - \beta) \cdot \sin(\omega_2 \cdot t \cdot \alpha) + \\
&\quad \cos\left(\omega_1 \cdot t - \beta - \frac{2\pi}{3}\right) \cdot \sin\left(\omega_2 \cdot t + \alpha - \frac{2\pi}{3}\right) + \\
&\quad \cos\left(\omega_1 \cdot t - \beta - \frac{4\pi}{3}\right) \cdot \sin\left(\omega_2 \cdot t + \alpha - \frac{4\pi}{3}\right)\} + \\
&\quad Ic_2 \cdot \{\cos(\omega_2 \cdot t - \gamma) \cdot \sin(\omega_2 \cdot t + \alpha) + \\
&\quad \cos\left(\omega_2 \cdot t - \gamma - \frac{2\pi}{3}\right) \cdot \sin\left(\omega_2 \cdot t + \alpha - \frac{2\pi}{3}\right) + \\
&\quad \cos\left(\omega_2 \cdot t - \gamma - \frac{4\pi}{3}\right) \cdot \sin\left(\omega_2 \cdot t + \alpha - \frac{4\pi}{3}\right)\}]]
\end{aligned}$$

Here, the above equation may be rewritten using the formula $$\cos(a) \cdot \sin(b) = \tfrac{1}{2} \cdot \{\sin(a+b) - \sin(a-b)\}$$

$$\begin{aligned}
f_2 &= Im_2 \cdot [\mu \cdot Im_1 \cdot \sin(\omega_1 \cdot t - \omega_2 \cdot t - \alpha) + \\
&\quad \mu \cdot n \cdot \left[Ic \cdot \left[\frac{1}{2} \cdot \{\sin(\omega_1 \cdot t - \beta + \omega_2 \cdot t + \alpha) - \right.\right. \\
&\quad \sin(\omega_1 \cdot t - \beta - \omega_2 \cdot t - \alpha)\} + \\
&\quad \frac{1}{2} \cdot \left\{\sin\left(\omega_1 \cdot t - \beta - \frac{2\pi}{3} + \omega_2 \cdot t + \alpha - \frac{2\pi}{3}\right) - \right. \\
&\quad \left. \sin\left(\omega_1 \cdot t - \beta - \frac{2\pi}{3} - \omega_2 \cdot t - \alpha + \frac{2\pi}{3}\right)\right\} + \\
&\quad \frac{1}{2} \cdot \left\{\sin\left(\omega_1 \cdot t - \beta - \frac{4\pi}{3} + \omega_2 \cdot t + \alpha - \frac{4\pi}{3}\right) - \right. \\
&\quad \left. \sin\left(\omega_1 \cdot t - \beta - \frac{4\pi}{3} - \omega_2 \cdot t - \alpha + \frac{4\pi}{3}\right)\right\}\bigg] + \\
&\quad Ic_2 \cdot \left[\frac{1}{2} \cdot \{\sin(\omega_2 \cdot t - \gamma + \omega_2 \cdot t + \alpha) - \right. \\
&\quad \sin(\omega_2 \cdot t - \gamma - \omega_2 \cdot t - \alpha)\} + \\
&\quad \frac{1}{2} \cdot \left\{\sin\left(\omega_2 \cdot t - \gamma - \frac{2\pi}{3} + \omega_2 \cdot t + \alpha - \frac{2\pi}{3}\right) - \right. \\
&\quad \left. \sin\left(\omega_2 \cdot t - \gamma - \frac{2\pi}{3} - \omega_2 \cdot t - \alpha + \frac{2\pi}{3}\right)\right\} + \\
&\quad \frac{1}{2} \cdot \left\{\sin\left(\omega_2 \cdot t - \gamma - \frac{4\pi}{3} + \omega_2 \cdot t + \alpha - \frac{4\pi}{3}\right) - \right.
\end{aligned} \quad (15)$$

-continued $$\sin\left(\omega_2 \cdot t - \gamma - \frac{4\pi}{3} - \omega_2 \cdot t - \alpha + \frac{4\pi}{3}\right)\Big\}\Big]\Big]\Big]$$

$$= Im_2 \cdot [\mu \cdot Im_1 \cdot \sin(\omega_1 \cdot t - \omega_2 \cdot t - \alpha) +$$

$$\mu \cdot n \cdot \Big[Ic \cdot \Big\{\frac{1}{2} \cdot \{\sin(\omega_1 \cdot t - \beta + \omega_2 \cdot t + \alpha) -$$

$$\sin(\omega_1 \cdot t - \beta - \omega_2 \cdot t - \alpha)\} +$$

$$\frac{1}{2} \cdot \Big\{\sin\left(\omega_1 \cdot t - \beta + \omega_2 \cdot t + \alpha - \frac{4\pi}{3}\right) -$$

$$\sin(\omega_1 \cdot t - \beta - \omega_2 \cdot t - \alpha)\Big\} +$$

$$\frac{1}{2} \cdot \Big\{\sin\left(\omega_1 \cdot t - \beta + \omega_2 \cdot t + \alpha - \frac{8\pi}{3}\right) -$$

$$\sin(\omega_1 \cdot t - \beta - \omega_2 \cdot t - \alpha)\Big\} +$$

$$Ic_2 \cdot \Big[\frac{1}{2} \cdot \{\sin(\omega_2 \cdot t - \gamma + \omega_2 \cdot t + \alpha) -$$

$$\sin(\omega_2 \cdot t - \gamma - \omega_2 \cdot t - \alpha)\} +$$

$$\frac{1}{2} \cdot \Big\{\sin\left(\omega_2 \cdot t - \gamma + \omega_2 \cdot t + \alpha - \frac{4\pi}{3}\right) -$$

$$\sin(\omega_2 \cdot t - \gamma - \omega_2 \cdot t - \alpha)\Big\} +$$

$$\frac{1}{2} \cdot \Big\{\sin\left(\omega_2 \cdot t - \gamma + \omega_2 \cdot t + \alpha - \frac{8\pi}{3}\right) -$$

$$\sin(\omega_2 \cdot t - \gamma - \omega_2 \cdot t - \alpha)\Big\}\Big]\Big]\Big]$$

$$= Im_2 \cdot [\mu \cdot Im_1 \cdot \sin(\omega_1 \cdot t - \omega_2 \cdot t - \alpha) +$$

$$\frac{1}{2} \cdot \mu \cdot n \cdot Ic \cdot \{\sin(\omega_1 \cdot t - \beta + \omega_2 \cdot t + \alpha) -$$

$$\sin(\omega_1 \cdot t - \beta - \omega_2 \cdot t - \alpha) +$$

$$\sin\left(\omega_1 \cdot t - \beta + \omega_2 \cdot t + \alpha - \frac{4\pi}{3}\right) -$$

$$\sin(\omega_1 \cdot t - \beta - \omega_2 \cdot t - \alpha) +$$

$$\sin\left(\omega_1 \cdot t - \beta + \omega_2 \cdot t + \alpha - \frac{8\pi}{3}\right) -$$

$$\sin(\omega_1 \cdot t - \beta - \omega_2 \cdot t - \alpha)\} +$$

$$\frac{1}{2} \cdot \mu \cdot n \cdot Ic_2 \cdot \{\sin(\omega_2 \cdot t - \gamma + \omega_2 \cdot t + \alpha) -$$

$$\sin(\omega_2 \cdot t - \gamma + \omega_2 \cdot t - \alpha) +$$

$$\sin\left(\omega_2 \cdot t - \gamma + \omega_2 \cdot t + \alpha - \frac{4\pi}{3}\right) -$$

$$\sin(\omega_2 \cdot t - \gamma - \omega_2 \cdot t - \alpha) +$$

$$\sin\left(\omega_2 \cdot t - \gamma + \omega_2 \cdot t + \alpha - \frac{8\pi}{3}\right) -$$

$$\sin(\omega_2 \cdot t - \gamma - \omega_2 \cdot t - \alpha)\}]$$

$$= Im_2 \cdot [\mu \cdot Im_1 \cdot \sin(\omega_1 \cdot t - \omega_2 \cdot t - \alpha) +$$

$$\frac{1}{2} \cdot \mu \cdot n \cdot Ic \cdot [-3 \cdot \sin\{(\omega_2 - \omega_1)t - \alpha - \beta\} +$$

$$\frac{1}{2} \cdot \mu \cdot n \cdot Ic_2 \cdot \{-3 \cdot \sin(-\alpha - \gamma)\}\Big]$$

$$= Im_2 \cdot [\mu \cdot Im_1 \cdot \sin(\omega_1 \cdot t - \omega_2 \cdot t - \alpha) -$$

$$\frac{3}{2} \cdot \mu \cdot n \cdot Ic \cdot \sin\{(\omega_2 - \omega_1) \cdot t - \alpha - \beta\} +$$

$$\frac{3}{2} \cdot \mu \cdot n \cdot Ic_2 \cdot 3 \cdot \sin(\alpha + \gamma)\Big]$$

Equation (15) also has a form wherein a torque fluctuation is added to a constant torque rotation phase difference ($\alpha+\gamma$) relative to the inner magnets $m_2$.

(1-5) Summary

The above-mentioned equations (8), (9), (11), (12), (14), (15) may be summarized as follows.

When the outer rotating magnetic fields are applied $$f_1 = -\mu \cdot Im_1 \cdot \left[Im_2 \cdot \sin\{(\omega_2 - \omega_1) \cdot t - \alpha\} - \frac{3}{2} \cdot n \cdot Ic \cdot \sin\beta\right] \quad (8)$$

$$f_2 = \mu \cdot Im_2 \cdot \left[Im_1 \cdot \sin\{(\omega_1 - \omega_2) \cdot t - \alpha\} - \frac{3}{2} \cdot n \cdot Ic \cdot \sin\{(\omega_1 - \omega_2) \cdot t - \alpha - \beta\}\right] \quad (9)$$

When the inner rotating magnetic fields are applied $$f_1 = -\mu \cdot Im_1 \cdot \left[Im_2 \cdot \sin\{(\omega_2 - \omega_1) \cdot t - \alpha\} - \frac{3}{2} \cdot n \cdot Ic \cdot \sin\{(\omega_1 - \omega_2) \cdot t + \gamma\}\right] \quad (11)$$

$$f_2 = \mu \cdot Im_2 \cdot \left[Im_1 \cdot \sin\{(\omega_1 - \omega_2) \cdot t - \alpha\} + \frac{3}{2} \cdot n \cdot Ic \cdot \sin(\alpha + \gamma)\right] \quad (12)$$

When the outer rotating magnetic fields and inner rotating magnetic fields are applied together $$f_1 = Im_1 \cdot \Big[\mu \cdot Im_2 \cdot \sin(\omega_2 \cdot t + \alpha - \omega_1 \cdot t) + \quad (14)$$
$$\mu \cdot n \cdot \Big[Ic \cdot \left(\frac{3}{2} \cdot \sin\beta\right) + Ic_2 \cdot \left[\frac{3}{2} \cdot \sin\{(\omega_1 - \omega_2) \cdot t + \gamma\}\right]\Big]\Big]$$

$$f_2 = \mu \cdot Im_2 \cdot \Big[Im_1 \cdot \sin(\omega_1 \cdot t - \omega_2 \cdot t - \alpha) + \quad (15)$$
$$\frac{3}{2} \cdot n \cdot Ic \cdot \sin\{(\omega_1 - \omega_2) \cdot t - \alpha - \beta\} + \frac{3}{2} \cdot n \cdot Ic_2 \cdot \sin(\alpha + \gamma)\Big]$$

The meaning of these equations is as follows.

The second term on the right-hand side of equation (8), the second term on the right-hand side of equation (12), the second term on the right-hand side of equation (14) and the third term on the right-hand side of equation (15) are fixed terms, i.e., constant values, and a rotational torque occurs only when these constant terms are present. Terms other than the constant terms are trigonometric functions, and the average value of a drive force fn which does not comprise a fixed term is zero. In other words, a rotational torque does not occur due to terms other than fixed terms.

Comparing equations (8) and (9), only $f_1$ from equation (8) comprises a constant torque. In other words, when a current is passed through the coils 6 of the stator 2 in synchronism with the rotation of the outer magnets, a rotational torque acts only the outer magnets.

Comparing equations (11) and (12), only $f_2$ from equation (12) comprises a constant torque. In other words, when a current is passed through the coils 6 of the stator 2 in synchronism with the rotation of the inner magnets, a rotational torque acts only the inner magnets.

Comparing equations (14) and (15), $f_1$ from equation (14) and $f_2$ from equation (15) both comprise a constant torque. In other words, when a current synchronized with the rotation of the outer magnets and a current synchronized with the rotation of the inner magnets are passed together through the coils 6, rotational torques corresponding to the respective currents act on the outer and inner magnets.

It is seen from the above facts that, when the magnetic pole number ratio is 1:1, the two rotors 3, 4 can be driven as a generator and a motor simultaneously using only one series of coils 6. Further, it may be surmised that the same operation is possible for any magnetic pole number ratio.

(1-6) Suppression of Torque Fluctuation

Due to terms other than fixed terms in the equations containing fixed terms, i.e., due to the first term on the right-hand side of equation (8), and the first and third terms on the right-hand side of equation (14), a torque fluctuation appears in the outer magnets rotation due to the phase difference ($\omega_1 - \omega_2$) between the inner magnets and outer magnets.

Also, due to the first term on the right-hand side of equation (12), and the first and second terms on the right-hand side of equation (15), a torque fluctuation appears in the inner magnets rotation due to the phase difference ($\omega_1 - \omega_2$) between the inner magnets and outer magnets.

Now, the suppression of torque fluctuation will be considered when both the outer rotating magnetic fields and an inner rotating magnetic fields are applied.

Equation (14) may be rewritten as follows.

$$f_1 = \mu \cdot Im_1 \cdot Im_2 \cdot \sin(\omega_2 \cdot t + \alpha - \omega_1 \cdot t) +$$
$$Ic \cdot \mu \cdot n \cdot Im_1 \cdot Ic \cdot \left(\frac{3}{2} \cdot \sin\beta\right) + Ic_2 \cdot Im_1 \cdot \frac{3}{2} \cdot \sin\{(\omega_1 - \omega_2) \cdot t + \gamma\}$$

Here, $f_1$ may be written as follows.

$$f_1 = A + Ic \cdot C + Ic_2 \cdot V \quad (16)$$

where, $A = \mu \cdot Im_1 \cdot Im_2 \cdot \sin(\omega_2 \cdot t + \alpha - \omega_1 \cdot t)$, $V = Im_1 \cdot \frac{3}{2} \cdot \sin\{(\omega_1 - \omega_2) \cdot t + \gamma\}$, and $C = \mu \cdot n \cdot Im_1 \cdot Ic \cdot \left(\frac{3}{2} \cdot \sin\beta\right)$.

Here, if a modulation of $$Ic = \frac{C_1 - A - Ic_2 \cdot V}{C}$$

is added, $f_1 = C_1$ (constant) and the torque fluctuation is eliminated from the rotation of the outer magnets.

Similarly, equation (15) may be rewritten as follows.

$$f_2 = \mu \cdot Im_2 \cdot Im_1 \cdot \sin(\omega_1 \cdot t - \omega_2 \cdot t - \alpha) + Ic \cdot \frac{3}{2} \cdot \mu \cdot Im_2 \cdot n \cdot$$
$$\sin\{(\omega_1 - \omega_2) \cdot t - \alpha - \beta\} + Ic_2 \cdot \frac{3}{2} \cdot \mu \cdot Im_2 \cdot n \cdot \sin(\alpha + \gamma)$$

Here, $f_2$ may be written as follows.

$$f_2 = -A + Ic \cdot D + Ic_2 \cdot E \quad (17)$$

where, $D = \frac{3}{2} \cdot \mu \cdot Im_2 \cdot n \cdot \sin\{(\omega_1 - \omega_2) \cdot t - \alpha - \beta\}$, and $E = \frac{3}{2} \cdot \mu \cdot Im_2 \cdot n \cdot \sin(\alpha + \gamma)$.

Here, if a modulation of $$Ic_2 = \frac{C_2 + A - Ic \cdot D}{E}$$

is added, $f_2 = C_2$ (constant) and the torque fluctuation is eliminated from the rotation of the inner magnets.

Therefore to give both permanent magnets a constant rotation, the following two simultaneous second order equations regarding Ic and $Ic_2$ should be solved.

$$C_1 = A + Ic \cdot C + Ic_2 \cdot V \quad (18)$$

$$C_2 = -A + Ic \cdot D + Ic_2 \cdot E \quad (19)$$

In this way, in the composite current, the torque fluctuation in the rotation of the rotors can be eliminated by adding an amplitude modulation to the alternating current which generates rotating magnetic fields that produce a torque fluctuation.

(2) N(2(2p)-2p) Type (2-1) When the Magnetic Pole Number Ratio is 2:1

Figure 10:
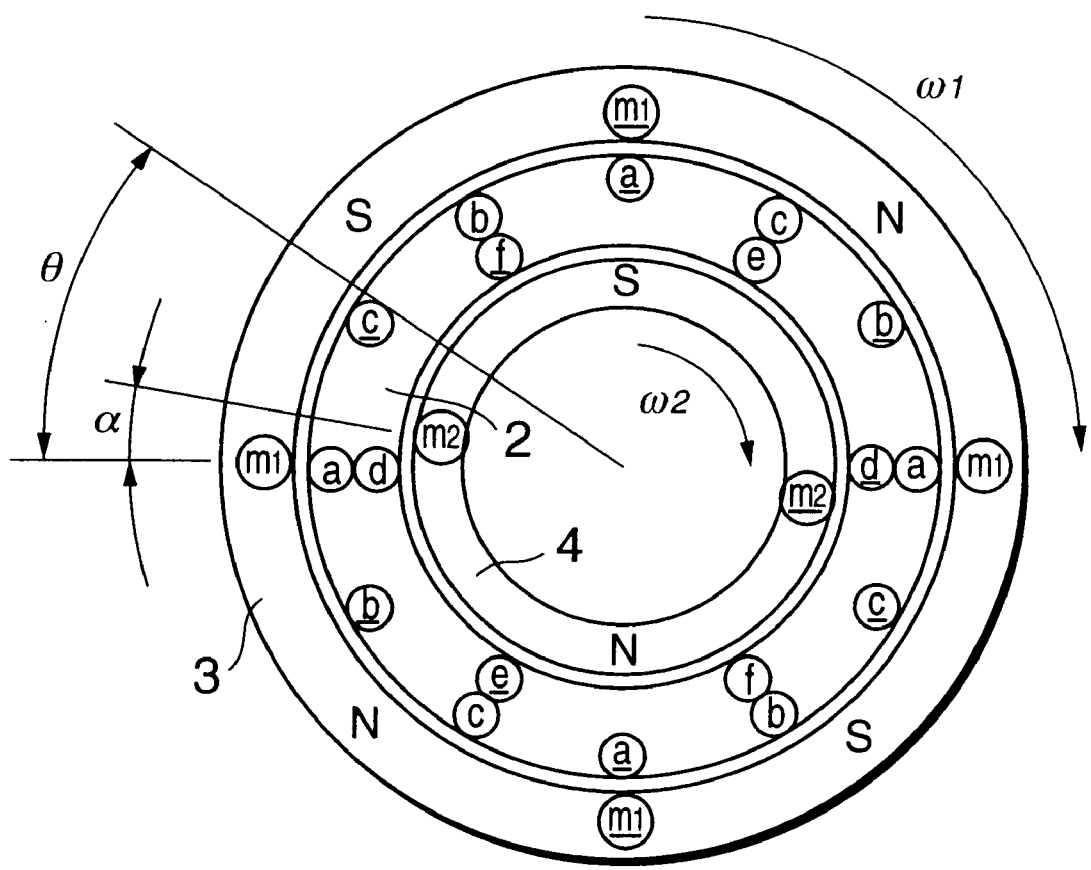
FIG. 10 is similar to FIG. 8, but showing a case where a pole number ratio is 2:1.
Figure 11:
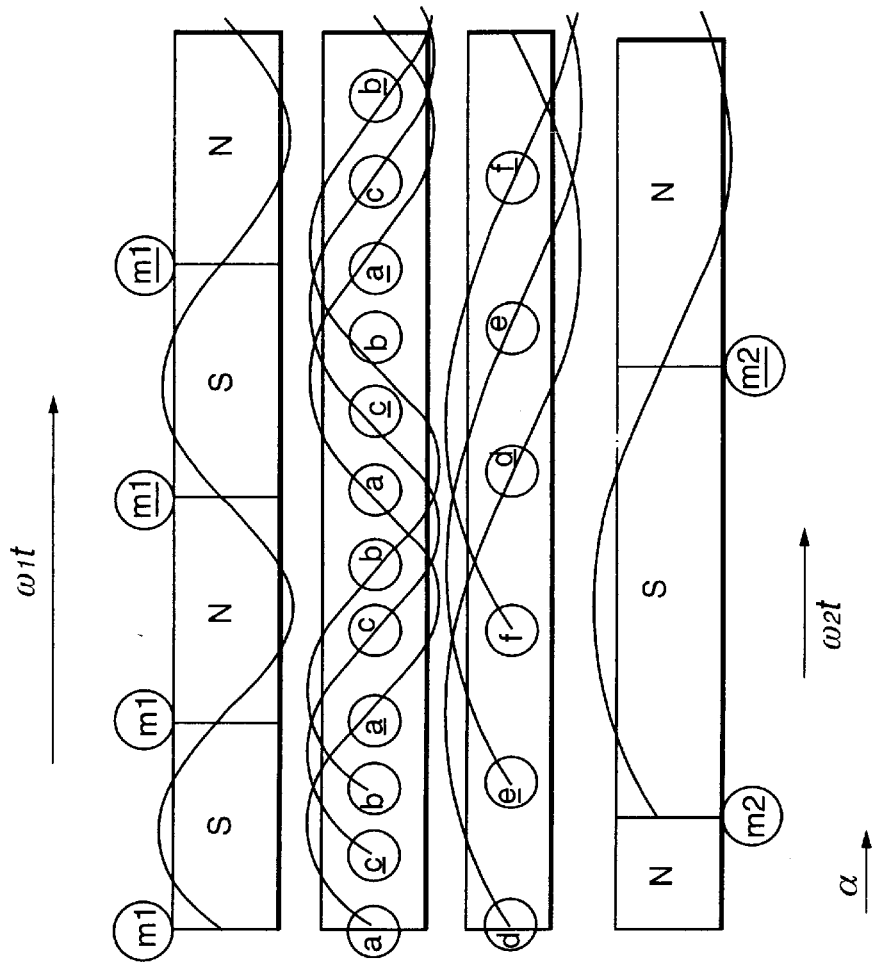
FIGS. 11A–11D are diagrams showing a flux density variation in the motor/generator of FIG. 10.

Taking the motor/generator of FIG. 10 as an example, when the magnetic pole number of the outer magnets is 4 and the magnetic pole number of the inner magnets is 2, the magnetic pole number ratio is 2:1. In this construction, if the permanent magnets are magnetically replaced by an equivalent coil, a magnetic flux density $B_1$ generated by the outer magnets is expressed by the following equation (21).

$$B_1 = Bm_1 \cdot \sin(2\omega_1 \cdot t - 2\theta) = \mu \cdot Im_1 \cdot \sin(2\omega_1 \cdot t - 2\theta) \quad (21)$$

The magnetic flux density $B_2$ generated in the inner magnets is expressed by equation (22) which is equivalent to the equation (2).

$$B_2 = Bm_2 \cdot \sin(\omega_2 \cdot t + \alpha - \theta) = \mu \cdot Im_2 \cdot \sin(\omega_2 \cdot t + \alpha - \theta) \quad (22)$$

It may be considered that the coils are arranged as shown in FIG. 10 so as to calculate the magnetic field produced by the coils 6 of the stator 2 separately for the outer rotating magnetic fields which rotate the outer rotor 3 and the inner rotating magnetic fields which rotate the inner rotor 4.

Magnetic flux densities $Bc_1$, $Bc_2$ of the outer coils and inner coils are expressed by the following equations (23), (24).

$$Bc_1 = \mu \cdot n \cdot \left\{ Ica(t) \cdot \sin 2\theta + Icb(t) \cdot \sin\left(2\theta - \frac{2\pi}{3}\right) + Icc(t) \cdot \sin\left(2\theta - \frac{4\pi}{3}\right) \right\} \quad (23)$$

$$Bc_2 = \mu \cdot n \cdot \left\{ Icd(t) \cdot \sin\theta + Ice(t) \cdot \sin\left(\theta - \frac{2\pi}{3}\right) + Icf(t) \cdot \sin\left(\theta - \frac{4\pi}{3}\right) \right\} \quad (24)$$

where, Icd(t), Ice(t), Icf(t) are also currents which are different in phase by 120 degrees as in the case of Ica(t), Icb(t), Icc(t).

Next, the change of magnetic flux density $B_1$, $B_2$, $Bc_1$, $Bc_2$ mentioned above will be described referring to FIGS. 11A–11D.

The magnetic flux density B at an angle __ is the sum of the aforesaid four magnetic flux densities.

$$B = B_1 + B_2 + Bc_1 + Bc_2 \quad (25)$$

$$= \mu \cdot Im_1 \cdot \sin(2\omega_1 \cdot t - 2\theta) + \mu \cdot Im_2 \cdot \sin(\omega_2 \cdot t + \alpha - \theta) +$$

$$\mu \cdot n \cdot \left\{ Ica(t) \cdot \sin 2\theta + Icb(t) \cdot \sin\left(2\theta - \frac{2\pi}{3}\right) + \right.$$

$$\left. Icc(t) \cdot \sin\left(2\theta - \frac{4\pi}{3}\right) \right\} + \mu \cdot n \cdot \left\{ Icd(t) \cdot \sin\theta + \right.$$

$$\left. Ice(t) \cdot \sin\left(\theta - \frac{2\pi}{3}\right) + Icf(t) \cdot \sin\left(\theta - \frac{4\pi}{3}\right) \right\}$$

Here, if the total torque acting on the outer rotor 3 is $\tau_1$, the following equation holds.

$$\tau_1 = f_1 \cdot r_1$$

where, $r_1$=distance to outer magnets from center axis of outer rotor.

In the construction of FIG. 10, unlike the case of FIG. 8, the torques exerted on each of the outer magnets $m_1$ are not symmetrical. Therefore the force $f_1$ is considered to be a total force acting on each of four equivalent direct currents that correspond to the outer magnets $m_1$. This relation is expressed by the following equation.

$$f_1 = Im_1 \cdot B_{10} + Im_1 \cdot B_{20} - Im_1 \cdot B_{30} - Im_1 \cdot B_{40}$$

where, $B_{10}$ is magnetic flux density B at $\theta = \omega_1 \cdot t$,
$B_{20}$ is magnetic flux density B at $\theta = \omega_1 \cdot t + \pi$,
$B_{30}$ is | magnetic flux density B at in $\theta = \omega_1 \cdot t + \pi/2$, and
$B_{40}$ is magnetic flux density B at $\theta = \omega_1 \cdot t + 3\pi/2$.

Therefore, the above equation can be rewritten as follows.

$$f_1 = \mu \cdot Im_1 \cdot [Im_1 \cdot \sin(2\omega_1 \cdot t - 2\omega_1 \cdot t) + \quad (26)$$

$$Im_1 \cdot \sin(2\omega_1 \cdot t - 2\omega_1 \cdot t - 2\pi) -$$

$$Im_1 \cdot \sin(2\omega_1 \cdot t - 2\omega_1 \cdot t - \pi) -$$

$$Im_1 \cdot \sin(2\omega_1 \cdot t - 2\omega_1 \cdot t + 3\pi) +$$

$$Im_2 \cdot \sin(\omega_2 \cdot t + \alpha - \omega_1 \cdot t) +$$

$$Im_2 \cdot \sin(\omega_2 \cdot t + \alpha - \omega_1 \cdot t + \pi) -$$

$$Im_2 \cdot \sin\left(\omega_2 \cdot t + \alpha - \omega_1 \cdot t + \frac{\pi}{2}\right) -$$

$$Im_2 \cdot \sin\left(\omega_2 \cdot t + \alpha - \omega_1 \cdot t + \frac{\pi}{2}\right) +$$

$$n \cdot \left\{ Ica(t) \cdot \sin(2\omega_1 \cdot t) + Icb(t) \cdot \sin\left(2\omega_1 \cdot t - \frac{2\pi}{3}\right) + \right.$$

$$\left. Icc(t) \cdot \sin\left(2\omega_1 \cdot t - \frac{4\pi}{3}\right) \right\} + n \cdot \{ Ica(t) \cdot \sin(2\omega_1 \cdot t + 2\pi) +$$

$$Icb(t) \cdot \sin\left(2\omega_1 \cdot t + 2\pi - \frac{2\pi}{3}\right) +$$

$$Icc(t) \cdot \sin\left(2\omega_1 \cdot t + 2\pi - \frac{4\pi}{3}\right) \} -$$

$$n \cdot \left\{ Ica(t) \cdot \sin(2\omega_1 \cdot t + \pi) + Icb(t) \cdot \sin\left(2\omega_1 \cdot t + \frac{\pi}{3}\right) + \right.$$

$$\left. Icc(t) \cdot \sin\left(2\omega_1 \cdot t - \frac{\pi}{3}\right) \right\} - n \cdot \{ Ica(t) \cdot \sin(2\omega_1 \cdot t + \pi) +$$

$$Icb(t) \cdot \sin\left(2\omega_1 \cdot t + \frac{\pi}{3}\right) + Icc(t) \cdot \sin\left(2\omega_1 \cdot t - \frac{\pi}{3}\right) \} +$$

$$n \cdot \left\{ Icd(t) \cdot \sin(\omega_1 \cdot t + \pi) + Ice(t) \cdot \sin\left(\omega_1 \cdot t + \pi - \frac{2\pi}{3}\right) + \right.$$

-continued $$\left. Icf(t) \cdot \sin\left(\omega_1 \cdot t + \pi - \frac{4\pi}{3}\right) \right\} -$$

$$n \cdot \left\{ Icd(t) \cdot \sin\left(\omega_1 \cdot t + \frac{\pi}{2}\right) + Ice(t) \cdot \sin\left(\omega_1 \cdot t + \frac{\pi}{2} - \frac{2\pi}{3}\right) + \right.$$

$$\left. Icf(t) \cdot \sin\left(\omega_1 \cdot t + \frac{\pi}{2} - \frac{4\pi}{3}\right) \right\} -$$

$$n \cdot \left\{ Icd(t) \cdot \sin\left(\omega_1 \cdot t + \frac{3\pi}{2}\right) + \right.$$

$$Ice(t) \cdot \sin\left(\omega_1 \cdot t + \frac{3\pi}{2} - \frac{2\pi}{3}\right) +$$

$$\left. Icf(t) \cdot \sin\left(\omega_1 \cdot t + \frac{3\pi}{2} - \frac{4\pi}{3}\right) \right\} ]$$

$$= 4 \cdot \mu \cdot Im_1 \cdot n \cdot \{ Ica(t) \cdot \sin(2\omega_1 \cdot t) +$$

$$Icb(t) \cdot \sin\left(2\omega_1 \cdot t - \frac{2\pi}{3}\right) + Icc(t) \cdot \sin\left(2\omega_1 \cdot t - \frac{4\pi}{3}\right) \}$$

Equation (26) shows that the torque acting on the outer magnets $m_1$ due to the exciting currents of the coils a, b, c can be controlled, and that it is not affected by the exciting currents of the coils d, e, f.

Next, if the torque acting on the inner rotor 4 is $\tau_2$, the following equation holds.

$$\tau_2 = f_2 \cdot r_2$$

where, $r_2$=distance to inner magnets $m_2$ from center shaft of an inner rotor.

The torques acting on the inner magnets $m_2$ of the inner rotor 4 are not symmetrical. Therefore, the force $f_2$ is considered to be a total force acting on each of two equivalent direct currents that correspond to the inner magnets. This relation is expressed by the following equation.

$$f_2 = Im_2 \cdot B_{100} - Im_2 \cdot B_{200}$$

where, $B_{100}$ is magnetic flux density B when $\theta = \omega_2 \cdot t + \alpha$, and
$B_{200}$ is magnetic flux density B when $\theta = \omega_2 \cdot t + \pi + \alpha$.

Therefore, the above equation may be rewritten as follows.

$$f_2 = \mu \cdot Im_2 \cdot [Im_1 \cdot \sin(2\omega_1 \cdot t - 2\omega_2 \cdot t - 2\alpha) - \quad (27)$$

$$Im_1 \cdot \sin(2\omega_1 \cdot t - 2\omega_2 \cdot t - 2\alpha - 2\pi) +$$

$$Im_2 \cdot \sin(2\omega_2 \cdot t + 2\alpha - 2\omega_2 \cdot t - 2\alpha) -$$

$$Im_2 \cdot \sin(2\omega_2 \cdot t + 2\alpha - 2\omega_2 \cdot t - 2\alpha - 2\pi) +$$

$$n \cdot \{ Ica(t) \cdot \sin(2\omega_2 \cdot t + 2\alpha) +$$

$$Icb(t) \cdot \sin\left(2\omega_2 \cdot t + 2\alpha - \frac{2\pi}{3}\right) +$$

$$Icc(t) \cdot \sin\left(2\omega_2 \cdot t + 2\alpha - \frac{4\pi}{3}\right) \} -$$

$$n \cdot \{ Ica(t) \cdot \sin(2\omega_2 \cdot t + 2\pi + 2\alpha) +$$

$$Icb(t) \cdot \sin\left(2\omega_2 \cdot t + 2\pi + 2\alpha - \frac{2\pi}{3}\right) +$$

$$Icc(t) \cdot \sin\left(2\omega_2 \cdot t + 2\pi + 2\alpha - \frac{4\pi}{3}\right) \} +$$

$$n \cdot \left\{ Icd(t) \cdot \sin(\omega_2 \cdot t + \alpha) + Ice(t) \cdot \sin\left(\omega_2 \cdot t + \alpha - \frac{2\pi}{3}\right) + \right.$$

-continued $$Icf(t) \cdot \sin\left(\omega_2 \cdot t + \alpha - \frac{4\pi}{3}\right)\} -$$

$$n \cdot \{Icd(t) \cdot \sin(\omega_2 \cdot t + \pi + \alpha) +$$

$$Ice(t) \cdot \sin\left(\omega_2 \cdot t + \pi - \frac{2\pi}{3}\right) +$$

$$Icf(t) \cdot \sin\left(\omega_2 \cdot t + \pi + \alpha - \frac{4\pi}{3}\right)\}]$$

$$= 2\mu \cdot Im_2 \cdot n \cdot \{Icd(t) \cdot \sin(\omega_2 \cdot t + \alpha) +$$

$$Ice(t) \cdot \sin\left(\omega_2 \cdot t + \alpha - \frac{2\pi}{3}\right) +$$

$$Icf(t) \cdot \sin\left(\omega_2 \cdot t + \alpha - \frac{4\pi}{3}\right)\}$$

According to the equation (27), the torque acting on the inner magnets $m_2$ due to the excitation currents of the coils d, e, f can be controlled, and the torque acting on the inner magnets $m_2$ is not affected by the excitation currents of the coils a, b, c.

(2-2) When the Outer Rotating Magnetic Fields are Applied

Currents with a phase difference of β with respect to the rotation position of the outer magnets $m_1$ are passed through the coils a, b, c. In order to generate the above currents, the alternating currents Ica(t), Icb(t), Icc(t) mentioned above may be defined by the following equations.

$$Ica(t) = Ic \cdot \cos(2\omega_1 \cdot t - 2\beta) \quad (28A)$$

$$Icb(t) = Ic \cdot \cos\left(2\omega_1 \cdot t - 2\beta - \frac{2\pi}{3}\right) \quad (28B)$$

$$cc(t) = Ic \cdot \cos\left(2\omega_1 \cdot t - 2\beta - \frac{4\pi}{3}\right) \quad (28C)$$

Next, (28A)–(28C) are substituted in equations (26) (27) to calculate $f_1$.

$$f_1 =$$

$$4\mu \cdot Im_1 \cdot n \cdot Ic \cdot \left\{\cos(2\omega_1 \cdot t - 2\beta) \cdot \sin(2\omega_1 \cdot t) + \cos\left(2\omega_1 \cdot t - 2\beta - \frac{2\pi}{3}\right) \cdot \sin\left(2\omega_1 \cdot t - \frac{2\pi}{3}\right) + \cos\left(2\omega_1 \cdot t - 2\beta - \frac{2\pi}{3}\right) \cdot \sin\left(2\omega_1 \cdot t - \frac{2\pi}{3}\right)\right\}$$

Here, the above equation may be rewritten as the following equation (29) using the formula $$\cos(a) \cdot \sin(b) = \frac{1}{2} \{\sin(a+b) - \sin(a-b)\}.$$

$$f_1 = 4\mu \cdot Im_1 \cdot n \cdot Ic \cdot \left[\frac{1}{2} \cdot \{\sin(2\omega_1 \cdot t - 2\beta + 2\omega_1 \cdot t) - \sin(2\omega_1 \cdot t - 2\beta - 2\omega_1 \cdot t)\} + \frac{1}{2} \cdot \left\{\sin\left(2\omega_1 \cdot t - 2\beta - \frac{2\pi}{3} + 2\omega_1 \cdot t - \frac{2\pi}{3}\right) - \sin\left(2\omega_1 \cdot t - 2\beta - \frac{2\pi}{3} - 2\omega_1 \cdot t + \frac{2\pi}{3}\right)\right\} + \frac{1}{2} \cdot \left\{\sin\left(2\omega_1 \cdot t - 2\beta - \frac{4\pi}{3} + 2\omega_1 \cdot t - \frac{4\pi}{3}\right) - \sin\left(2\omega_1 \cdot t - 2\beta - \frac{4\pi}{3} - 2\omega_1 \cdot t + \frac{4\pi}{3}\right)\right\}\right]$$

$$= 2\mu \cdot Im_1 \cdot n \cdot Ic \cdot \left\{\sin(4\omega_1 \cdot t - 2\beta) + \sin2\beta + \right.$$

$$\sin\left(4\omega_1 \cdot t - 2\beta - \frac{4\pi}{3}\right) + \sin2\beta +$$

$$\sin\left(4\omega_1 \cdot t - 2\beta - \frac{8\pi}{3}\right) + \sin2\beta\}$$

$$= 2\mu \cdot Im_1 \cdot n \cdot Ic \cdot \{\sin(4\omega_1 \cdot t - 2\beta) +$$

$$\sin\left(4\omega_1 \cdot t - 2\beta - \frac{4\pi}{3}\right) + \sin\left(4\omega_1 \cdot t - 2\beta - \frac{4\pi}{3}\right) +$$

$$3\sin2\beta\}$$

$$= 6\mu \cdot Im_1 \cdot n \cdot Ic \cdot \sin2\beta$$

Equation (29) shows that the torque acting on the outer magnet $m_1$ varies according to the phase difference β. Therefore, the rotation position of the outer magnets $m_1$ should be measured and excitation currents shifted in phase by β should be applied to the coils a, b, c.

(2-3) When the Inner Rotating Magnetic Fields are Applied

Currents with a phase difference of γ with respect to the rotation position of the inner magnets $m_2$ are passed through the coils d, e, f.

In order to generate the above currents, the alternating currents Icd(t), Ice(t), Icf(t) mentioned above may be defined by the following equations.

$$Icd(t) = Ic \cdot \cos(\omega_2 \cdot t - \gamma) \quad (30A)$$

$$Ice(t) = Ic \cdot \cos\left(\omega_2 \cdot t - \gamma - \frac{2\pi}{3}\right) \quad (30B)$$

$$Icf(t) = Ic \cdot \cos\left(\omega_2 \cdot t - \gamma - \frac{4\pi}{3}\right) \quad (30C)$$

Next, (30A)–(30C) are substituted in equations (27) to calculate $f_2$.

$$f_2 = 2\mu \cdot Im_2 \cdot n \cdot \{Ic \cdot \cos(\omega_2 \cdot t - \gamma) \cdot \sin(\omega_2 \cdot t + \alpha) +$$

$$Ic \cdot \cos\left(\omega_2 \cdot t - \gamma - \frac{2\pi}{3}\right) \cdot \sin\left(\omega_2 \cdot t + \alpha - \frac{2\pi}{3}\right) +$$

$$Ic \cdot \cos\left(\omega_2 \cdot t - \gamma - \frac{4\pi}{3}\right) \cdot \sin\left(\omega_2 \cdot t + \alpha - \frac{4\pi}{3}\right)\}$$

Here, the above equation may be rewritten using the formula $$\cos(a) \cdot \sin(b) = \frac{1}{2} \{\sin(a+b) - \sin(a-b)\}$$

$$f_2 = 2\mu \cdot Im_2 \cdot n \cdot Ic \cdot \left[\frac{1}{2} \cdot \{\sin(\omega_2 \cdot t - \gamma + \omega_2 \cdot t + \alpha) - \sin(\omega_2 \cdot t - \gamma - \omega_2 \cdot t - \alpha)\}\right) + \frac{1}{2} \cdot \left\{\sin\left(\omega_2 \cdot t - \gamma - \frac{2\pi}{3} + \omega_2 \cdot t + \alpha - \frac{2\pi}{3}\right) - \sin\left(\omega_2 \cdot t - \gamma - \frac{2\pi}{3} - \omega_2 \cdot t - \alpha + \frac{2\pi}{3}\right)\right\} + \frac{1}{2} \cdot \left\{\sin\left(\omega_2 \cdot t - \gamma - \frac{4\pi}{3} + \omega_2 \cdot t + \alpha - \frac{4\pi}{3}\right) - \sin\left(\omega_2 \cdot t - \gamma - \frac{4\pi}{3} - \omega_2 \cdot t - \alpha + \frac{4\pi}{3}\right)\right\}\right] \quad (31)$$

$$= \mu \cdot Im_2 \cdot n \cdot Ic \cdot \{\sin(2\omega_2 \cdot t - \gamma + \alpha) + \sin(\gamma + \alpha) +$$

$$\sin\left(2\omega_2 \cdot t - \gamma - \frac{4\pi}{3} + \alpha\right) + \sin(\gamma + \alpha) +$$

-continued $$\sin\left(2\omega_2 \cdot t - \gamma - \frac{8\pi}{3} + \alpha\right) + \sin(\gamma + \alpha)\right\}$$

$$= \mu \cdot Im_2 \cdot n \cdot Ic \cdot \left\{\sin(2\omega_2 \cdot t - \gamma + \alpha) + \right.$$

$$\sin\left(2\omega_2 \cdot t - \gamma - \frac{4\pi}{3} + \alpha\right) + \sin\left(2\omega_2 \cdot t - \gamma - \frac{8\pi}{3} + \alpha\right) +$$

$$3\sin(\gamma + \alpha)\right\}$$

$$= 3\mu \cdot Im_2 \cdot n \cdot Ic \cdot \sin(\gamma + \alpha)$$

Equation (31) shows that the torque acting on the inner magnet $m_2$ varies according to the phase difference ($\gamma+\alpha$).

Therefore, the rotation position of the inner magnets $m_2$ should be measured and excitation currents shifted in phase by ($\gamma+\alpha$) should be applied to the coils d, e, f.

(2-4) Summary

Equation (29) shows that when currents are passed through the coils 6 of the stator 2 in synchronism with the outer magnets $m_1$, a rotational torque acts only the outer magnets $m_1$.

Equation (31) shows that when currents are passed through the coils 6 in synchronism with the outer magnets $m_2$, a rotational torque acts only the outer magnets $m_2$.

Although the calculations are not shown, when a current synchronized with the rotation of the outer magnets and a current synchronized with the rotation of the inner magnets are passed together through the coils 6, rotational torques corresponding to the respective currents act on the outer and inner magnets as in the case where the magnetic pole number ratio is 2:1, as described in (1-4).

This fact shows that also in the case where the magnetic pole number ratio is 2:1, the two rotors 3, 4 can be driven as a generator/motor using the coils 6.

In this case, as only constant terms remain, there is no fluctuation of rotation torque of the inner rotor 4 due to the effect of the outer rotor 3 or the rotational magnetic field produced to drive the outer rotor 3, and conversely, there is no fluctuation of rotation torque of the outer rotor 3 due to the effect of the inner rotor 4 or the rotational magnetic field produced to drive the inner rotor 4.

In other words, when the magnetic pole number ratio is 2:1, both rotors can be driven with a constant rotation, without adding an amplitude modulation to eliminate torque fluctuation as when the magnetic pole number ratio is 1:1, or as described later, 3:1.

(2-5) Setting of Currents Flowing Through Stator Coil

In FIG. 10, a series of coils a, c, b for generating the outer rotating magnetic fields and another series of coils d, f, e for generating the inner rotating magnetic fields are assumed for the purpose of theoretical calculation.

Figure 12:
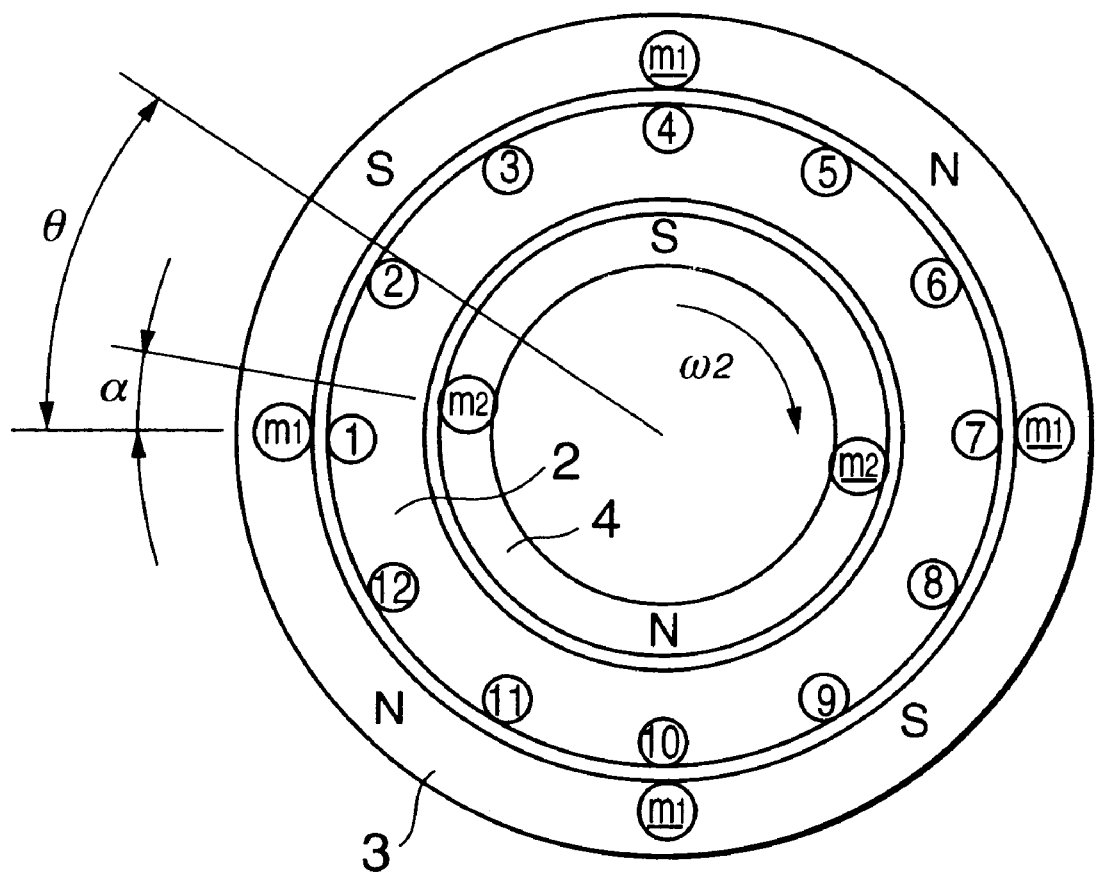
FIG. 12 is similar to FIG. 10, but showing a case where the coils of the stator are common.

In the real motor/generator according to this invention, these coils are integrated as shown in FIG. 12. specifically, the coils a and d, b and f, c and e, a and d, b and f, and c and e in FIG. 10 are respectively integrated to coils #1, #3, #5, #7, #9, #11. The composite currents $I_1$–$I_{12}$ passed through the coils #1–#12 in FIG. 12 are therefore set as follows due to their relation to the currents passed through the coils in FIG. 10.

$$I_1 = Ia + Id$$

$$I_2 = Ic$$

$$I_3 = Ib + If$$

$$I_4 = \underline{Ia}$$

$$I_5 = Ic + Ie$$

$$I_6 = \underline{Ib}$$

$$I_7 = Ia + \underline{Id}$$

$$I_8 = \underline{Ic}$$

$$I_9 = Ib + If$$

$$I_{10} = \underline{Ia}$$

$$I_{11} = Ic + \underline{Ie}$$

$$I_{12} = Ib$$

In this case, the load on the coils through which the currents $I_1$, $I_3$, $I_5$, $I_9$, $I_{11}$ are passed is greater than that of the remaining coils through which the currents $I_2$, $I_4$, $I_6$, $I_8$, $I_{10}$ are passed. Therefore, it is considered to spread the load among the remaining coils in order to form the inner rotating magnetic fields.

For example, comparing FIG. 2 and FIG. 1, the coils in FIG. 2 corresponding to 1, <u>1</u>, 2, <u>2</u> in FIG. 1 are the outer coils a, <u>a</u>, <u>c</u>, c and the inner coils d, <u>d</u>. In this case, it is assumed that the position of the coils d, <u>d</u> is shifted to a position that is equidistant from the coil a, <u>a</u> and the coil <u>c</u>, c. These shifted coils are designated as coils d', <u>d'</u>.

Half of the current Id passed through the coil d' is assigned to each of the coils a and <u>c</u>, and half of the current <u>Id</u> passed through the coil <u>d'</u> is assigned to each of the coils <u>a</u> and c. Similarly coils e', <u>e'</u> and f', <u>f'</u> are assumed and the currents passing through these coils are allocated in a similar manner.

In this way, the following alternative current settings are possible:

$$I_1 = Ia + \frac{1}{2} \cdot Id'$$

$$I_2 = Ic + \frac{1}{2} \cdot Id'$$

$$I_3 = Ib + \frac{1}{2} \cdot \underline{If'}$$

$$I_4 = Ia + \frac{1}{2} \cdot \underline{If'}$$

$$I_5 = Ic + \frac{1}{2} \cdot Ie'$$

$$I_6 = Ib + \frac{1}{2} \cdot Ie'$$

$$I_7 = Ia + \frac{1}{2} \cdot \underline{Id'}$$

$$I_8 = Ic + \frac{1}{2} \cdot \underline{Id'}$$

$$I_9 = Ib + \frac{1}{2} \cdot If'$$

$$I_{10} = Ia + \frac{1}{2} \cdot If'$$

$$I_{11} = Ic + \frac{1}{2} \cdot \underline{Ie'}$$

$$I_{12} = Ib + \frac{1}{2} \cdot \underline{Ie'}$$

Alternatively, the following settings are possible.

Figure 13A:
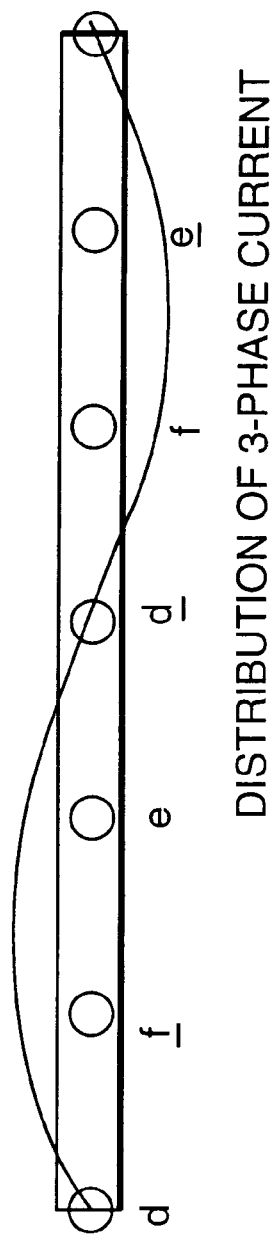
FIGS. 13A and 13B are diagrams showing the distribution of a twelve-phase alternating current for driving the motor/generator of FIG. 12.
Figure 13B:
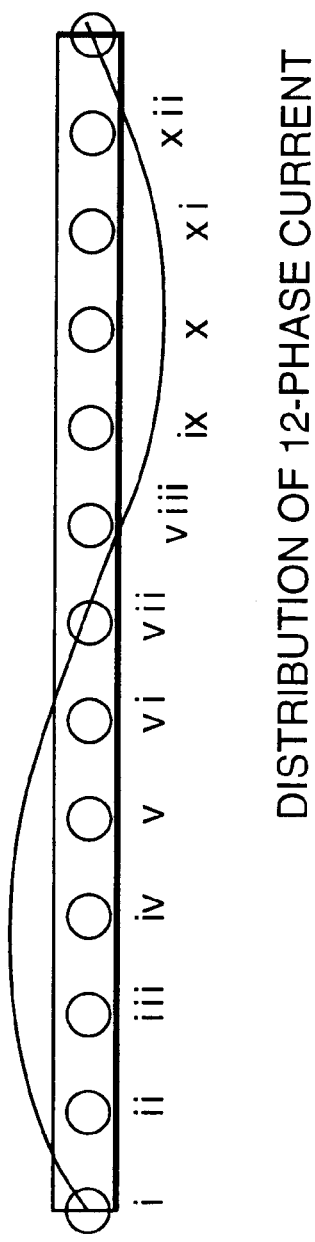

$I_1 = \underline{Ia} + Ii$ $I_2 = \underline{Ic} + Iii$ $I_3 = \underline{Ib} + Iiii$ $I_4 = \underline{Ia} + Iiv$ $I_5 = \underline{Ic} + Iv$ $I_6 = \underline{Ib} + Ivi$ $I_7 = \underline{Ia} + Ivii$ $I_8 = \underline{Ic} + Iviii$ $I_9 = \underline{Ib} + Iix$ $I_{10} = \underline{Ia} + Ix$ $I_{11} = \underline{Ic} + Ixi$ $I_{12} = \underline{Ib} + Ixii$ The currents Ii–Ixii which are the second terms on the right-hand side of the above equations for setting $I_1$–$I_{12}$, comprise a twelve-phase alternating current as shown in FIGS. 13A, 13B. The inner rotating magnetic fields may be formed by this twelve-phase alternating current.

(2-6) When the Inner Rotating Magnetic Fields are Supplied by Twelve-phase Alternating Current (2-6-1) Magnetic Flux Density $Bc_2$ The magnetic flux density $Bc_2$ when the inner rotating magnetic fields are supplied by a twelve-phase alternating current is expressed by the following equation (32).

$$Bc_2 = \mu \cdot n \cdot \qquad (32)$$

$$\left\{ Ici(t) \cdot \sin\theta + Icii(t) \cdot \sin\left(\theta - \frac{2\pi}{12}\right) + Iciii(t) \cdot \sin\left(\theta - \frac{4\pi}{12}\right) + Iciv(t) \cdot \right.$$

$$\sin\left(\theta - \frac{6\pi}{12}\right) + Icv(t) \cdot \sin\left(\theta - \frac{8\pi}{12}\right) + Icvi(t) \cdot \sin\left(\theta - \frac{10\pi}{12}\right) +$$

$$Icvii(t) \cdot \sin\left(\theta - \frac{12\pi}{12}\right) + Icviii(t) \cdot \sin\left(\theta - \frac{14\pi}{12}\right) +$$

$$Icix(t) \cdot \sin\left(\theta - \frac{16\pi}{12}\right) + Icx(t) \cdot \sin\left(\theta - \frac{18\pi}{12}\right) +$$

$$\left. Icxi(t) \cdot \sin\left(\theta - \frac{20\pi}{12}\right) + Icxii(t) \cdot \sin\left(\theta - \frac{22\pi}{12}\right) \right\}$$

The total magnetic flux density B is expressed by the following equation.

$$B = B_1 + B_2 + Bc_1 + Bc_2 \qquad (33)$$

$$= \mu \cdot Im_1 \cdot \sin(2\omega_1 \cdot t - 2\theta) + \mu \cdot Im_2 \cdot \sin(\omega_2 \cdot t + \alpha - \theta) +$$

$$\mu \cdot n \cdot \left\{ Ica(t) \cdot \sin\theta + Icb(t) \cdot \sin\left(2\theta - \frac{2\pi}{3}\right) + Icc(t) \cdot \right.$$

$$\left. \sin\left(2\theta - \frac{4\pi}{3}\right) \right\} + \mu \cdot n \cdot \left\{ Ici(t) \cdot \sin\theta + Icii(t) \cdot \sin\left(\theta - \frac{2\pi}{12}\right) + \right.$$

$$Iciii(t) \cdot \sin\left(\theta - \frac{4\pi}{12}\right) + Iciv(t) \cdot \sin\left(\theta - \frac{6\pi}{12}\right) + Icv(t) \cdot$$

$$\sin\left(\theta - \frac{8\pi}{12}\right) + Icvi(t) \cdot \sin\left(\theta - \frac{10\pi}{12}\right) + Icvii(t) \cdot$$

$$\sin\left(\theta - \frac{12\pi}{12}\right) + Icviii(t) \cdot \sin\left(\theta - \frac{14\pi}{12}\right) + Icix(t) \cdot$$

-continued $$\sin\left(\theta - \frac{16\pi}{12}\right) + Icx(t) \cdot \sin\left(\theta - \frac{18\pi}{12}\right) + Icxi(t) \cdot$$

$$\left. \sin\left(\theta - \frac{20\pi}{12}\right) + Icxii(t) \cdot \sin\left(\theta - \frac{22\pi}{12}\right) \right\}$$

$f_1$ is calculated by the following equation.

$$f_1 = Im_1 \cdot B_{10} + Im_1 \cdot B_{20} - Im_1 \cdot B_{40}$$

where, $B_{10}$ is magnetic flux density B at $\theta = \omega_1 \cdot t$, $B_{20}$ is magnetic flux density B at $\theta = \omega_1 \cdot t + \pi$, $B_{30}$ is | magnetic flux density B at $\theta = \omega_1 \cdot t + \pi/2$, and $B_{40}$ is magnetic flux density B at $\theta = \omega_1 \cdot t + 3\pi/2$.

Therefore, the above equation can be rewritten as follows.

$$f_1 = \mu \cdot Im_1 \cdot \left[ Im_1 \cdot \sin(2\omega_1 \cdot t - 2\omega_1 \cdot t) + \right. \qquad (34)$$

$$Im_1 \cdot \sin(2\omega_1 \cdot t - 2\omega_1 \cdot t - 2\pi) -$$

$$Im_1 \cdot \sin(2\omega_1 \cdot t - 2\omega_1 \cdot t - \pi) -$$

$$Im_1 \cdot \sin(2\omega_1 \cdot t - 2\omega_1 \cdot t - 3\pi) +$$

$$Im_2 \cdot \sin(\omega_2 \cdot t + \alpha - \omega_1 \cdot t) +$$

$$Im_2 \cdot \sin(\omega_2 \cdot t + \alpha - \omega_1 \cdot t - \pi) -$$

$$Im_2 \cdot \sin\left(\omega_2 \cdot t + \alpha - \omega_1 \cdot t - \frac{\pi}{2}\right) -$$

$$Im_2 \cdot \sin\left(\omega_2 \cdot t + \alpha - \omega_1 \cdot t - \frac{3\pi}{2}\right) +$$

$$n \cdot \left\{ Ica(t) \cdot \sin(2\omega_1 \cdot t) + Icb(t) \cdot \sin\left(2\omega_1 \cdot t - \frac{2\pi}{3}\right) + \right.$$

$$\left. Icc(t) \cdot \sin\left(2\omega_1 \cdot t - \frac{4\pi}{3}\right) \right\} + n \cdot \left\{ Ica(t) \cdot \sin(2\omega_1 \cdot t + 2\pi) + \right.$$

$$Icb(t) \cdot \sin\left(2\omega_1 \cdot t + 2\pi - \frac{2\pi}{3}\right) +$$

$$\left. Icc(t) \cdot \sin\left(2\omega_1 \cdot t + 2\pi - \frac{4\pi}{3}\right) \right\} -$$

$$n \cdot \left\{ Ica(t) \cdot \sin(2\omega_1 \cdot t + \pi) + Icb(t) \cdot \sin\left(2\omega_1 \cdot t + \frac{\pi}{3}\right) + \right.$$

$$\left. Icc(t) \cdot \sin\left(2\omega_1 \cdot t + 2\pi - \frac{\pi}{3}\right) \right\} -$$

$$n \cdot \left\{ Ica(t) \cdot \sin(2\omega_1 \cdot t + \pi) + Icb(t) \cdot \sin\left(2\omega_1 \cdot t + \frac{\pi}{3}\right) + \right.$$

$$\left. Icc(t) \cdot \sin\left(2\omega_1 \cdot t + 2\pi - \frac{\pi}{3}\right) \right\} + n \cdot \left[ Ici(t) \cdot \left\{ \sin(\omega_1 \cdot t) + \right. \right.$$

$$\sin(\omega_1 \cdot t + \pi) - \sin\left(\omega_1 \cdot t + \frac{\pi}{2}\right) - \sin\left(\omega_1 \cdot t + \frac{3\pi}{2}\right) \right\} +$$

$$Icii(t) \cdot \left\{ \sin\left(\omega_1 \cdot t - \frac{2\pi}{12}\right) + \sin\left(\omega_1 \cdot t - \frac{2\pi}{12} + \pi\right) - \right.$$

$$\left. \sin\left(\omega_1 \cdot t - \frac{2\pi}{12} + \frac{\pi}{2}\right) - \sin\left(\omega_1 \cdot t - \frac{2\pi}{12} + \frac{3\pi}{2}\right) \right\} +$$

$$Iciii(t) \cdot \left\{ \sin\left(\omega_1 \cdot t - \frac{4\pi}{12}\right) + \sin\left(\omega_1 \cdot t - \frac{4\pi}{12} + \pi\right) - \right.$$

$$\left. \sin\left(\omega_1 \cdot t - \frac{4\pi}{12} + \frac{\pi}{2}\right) - \sin\left(\omega_1 \cdot t - \frac{4\pi}{12} + \frac{3\pi}{2}\right) \right\} +$$

$$Iciv(t) \cdot \left\{ \sin\left(\omega_1 \cdot t - \frac{6\pi}{12}\right) + \sin\left(\omega_1 \cdot t - \frac{6\pi}{12} + \pi\right) - \right.$$

$$\left. \sin\left(\omega_1 \cdot t - \frac{6\pi}{12} + \frac{\pi}{2}\right) - \sin\left(\omega_1 \cdot t - \frac{6\pi}{12} + \frac{3\pi}{2}\right) \right\} +$$

-continued $$Icv(t) \cdot \left\{ \sin\left(\omega_1 \cdot t - \frac{8\pi}{12}\right) + \sin\left(\omega_1 \cdot t - \frac{8\pi}{12} + \pi\right) - \right.$$
$$\left. \sin\left(\omega_1 \cdot t - \frac{8\pi}{12} + \frac{\pi}{2}\right) - \sin\left(\omega_1 \cdot t - \frac{8\pi}{12} + \frac{3\pi}{2}\right) \right\} +$$

$$Icvi(t) \cdot \left\{ \sin\left(\omega_1 \cdot t - \frac{10\pi}{12}\right) + \sin\left(\omega_1 \cdot t - \frac{10\pi}{12} + \pi\right) - \right.$$
$$\left. \sin\left(\omega_1 \cdot t - \frac{10\pi}{12} + \frac{\pi}{2}\right) - \sin\left(\omega_1 \cdot t - \frac{10\pi}{12} + \frac{3\pi}{2}\right) \right\} +$$

$$Icvii(t) \cdot \left\{ \sin\left(\omega_1 \cdot t - \frac{12\pi}{12}\right) + \sin\left(\omega_1 \cdot t - \frac{12\pi}{12} + \pi\right) - \right.$$
$$\left. \sin\left(\omega_1 \cdot t - \frac{12\pi}{12} + \frac{\pi}{2}\right) - \sin\left(\omega_1 \cdot t - \frac{12\pi}{12} + \frac{3\pi}{2}\right) \right\} +$$

$$Icviii(t) \cdot \left\{ \sin\left(\omega_1 \cdot t - \frac{14\pi}{12}\right) + \sin\left(\omega_1 \cdot t - \frac{14\pi}{12} + \pi\right) - \right.$$
$$\left. \sin\left(\omega_1 \cdot t - \frac{14\pi}{12} + \frac{\pi}{2}\right) - \sin\left(\omega_1 \cdot t - \frac{14\pi}{12} + \frac{3\pi}{2}\right) \right\} +$$

$$Icix(t) \cdot \left\{ \sin\left(\omega_1 \cdot t - \frac{16\pi}{12}\right) + \sin\left(\omega_1 \cdot t - \frac{16\pi}{12} + \pi\right) - \right.$$
$$\left. \sin\left(\omega_1 \cdot t - \frac{16\pi}{12} + \frac{\pi}{2}\right) - \sin\left(\omega_1 \cdot t - \frac{16\pi}{12} + \frac{3\pi}{2}\right) \right\} +$$

$$Icx(t) \cdot \left\{ \sin\left(\omega_1 \cdot t - \frac{18\pi}{12}\right) + \sin\left(\omega_1 \cdot t - \frac{18\pi}{12} + \pi\right) - \right.$$
$$\left. \sin\left(\omega_1 \cdot t - \frac{18\pi}{12} + \frac{\pi}{2}\right) - \sin\left(\omega_1 \cdot t - \frac{18\pi}{12} + \frac{3\pi}{2}\right) \right\} +$$

$$Icxi(t) \cdot \left\{ \sin\left(\omega_1 \cdot t - \frac{20\pi}{12}\right) + \sin\left(\omega_1 \cdot t - \frac{20\pi}{12} + \pi\right) - \right.$$
$$\left. \sin\left(\omega_1 \cdot t - \frac{20\pi}{12} + \frac{\pi}{2}\right) - \sin\left(\omega_1 \cdot t - \frac{20\pi}{12} + \frac{3\pi}{2}\right) \right\} +$$

$$Icxii(t) \cdot \left\{ \sin\left(\omega_1 \cdot t - \frac{22\pi}{12}\right) + \sin\left(\omega_1 \cdot t - \frac{22\pi}{12} + \pi\right) - \right.$$
$$\left. \sin\left(\omega_1 \cdot t - \frac{22\pi}{12} + \frac{\pi}{2}\right) - \sin\left(\omega_1 \cdot t - \frac{22\pi}{12} + \frac{3\pi}{2}\right) \right\} \Big]$$

$$= 4\mu \cdot n \cdot Im_1 \cdot \left\{ Ica(t) \cdot \sin(2\omega_1 \cdot t) + \right.$$
$$\left. Icb(t) \cdot \sin\left(2\omega_1 \cdot t - \frac{2\pi}{3}\right) + Icc(t) \cdot \sin\left(2\omega_1 \cdot t - \frac{4\pi}{3}\right) \right\}$$

This is the same equation (26) where the inner rotating magnetic fields are produced by a three-phase alternating current.

Also, $f_2$ is calculated by the following equation.

$$f_2 = Im_2 \cdot B_{100} - Im_2 \cdot B_{200}$$

where, $B_{100}$ is magnetic flux density B at $\theta = \omega_2 \cdot t + \alpha$, and
$B_{200}$ is magnetic flux density B at $\theta = \omega_2 \cdot t + \pi + \alpha$.

Therefore, the above equation can be rewritten as follows.

$$f_2 = \mu \cdot Im_2 \cdot \Big[ Im_1 \cdot \sin(2\omega_1 \cdot t - 2\omega_2 \cdot t - 2\alpha) - \qquad (35)$$
$$Im_1 \cdot \sin(2\omega_1 \cdot t - 2\omega_2 \cdot t - 2\alpha - 2\pi) +$$
$$Im_2 \cdot \sin(2\omega_2 \cdot t + 2\alpha - 2\omega_2 \cdot t - 2\alpha) -$$
$$Im_2 \cdot \sin(2\omega_2 \cdot t + 2\alpha - 2\omega_2 \cdot t - 2\alpha - 2\pi) +$$
$$n \cdot \Big\{ Ica(t) \cdot \sin(2\omega_2 \cdot t + 2\alpha) +$$
$$Icb(t) \cdot \sin\left(2\omega_2 \cdot t + 2\alpha - \frac{2\pi}{3}\right) +$$
$$Icc(t) \cdot \sin\left(2\omega_2 \cdot t + 2\alpha - \frac{4\pi}{3}\right) \Big\} -$$
$$n \cdot \Big\{ Ica(t) \cdot \sin(2\omega_2 \cdot t + 2\pi + 2\alpha) +$$
$$Icb(t) \cdot \sin\left(2\omega_2 \cdot t + 2\pi + 2\alpha - \frac{2\pi}{3}\right) +$$
$$Icc(t) \cdot \sin\left(2\omega_2 \cdot t + 2\pi + 2\alpha - \frac{4\pi}{3}\right) \Big\} +$$
$$n \cdot \Big[ Ici(t) \cdot \{ \sin(\omega_2 \cdot t + \alpha) - \sin(\omega_2 \cdot t + \pi + \alpha) \} +$$
$$Icii(t) \cdot \left\{ \sin\left(\omega_2 \cdot t + \alpha - \frac{2\pi}{12}\right) - \sin\left(\omega_2 \cdot t + \pi + \alpha - \frac{2\pi}{12}\right) \right\} +$$
$$Iciii(t) \cdot \left\{ \sin\left(\omega_2 \cdot t + \alpha - \frac{4\pi}{12}\right) - \sin\left(\omega_2 \cdot t + \pi + \alpha - \frac{4\pi}{12}\right) \right\} +$$
$$Iciv(t) \cdot \left\{ \sin\left(\omega_2 \cdot t + \alpha - \frac{6\pi}{12}\right) - \sin\left(\omega_2 \cdot t + \pi + \alpha - \frac{6\pi}{12}\right) \right\} +$$
$$Icv(t) \cdot \left\{ \sin\left(\omega_2 \cdot t + \alpha - \frac{8\pi}{12}\right) - \sin\left(\omega_2 \cdot t + \pi + \alpha - \frac{8\pi}{12}\right) \right\} +$$
$$Icvi(t) \cdot \left\{ \sin\left(\omega_2 \cdot t + \alpha - \frac{10\pi}{12}\right) - \sin\left(\omega_2 \cdot t + \pi + \alpha - \frac{10\pi}{12}\right) \right\} +$$
$$Icvii(t) \cdot \left\{ \sin\left(\omega_2 \cdot t + \alpha - \frac{12\pi}{12}\right) - \sin\left(\omega_2 \cdot t + \pi + \alpha - \frac{12\pi}{12}\right) \right\} +$$
$$Icviii(t) \cdot \left\{ \sin\left(\omega_2 \cdot t + \alpha - \frac{14\pi}{12}\right) - \sin\left(\omega_2 \cdot t + \pi + \alpha - \frac{14\pi}{12}\right) \right\} +$$
$$Icix(t) \cdot \left\{ \sin\left(\omega_2 \cdot t + \alpha - \frac{16\pi}{12}\right) - \sin\left(\omega_2 \cdot t + \pi + \alpha - \frac{16\pi}{12}\right) \right\} +$$
$$Icx(t) \cdot \left\{ \sin\left(\omega_2 \cdot t + \alpha - \frac{18\pi}{12}\right) - \sin\left(\omega_2 \cdot t + \pi + \alpha - \frac{18\pi}{12}\right) \right\} +$$
$$Icxi(t) \cdot \left\{ \sin\left(\omega_2 \cdot t + \alpha - \frac{20\pi}{12}\right) - \sin\left(\omega_2 \cdot t + \pi + \alpha - \frac{20\pi}{12}\right) \right\} +$$
$$Icxii(t) \cdot \left\{ \sin\left(\omega_2 \cdot t + \alpha - \frac{22\pi}{12}\right) - \sin\left(\omega_2 \cdot t + \pi + \alpha - \frac{22\pi}{12}\right) \right\} \Big] \Big]$$

$$= 2\mu \cdot Im_2 \cdot n \cdot \Big\{ Ici(t) \cdot \sin(\omega_2 \cdot t + \alpha) + Icii(t) \cdot \sin\left(\omega_2 \cdot t + \alpha - \frac{2\pi}{12}\right) +$$
$$Iciii(t) \cdot \sin\left(\omega_2 \cdot t + \alpha - \frac{4\pi}{12}\right) + Iciv(t) \cdot \sin\left(\omega_2 \cdot t + \alpha - \frac{6\pi}{12}\right) +$$
$$Icv(t) \cdot \sin\left(\omega_2 \cdot t + \alpha - \frac{8\pi}{12}\right) + Icvi(t) \cdot \sin\left(\omega_2 \cdot t + \alpha - \frac{10\pi}{12}\right) +$$
$$Icvii(t) \cdot \sin\left(\omega_2 \cdot t + \alpha - \frac{12\pi}{12}\right) + Icviii(t) \cdot \sin\left(\omega_2 \cdot t + \alpha - \frac{14\pi}{12}\right) +$$
$$Icix(t) \cdot \sin\left(\omega_2 \cdot t + \alpha - \frac{16\pi}{12}\right) + Icx(t) \cdot \sin\left(\omega_2 \cdot t + \alpha - \frac{18\pi}{12}\right) +$$
$$Icxi(t) \cdot \sin\left(\omega_2 \cdot t + \alpha - \frac{20\pi}{12}\right) + Icxii(t) \cdot \sin\left(\omega_2 \cdot t + \alpha - \frac{22\pi}{12}\right) \Big\}$$

$f_2$ given by this equation (35) is different from $f_2$ given by equation (27) when the inner rotating magnetic fields are formed by a three-phase alternating current. Therefore, the following calculation of $f_2$ when the inner rotating magnetic fields are formed by a twelve-phase alternating current, will be performed.

(2-6-2) Calculation of $f_2$ Using Twelve-phase Alternating Current

The above-mentioned twelve-phase alternating current $Ici(t)$–$Icxii(t)$ is set by the following equations (36A)–(36L).

$$Ici(t) = Ic_2(t) \cdot \cos(\omega_2 \cdot t - \gamma) \qquad (36A)$$

$$Icii(t) = Ic_2(t) \cdot \cos\left(\omega_2 \cdot t - \gamma - \frac{2\pi}{12}\right) \qquad (36B)$$

-continued $$Iciii(t) = Ic_2(t) \cdot \cos\left(\omega_2 \cdot t - \gamma - \frac{4\pi}{12}\right) \quad (36C)$$

$$Iciv(t) = Ic_2(t) \cdot \cos\left(\omega_2 \cdot t - \gamma - \frac{6\pi}{12}\right) \quad (36D)$$

$$Icv(t) = Ic_2(t) \cdot \cos\left(\omega_2 \cdot t - \gamma - \frac{8\pi}{12}\right) \quad (36E)$$

$$Icvi(t) = Ic_2(t) \cdot \cos\left(\omega_2 \cdot t - \gamma - \frac{10\pi}{12}\right) \quad (36F)$$

$$Icvii(t) = Ic_2(t) \cdot \cos\left(\omega_2 \cdot t - \gamma - \frac{12\pi}{12}\right) \quad (36G)$$

$$Icviii(t) = Ic_2(t) \cdot \cos\left(\omega_2 \cdot t - \gamma - \frac{14\pi}{12}\right) \quad (36H)$$

$$Icix(t) = Ic_2(t) \cdot \cos\left(\omega_2 \cdot t - \gamma - \frac{16\pi}{12}\right) \quad (36I)$$

$$Icx(t) = Ic_2(t) \cdot \cos\left(\omega_2 \cdot t - \gamma - \frac{18\pi}{12}\right) \quad (36J)$$

$$Icxi(t) = Ic_2(t) \cdot \cos\left(\omega_2 \cdot t - \gamma - \frac{20\pi}{12}\right) \quad (36K)$$

$$Icxii(t) = Ic_2(t) \cdot \cos\left(\omega_2 \cdot t - \gamma - \frac{22\pi}{12}\right) \quad (36L)$$

$f_2$ is calculated by substituting equations (36A)–(36L) in equation (35).

$$\begin{aligned}
f_2 = 2\mu \cdot lm_2 \cdot n \cdot Ic(t) \cdot \Big\{ &\cos(\omega_2 \cdot t - \gamma) \cdot \sin(\omega_2 \cdot t + \alpha) + \\
&\cos\left(\omega_2 \cdot t - \gamma - \frac{2\pi}{12}\right) \cdot \sin\left(\omega_2 \cdot t + \alpha - \frac{2\pi}{12}\right) + \\
&\cos\left(\omega_2 \cdot t - \gamma - \frac{4\pi}{12}\right) \cdot \sin\left(\omega_2 \cdot t + \alpha - \frac{4\pi}{12}\right) + \\
&\cos\left(\omega_2 \cdot t - \gamma - \frac{6\pi}{12}\right) \cdot \sin\left(\omega_2 \cdot t + \alpha - \frac{6\pi}{12}\right) + \\
&\cos\left(\omega_2 \cdot t - \gamma - \frac{8\pi}{12}\right) \cdot \sin\left(\omega_2 \cdot t + \alpha - \frac{8\pi}{12}\right) + \\
&\cos\left(\omega_2 \cdot t - \gamma - \frac{10\pi}{12}\right) \cdot \sin\left(\omega_2 \cdot t + \alpha - \frac{10\pi}{12}\right) + \\
&\cos\left(\omega_2 \cdot t - \gamma - \frac{12\pi}{12}\right) \cdot \sin\left(\omega_2 \cdot t + \alpha - \frac{12\pi}{12}\right) + \\
&\cos\left(\omega_2 \cdot t - \gamma - \frac{14\pi}{12}\right) \cdot \sin\left(\omega_2 \cdot t + \alpha - \frac{14\pi}{12}\right) + \\
&\cos\left(\omega_2 \cdot t - \gamma - \frac{16\pi}{12}\right) \cdot \sin\left(\omega_2 \cdot t + \alpha - \frac{16\pi}{12}\right) + \\
&\cos\left(\omega_2 \cdot t - \gamma - \frac{18\pi}{12}\right) \cdot \sin\left(\omega_2 \cdot t + \alpha - \frac{18\pi}{12}\right) + \\
&\cos\left(\omega_2 \cdot t - \gamma - \frac{20\pi}{12}\right) \cdot \sin\left(\omega_2 \cdot t + \alpha - \frac{20\pi}{12}\right) + \\
&\cos\left(\omega_2 \cdot t - \gamma - \frac{22\pi}{12}\right) \cdot \sin\left(\omega_2 \cdot t + \alpha - \frac{22\pi}{12}\right) \Big\}
\end{aligned}$$

Here, the above equation may be rewritten using the formula $\cos(a) \cdot \sin(b) = \frac{1}{2} \cdot \{\sin(a+b) - \sin(a-b)\}$.

$$f_2 = 2\mu \cdot lm_2 \cdot n \cdot Ic_2(t) \cdot \left[\frac{1}{2} \cdot \{\sin(\omega_2 \cdot t - \gamma + \omega_2 \cdot t + \alpha) - \right. \quad (37)$$

-continued $$\sin(\omega_2 \cdot t - \gamma - \omega_2 \cdot t - \alpha)\} + \frac{1}{2} \cdot$$

$$\left\{\sin\left(\omega_2 \cdot t - \gamma - \frac{2\pi}{12} + \omega_2 \cdot t + \alpha - \frac{2\pi}{12}\right) - \right.$$

$$\left.\sin\left(\omega_2 \cdot t - \gamma - \frac{2\pi}{12} - \omega_2 \cdot t - \alpha + \frac{2\pi}{12}\right)\right\} + \frac{1}{2} \cdot$$

$$\left\{\sin\left(\omega_2 \cdot t - \gamma - \frac{4\pi}{12} + \omega_2 \cdot t + \alpha - \frac{4\pi}{12}\right) - \right.$$

$$\left.\sin\left(\omega_2 \cdot t - \gamma - \frac{4\pi}{12} - \omega_2 \cdot t - \alpha + \frac{4\pi}{12}\right)\right\} + \frac{1}{2} \cdot$$

$$\left\{\sin\left(\omega_2 \cdot t - \gamma - \frac{6\pi}{12} + \omega_2 \cdot t + \alpha - \frac{6\pi}{12}\right) - \right.$$

$$\left.\sin\left(\omega_2 \cdot t - \gamma - \frac{6\pi}{12} - \omega_2 \cdot t - \alpha + \frac{6\pi}{12}\right)\right\} + \frac{1}{2} \cdot$$

$$\left\{\sin\left(\omega_2 \cdot t - \gamma - \frac{8\pi}{12} + \omega_2 \cdot t + \alpha - \frac{8\pi}{12}\right) - \right.$$

$$\left.\sin\left(\omega_2 \cdot t - \gamma - \frac{8\pi}{12} - \omega_2 \cdot t - \alpha + \frac{8\pi}{12}\right)\right\} + \frac{1}{2} \cdot$$

$$\left\{\sin\left(\omega_2 \cdot t - \gamma - \frac{10\pi}{12} + \omega_2 \cdot t + \alpha - \frac{10\pi}{12}\right) - \right.$$

$$\left.\sin\left(\omega_2 \cdot t - \gamma - \frac{10\pi}{12} - \omega_2 \cdot t - \alpha + \frac{10\pi}{12}\right)\right\} + \frac{1}{2} \cdot$$

$$\left\{\sin\left(\omega_2 \cdot t - \gamma - \frac{12\pi}{12} + \omega_2 \cdot t + \alpha - \frac{12\pi}{12}\right) - \right.$$

$$\left.\sin\left(\omega_2 \cdot t - \gamma - \frac{12\pi}{12} - \omega_2 \cdot t - \alpha + \frac{12\pi}{12}\right)\right\} + \frac{1}{2} \cdot$$

$$\left\{\sin\left(\omega_2 \cdot t - \gamma - \frac{14\pi}{12} + \omega_2 \cdot t + \alpha - \frac{14\pi}{12}\right) - \right.$$

$$\left.\sin\left(\omega_2 \cdot t - \gamma - \frac{14\pi}{12} - \omega_2 \cdot t - \alpha + \frac{14\pi}{12}\right)\right\} + \frac{1}{2} \cdot$$

$$\left\{\sin\left(\omega_2 \cdot t - \gamma - \frac{16\pi}{12} + \omega_2 \cdot t + \alpha - \frac{16\pi}{12}\right) - \right.$$

$$\left.\sin\left(\omega_2 \cdot t - \gamma - \frac{16\pi}{12} - \omega_2 \cdot t - \alpha + \frac{16\pi}{12}\right)\right\} + \frac{1}{2} \cdot$$

$$\left\{\sin\left(\omega_2 \cdot t - \gamma - \frac{18\pi}{12} + \omega_2 \cdot t + \alpha - \frac{18\pi}{12}\right) - \right.$$

$$\left.\sin\left(\omega_2 \cdot t - \gamma - \frac{18\pi}{12} - \omega_2 \cdot t - \alpha + \frac{18\pi}{12}\right)\right\} + \frac{1}{2} \cdot$$

$$\left\{\sin\left(\omega_2 \cdot t - \gamma - \frac{20\pi}{12} + \omega_2 \cdot t + \alpha - \frac{20\pi}{12}\right) - \right.$$

$$\left.\sin\left(\omega_2 \cdot t - \gamma - \frac{20\pi}{12} - \omega_2 \cdot t - \alpha + \frac{20\pi}{12}\right)\right\} + \frac{1}{2} \cdot$$

$$\left\{\sin\left(\omega_2 \cdot t - \gamma - \frac{22\pi}{12} + \omega_2 \cdot t + \alpha - \frac{22\pi}{12}\right) - \right.$$

$$\left.\left.\sin\left(\omega_2 \cdot t - \gamma - \frac{22\pi}{12} - \omega_2 \cdot t - \alpha + \frac{22\pi}{12}\right)\right\}\right]$$

$$= 2\mu \cdot lm_2 \cdot n \cdot Ic_2(t) \cdot \left[\frac{1}{2}\{\sin(2\omega_2 \cdot t - \gamma + \alpha) + \sin(\gamma + \alpha)\} + \right.$$

$$\frac{1}{2}\left\{\sin\left(2\omega_2 \cdot t - \gamma + \alpha - \frac{4\pi}{12}\right) + \sin(\gamma + \alpha)\right\} +$$

$$\frac{1}{2}\left\{\sin\left(2\omega_2 \cdot t - \gamma + \alpha - \frac{8\pi}{12}\right) + \sin(\gamma + \alpha)\right\} +$$

$$\frac{1}{2}\left\{\sin\left(2\omega_2 \cdot t - \gamma + \alpha - \frac{12\pi}{12}\right) + \sin(\gamma + \alpha)\right\} +$$

$$\frac{1}{2}\left\{\sin\left(2\omega_2 \cdot t - \gamma + \alpha - \frac{16\pi}{12}\right) + \sin(\gamma + \alpha)\right\} +$$

$$\frac{1}{2}\left\{\sin\left(2\omega_2 \cdot t - \gamma + \alpha - \frac{20\pi}{12}\right) + \sin(\gamma + \alpha)\right\} +$$

-continued $$\frac{1}{2}\left\{\sin\left(2\omega_2 \cdot t - \gamma + \alpha - \frac{24\pi}{12}\right) + \sin(\gamma + \alpha)\right\} +$$

$$\frac{1}{2}\left\{\sin\left(2\omega_2 \cdot t - \gamma + \alpha - \frac{28\pi}{12}\right) + \sin(\gamma + \alpha)\right\} +$$

$$\frac{1}{2}\left\{\sin\left(2\omega_2 \cdot t - \gamma + \alpha - \frac{32\pi}{12}\right) + \sin(\gamma + \alpha)\right\} +$$

$$\frac{1}{2}\left\{\sin\left(2\omega_2 \cdot t - \gamma + \alpha - \frac{36\pi}{12}\right) + \sin(\gamma + \alpha)\right\} +$$

$$\frac{1}{2}\left\{\sin\left(2\omega_2 \cdot t - \gamma + \alpha - \frac{40\pi}{12}\right) + \sin(\gamma + \alpha)\right\} +$$

$$\frac{1}{2}\left\{\sin\left(2\omega_2 \cdot t - \gamma + \alpha - \frac{44\pi}{12}\right) + \sin(\gamma + \alpha)\right\}\Big]$$

$$= \mu \cdot Im_2 \cdot n \cdot Ic_2(t) \cdot \{\sin(2\omega_2 \cdot t - \gamma + \alpha) +$$

$$\sin\left(2\omega_2 \cdot t - \gamma + \alpha - \frac{4\pi}{12}\right) + \sin\left(2\omega_2 \cdot t - \gamma + \alpha - \frac{8\pi}{12}\right) +$$

$$\sin\left(2\omega_2 \cdot t - \gamma + \alpha - \frac{12\pi}{12}\right) + \sin\left(2\omega_2 \cdot t - \gamma + \alpha - \frac{16\pi}{12}\right) +$$

$$\sin\left(2\omega_2 \cdot t - \gamma + \alpha - \frac{20\pi}{12}\right) + \sin\left(2\omega_2 \cdot t - \gamma + \alpha - \frac{24\pi}{12}\right) +$$

$$\sin\left(2\omega_2 \cdot t - \gamma + \alpha - \frac{28\pi}{12}\right) + \sin\left(2\omega_2 \cdot t - \gamma + \alpha - \frac{32\pi}{12}\right) +$$

$$\sin\left(2\omega_2 \cdot t - \gamma + \alpha - \frac{36\pi}{12}\right) + \sin\left(2\omega_2 \cdot t - \gamma + \alpha - \frac{40\pi}{12}\right) +$$

$$\sin\left(2\omega_2 \cdot t - \gamma + \alpha - \frac{44\pi}{12}\right) + 12\sin(\gamma + \alpha)\}$$

$$= \mu \cdot Im_2 \cdot n \cdot Ic_2(t) \cdot \{\sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + \sin(2\omega_2 \cdot t - \gamma + \alpha) +$$

$$\sin\left(2\omega_2 \cdot t - \gamma + \alpha - \frac{\pi}{3}\right) + \sin\left(2\omega_2 \cdot t - \gamma + \alpha - \frac{2\pi}{3}\right) -$$

$$\sin(2\omega_2 \cdot t - \gamma + \alpha) - \sin\left(2\omega_2 \cdot t - \gamma + \alpha - \frac{\pi}{3}\right) -$$

$$\sin\left(2\omega_2 \cdot t - \gamma + \alpha - \frac{2\pi}{3}\right) + 12\sin(\gamma + \alpha)\}$$

$$= 12\mu \cdot Im_2 \cdot n \cdot Ic_2(t) \cdot \sin(\gamma + \alpha)$$

(2-6-3) Summary

Comparing equation (37) obtained when the inner rotating magnetic fields are supplied by a twelve-phase alternating current with the above-mentioned equation (31) obtained when the inner rotating magnetic fields are supplied by a three-phase alternating current (31), the constant term of equation (37), i.e., the last term, is four times that of equation (31).

In other words, when the inner magnet is driven by a twelve-phase alternating current (Ii–Ixii), the drive torque obtained is four times that when the inner magnet is driven by a three-phase alternating current.

In other words, the inner magnets drive current required to exert the same drive torque on the inner *magnets $m_2$, is only one fourth of that when a three-phase alternating current is applied.

(3) N(3(2p)-2p) Type (3-1) When the Magnetic Pole Number Ratio is 3:1

Figure 14:
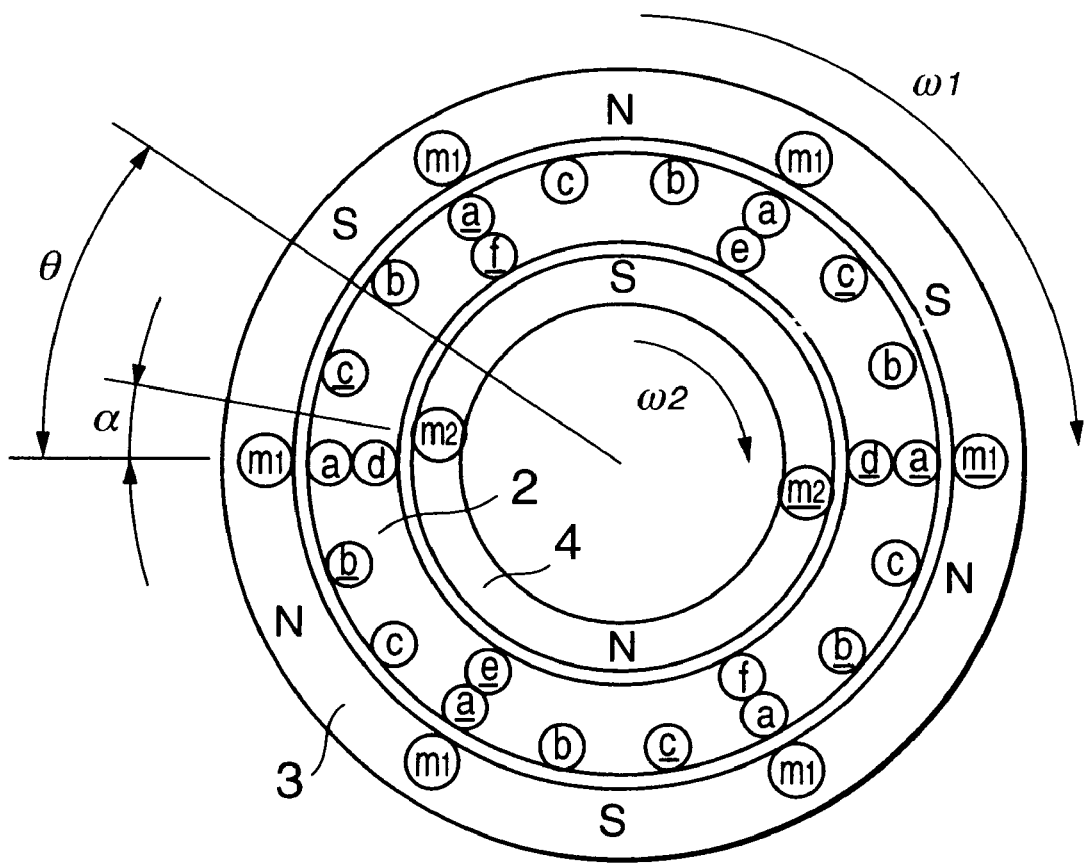
FIG. 14 is similar to FIG. 10, but showing a case where the pole number ratio is 3:1.

Taking a motor/generator of FIG. 14 as an example, the magnetic pole number ratio is 3:1 when the magnetic pole number of the outer magnets $m_2$ is 6 and the magnetic pole number of the inner magnets $m_1$ is 2.

In this construction, the magnetic flux densities $B_1$ and $B_2$ generated by the outer and inner permanent magnets are expressed by the following equations (41), (42).

$$B_1 = Bm_1 \cdot \sin(3\omega_1 \cdot t - 3\theta) = \mu \cdot Im_1 \cdot \sin(3\omega_1 \cdot t - 3\theta) \quad (41)$$

$$B_2 = Bm_2 \cdot \sin(\omega_2 \cdot t + \alpha - \theta) = \mu \cdot Im_2 \cdot \sin(\omega_2 \cdot t + \alpha - \theta) \quad (42)$$

The rotating magnetic fields produced by the coils 6 of the stator 2 are calculated separately for the outer rotor 3 and inner rotor 4. The magnetic flux densities $Bc_1$, $Bc_2$ of the coils 6 relative to the outer magnets $m_1$ and inner magnets $m_2$ are expressed by the following equations (43), (44).

$$Bc_1 = \qquad (43)$$
$$\mu \cdot n \cdot \left\{ Ica(t) \cdot \sin(3\theta) + Icb(t) \cdot \sin\left(3\theta - \frac{2\pi}{3}\right) + Icc(t) \cdot \sin\left(3\theta - \frac{4\pi}{3}\right) \right\}$$

$$Bc_2 = \mu \cdot n \cdot \left\{ Icd(t) \cdot \sin\theta + Ice(t) \cdot \sin\left(\theta - \frac{2\pi}{3}\right) + Icf(t) \cdot \sin\left(\theta - \frac{4\pi}{3}\right) \right\} \quad (44)$$

The variation of the aforesaid magnetic flux densities $B_1$, $B_2$ and Bc, $Bc_2$ are shown in FIGS. 15A–15D.

The total magnetic flux density B is expressed by the following equation.

$$B = B_1 + B_2 + Bc_1 + Bc_2 \qquad (45)$$

$$= \mu \cdot Im_1 \cdot \sin(3\omega_1 \cdot t - 3\theta) + \mu \cdot Im_2 \cdot \sin(\omega_2 \cdot t + \alpha - \theta) +$$

$$\mu \cdot n \cdot \left\{ Ica(t) \cdot \sin(3\theta) + Icb(t) \cdot \sin\left(3\theta - \frac{2\pi}{3}\right) + Icc(t) \cdot \right.$$

$$\sin\left(3\theta - \frac{4\pi}{3}\right) \right\} + \mu \cdot n \cdot \{Icd(t) \cdot \sin\theta + Ice(t) \cdot$$

$$\left. \sin\left(\theta - \frac{2\pi}{3}\right) + Icf(t) \cdot \sin\left(\theta - \frac{4\pi}{3}\right) \right\}$$

Here, let the torque acting on the outer rotor 3 be $\tau_1$. If the force which acts on a semicircle of the outer rotor 3 is $f_1$, the force which then acts on the other semicircle is also $f_1$. Therefore, the force acting on the whole circumference is $2f_1$, and the torque $\tau_1$ may be expressed by the following equation.

$$\tau_1 = 2f_1 \cdot r_1$$

where, $r_1$=distance to outer magnets from center axis of outer rotor.

As three equivalent direct currents are formed for one semicircle, $f_1$ is given by the following equation.

$$f_1 = Im_1 B_{1000} + Im_1 \cdot B_{2000} - Im_1 \cdot B_{3000}$$

where, $B_{1000}$ is magnetic flux density B at $\theta = \omega_1 \cdot t$, $B_{2000}$ is | magnetic flux density B at $\theta = \omega_1 \cdot t + 2\pi/3$, and $B_{3000}$ is magnetic flux density B at $\theta = \omega_1 \cdot t + \pi/3$.

Therefore, the above equation can be rewritten as follows.

$$f_1 = \mu \cdot Im_1 \cdot [Im_1 \cdot \sin(3\omega_1 \cdot t - 3\omega_1 \cdot t) + Im_1 \cdot \qquad (46)$$

$$\sin(3\omega_1 \cdot t - 3\omega_1 \cdot t - 2\pi) - Im_1 \cdot \sin(3\omega_1 \cdot t -$$

$$3\omega_1 \cdot t - \pi) + Im_2 \cdot \sin(\omega_2 \cdot t + \alpha - \omega_1 \cdot t) + Im_2 \cdot$$

$$\sin\left(\omega_2 \cdot t + \alpha - \omega_1 \cdot t - \frac{2\pi}{3}\right) - Im_2 \cdot$$

-continued $$\sin\left(\omega_2 \cdot t + \alpha - \omega_1 \cdot t - \frac{\pi}{3}\right) + n \cdot$$

$$\left\{Ica(t) \cdot \sin(3\omega_1 \cdot t) + Icb(t) \cdot \sin\left(3\omega_1 \cdot t - \frac{2\pi}{3}\right) + \right.$$

$$\left. Icc(t) \cdot \sin\left(3\omega_1 \cdot t - \frac{4\pi}{3}\right)\right\} + n \cdot \{Ica(t) \cdot \sin(3\omega_1 \cdot t + 2\pi) +$$

$$Icb(t) \cdot \sin\left(3\omega_1 \cdot t + 2\pi - \frac{2\pi}{3}\right) + Icc(t) \cdot$$

$$\sin\left(3\omega_1 \cdot t + 2\pi - \frac{4\pi}{3}\right)\right\} - n \cdot \{Ica(t) \cdot \sin(3\omega_1 \cdot t + \pi) +$$

$$Icb(t) \cdot \sin\left(3\omega_1 \cdot t + \pi - \frac{2\pi}{3}\right) + Icc(t) \cdot$$

$$\sin\left(3\omega_1 \cdot t + \pi - \frac{4\pi}{3}\right)\right\} + n \cdot \{Icd(t) \cdot \sin(\omega_1 \cdot t) + Ice(t) \cdot$$

$$\sin\left(\omega_1 \cdot t - \frac{2\pi}{3}\right) + Icf(t) \cdot \sin\left(\omega_1 \cdot t - \frac{4\pi}{3}\right)\right\} + n \cdot$$

$$\left\{Icd(t) \cdot \sin\left(\omega_1 \cdot t + \frac{2\pi}{3}\right) + Ice(t) \cdot \sin\left(\omega_1 \cdot t + \frac{2\pi}{3} - \right.\right.$$

$$\left.\left.\frac{2\pi}{3}\right) + Icf(t) \cdot \sin\left(\omega_1 \cdot t + \frac{2\pi}{3} - \frac{4\pi}{3}\right)\right\} - n \cdot$$

$$\left\{Icd(t) \cdot \sin\left(\omega_1 \cdot t + \frac{\pi}{3}\right) + Ice(t) \cdot \sin\left(\omega_1 \cdot t + \frac{\pi}{3} - \frac{2\pi}{3}\right) + \right.$$

$$\left. Icf(t) \cdot \sin\left(\omega_1 \cdot t + \frac{\pi}{3} - \frac{4\pi}{3}\right)\right\}\right]$$

$$= \mu \cdot Im_1 \cdot [n \cdot \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\right\} + n \cdot$$

$$\{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\right\} + n \cdot$$

$$\{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\right\} + n \cdot$$

$$\{Icd(t) \cdot \sin(\omega_1 \cdot t) + Ice(t) \cdot \sin\left(\omega_1 \cdot t - \frac{2\pi}{3}\right) + Icf(t) \cdot$$

$$\sin\left(\omega_1 \cdot t - \frac{4\pi}{3}\right)\right\} + n \cdot \left\{Icd(t) \cdot \sin\left(\omega_1 \cdot t + \frac{2\pi}{3}\right) + Ice(t) \cdot$$

$$\sin(\omega_1 \cdot t) + Icf(t) \cdot \sin\left(\omega_1 \cdot t - \frac{2\pi}{3}\right)\right\} + n \cdot \{Icd(t) \cdot$$

$$\sin\left(\omega_1 \cdot t + \frac{4\pi}{3}\right) + Ice(t) \cdot \sin\left(\omega_1 \cdot t + \frac{2\pi}{3}\right) + Icf(t) \cdot$$

$$\sin(\omega_1 \cdot t)\}]$$

$$= \mu \cdot n \cdot Im_1 \cdot [3 \cdot \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\right\} + Icd(t) \cdot$$

$$\sin(\omega_1 \cdot t) + Icd(t) \cdot \sin\left(\omega_1 \cdot t + \frac{2\pi}{3}\right) + Icd(t) \cdot$$

$$\sin\left(\omega_1 \cdot t + \frac{4\pi}{3}\right) + Ice(t) \cdot \sin(\omega_1 \cdot t) + Ice(t) \cdot$$

$$\sin\left(\omega_1 \cdot t + \frac{2\pi}{3}\right) + Ice(t) \cdot \sin\left(\omega_1 \cdot t + \frac{4\pi}{3}\right) + Icf(t) \cdot$$

$$\sin(\omega_1 \cdot t) + Icf(t) \cdot$$

$$\sin\left(\omega_1 \cdot t + \frac{2\pi}{3}\right) + Icf(t) \cdot \sin\left(\omega_1 \cdot t + \frac{4\pi}{3}\right)\right]$$

$$= 3\mu \cdot Im_1 \cdot n \cdot \{Ica(t) \cdot \sin(3\omega_1 \cdot t) + Icb(t) \cdot$$

-continued $$\sin\left(3\omega_1 \cdot t - \frac{2\pi}{3}\right) + Icc(t) \cdot \sin\left(3\omega_1 \cdot t - \frac{4\pi}{3}\right)\right\}$$

Equation (46) shows that when the magnetic flux density of the outer magnets $m_1$ is approximated to a sine wave, the torque acting on the outer magnets $m_1$ can be controlled by the exciting currents of the coils a, b, c.

It also shows that the torque acting on the outer magnets $m_1$ is not affected by the excitation currents of the coils d, e, f.

Here, let the torque acting on the inner rotor 4 be $\tau_2$. If the force which acts on a semicircle of the inner rotor 4 is $f_2$, the force which then acts the other semicircle is also $f_2$. Therefore, the force acting on the whole circumference is $2f_2$, and the torque $\tau_2$ may be expressed by the following equation.

$$\tau_2 = 2f_2 \cdot r_2$$

where, $r_2$=distance from center axis of inner rotor 4 to inner magnets $m_2$.

Here, the force $f_2$ is a drive force which an equivalent direct current $Im_2$ generates in a magnetic field of magnetic flux density B. As an equivalent direct current is formed for each semicircle, $f_2$ is given by the following equation.

$$f_2 = Im_2 \cdot B$$

where, $\theta = \omega_2 \cdot t + \alpha$.

From this equation and equation (45), $f_2$ may be expressed by the following equation (47).

$$f_2 = \mu \cdot Im_2 \cdot [Im_1 \cdot \sin(3\omega_1 \cdot t - 3\omega_2 \cdot t - 3\alpha) + \mu \cdot Im_2 \cdot \quad (47)$$

$$\sin(\omega_2 \cdot t + \alpha - \omega_2 \cdot t - \alpha) + n \cdot \{Ica(t) \cdot \sin(3\omega_2 \cdot t + 3\alpha) +$$

$$Icb(t) \cdot \sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\right\} + n\{Icd(t) \cdot \sin(\omega_2 \cdot t + \alpha) +$$

$$Ice(t) \cdot \sin\left(\omega_2 \cdot t + \alpha - \frac{2\pi}{3}\right) + Icf(t) \cdot$$

$$\sin\left(\omega_2 \cdot t + \alpha - \frac{4\pi}{3}\right)\right]$$

$$= \mu \cdot Im_2 \cdot [Im_1 \cdot \sin\{3(\omega_1 - \omega_2)t - 3\alpha\} + n \cdot \{Ica(t) \cdot$$

$$\sin(3\omega_2 \cdot t + 3\alpha) + Icb(t) \cdot \sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\right\} + n \cdot \{Icd(t) \cdot \sin(\omega_2 \cdot t + \alpha) +$$

$$Ice(t) \cdot \sin\left(\omega_2 \cdot t + \alpha - \frac{2\pi}{3}\right) + Icf(t) \cdot$$

$$\sin\left(\omega_2 \cdot t + \alpha - \frac{4\pi}{3}\right)\right]$$

The second term in equation (47) shows that the torque acting on the inner magnets $m_2$ is evidently affected by the exciting currents of the coils a, b, c for the outer magnets $m_1$. However, this is an apparent effect, and there is actually no effect due to the following reason.

If the positions of the outer magnets $m_1$ are $\phi_1 = \omega_1 \cdot t + \pi/6$, $\phi_2 = \omega_1 \cdot t + 5\pi/6$, $\phi_3 = \omega_1 \cdot t + 9\pi/6$ respectively, the magnetic flux density $B_1$ of the outer magnets $m_1$ at a rotation angle $\theta$ may be expressed by the following equation.

$$B_1 = Bm_1 \cdot \left\{\cos\left(\omega_1 \cdot t + \frac{\pi}{6} - \theta\right) + \cos\left(\omega_1 \cdot t + \frac{5\pi}{6} - \theta\right) + \cos\left(\omega_1 \cdot t + \frac{9\pi}{6} - \theta\right)\right\}$$

$$= \mu \cdot Im_1 \cdot \left\{\cos\left(\omega_1 \cdot t + \frac{\pi}{6} - \theta\right) + \cos\left(\omega_1 \cdot t + \frac{5\pi}{6} - \theta\right) + \cos\left(\omega_1 \cdot t + \frac{9\pi}{6} - \theta\right)\right\}$$

$$= 0$$

This shows that the magnetic poles formed at 120 degree intervals cancel the magnetic force. In other words, the magnetic pole number of the outer magnets $m_1$ has no effect on the inner magnets $m_2$. Similarly, the magnetic flux density produced by the outer coil is also 0 in total. Therefore, the drive force $f_2$ is as follows.

$$f_2 = \mu \cdot Im_2 \cdot \left[n \cdot \left\{Icd(t) \cdot \sin(\omega_2 \cdot t + \alpha) + Ice(t) \cdot \sin\left(\omega_2 \cdot t + \alpha - \frac{2\pi}{3}\right) + Icf(t) \cdot \sin\left(\omega_2 \cdot t + \alpha - \frac{4\pi}{3}\right)\right\}\right] \quad (48)$$

(3-2) When Both the Outer Rotating Magnetic Fields and Inner Rotating Magnetic Fields are Supplied The alternating currents Ica(t), Icb(t), Icc(t) and alternating currents Icd(t), Ice(t), Icf(t) are expressed by the following equations.

$$Ica(t) = Ic_1 \cdot \cos(3\omega_1 \cdot t - 3\beta) \quad (49A)$$

$$Icb(t) = Ic_1 \cdot \cos\left(3\omega_1 \cdot t - 3\beta - \frac{2\pi}{3}\right) \quad (49B)$$

$$Icc(t) = Ic_1 \cdot \cos\left(3\omega_1 \cdot t - 3\beta - \frac{4\pi}{3}\right) \quad (49C)$$

$$Icd(t) = Ic_2(t) \cdot \cos(\omega_2 \cdot t - \gamma) \quad (50A)$$

$$Ice(t) = Ic_2(t) \cdot \cos\left(\omega_2 \cdot t - \gamma - \frac{2\pi}{3}\right) \quad (50B)$$

$$Icf(t) = Ic_2(t) \cdot \cos\left(\omega_2 \cdot t - \gamma - \frac{4\pi}{3}\right) \quad (50C)$$

In equations (50A)–(50C), to permit amplitude modulation, the current is assumed to be $Ic_2(t)$ which is a function of time t.

$f_1$, $f_2$ are calculated by substituting equations (49A)–(49C) in equation (46), and substituting equations (49A)–(49C) and (50A)–(50C) in equation (47).

$$f_1 = 3\mu \cdot Im_1 \cdot n \cdot Ic_1 \cdot \{\cos(3\omega_1 \cdot t - 3\beta) \cdot \sin(3\omega_1 \cdot t)$$

$$f_1 = 3\mu \cdot Im_1 \cdot n \cdot Ic_1 \cdot \{\cos(3\omega_1 \cdot t - 3\beta) \cdot \sin(3\omega_1 \cdot t) + \cos\left(3\omega_1 \cdot t - 3\beta - \frac{2\pi}{3}\right) \cdot \sin\left(3\omega_1 \cdot t - \frac{2\pi}{3}\right) + \cos\left(3\omega_1 \cdot t - 3\beta - \frac{4\pi}{3}\right) \cdot \sin\left(3\omega_1 \cdot t - \frac{4\pi}{3}\right)\}$$

Here, the above equation may be rewritten using the formula $\cos(a) \cdot \sin(b) = \frac{1}{2} \{\sin(a+b) - \sin(a-b)\}$.

$$f_1 = 3\mu \cdot Im_1 \cdot n \cdot Ic_1 \cdot \left[\frac{1}{2} \cdot \{\sin(3\omega_1 \cdot t - 3\beta + 3\omega_1 \cdot t) - \sin(3\omega_1 \cdot t - 3\beta - 3\omega_1 \cdot t)\} + \frac{1}{2} \cdot \left\{\sin\left(3\omega_1 \cdot t - 3\beta - \frac{2\pi}{3} + 3\omega_1 \cdot t - \frac{2\pi}{3}\right) - \sin\left(3\omega_1 \cdot t - 3\beta - \frac{2\pi}{3} - 3\omega_1 \cdot t + \frac{2\pi}{3}\right)\right\} + \frac{1}{2} \cdot \left\{\sin\left(3\omega_1 \cdot t - 3\beta - \frac{4\pi}{3} + 3\omega_1 \cdot t - \frac{4\pi}{3}\right) - \sin\left(3\omega_1 \cdot t - 3\beta - \frac{4\pi}{3} - 3\omega_1 \cdot t + \frac{4\pi}{3}\right)\right\}\right] \quad (51)$$

$$= \frac{3}{2} \cdot \mu \cdot Im_1 \cdot n \cdot Ic_1 \cdot$$

$$\left\{\sin(6\omega_1 \cdot t - 3\beta) + \sin 3\beta + \sin\left(6\omega_1 \cdot t - 3\beta - \frac{4\pi}{3}\right) + \sin 3\beta + \sin\left(6\omega_1 \cdot t - 3\beta - \frac{8\pi}{3}\right) + \sin 3\beta\right\}$$

$$= \frac{3}{2}\mu \cdot Im_1 \cdot n \cdot Ic_1 \cdot$$

$$\left\{\sin(6\omega_1 \cdot t - 3\beta) + \sin\left(6\omega_1 \cdot t - 3\beta - \frac{4\pi}{3}\right) + \sin\left(6\omega_1 \cdot t - 3\beta - \frac{8\pi}{3}\right) + 3\sin 3\beta\right\}$$

$$= \frac{9}{2} \cdot \mu \cdot Im_1 \cdot n \cdot Ic_1 \cdot \sin 3\beta$$

$$f_2 = \mu \cdot Im_2 \cdot [Im_1 \cdot \sin\{3(\omega_1 - \omega_2)t - 3\alpha\} + n \cdot Ic_1 \cdot \{\cos(3\omega_1 \cdot t - 3\beta) \cdot \sin(3\omega_2 \cdot t + 3\alpha) + \cos\left(3\omega_1 \cdot t - 3\beta - \frac{2\pi}{3}\right) \cdot \sin\left(3\omega_2 \cdot t + 3\alpha - \frac{2\pi}{3}\right) + \cos\left(3\omega_1 \cdot t - 3\beta - \frac{4\pi}{3}\right) \cdot \sin\left(3\omega_2 \cdot t + 3\alpha - \frac{4\pi}{3}\right)\} + n \cdot Ic_2(t) \cdot \{\cos(\omega_2 \cdot t - \gamma) \cdot \sin(\omega_2 \cdot t + \alpha) + \cos\left(\omega_2 \cdot t - \gamma - \frac{2\pi}{3}\right) \cdot \sin\left(\omega_2 \cdot t + \alpha - \frac{2\pi}{3}\right) + \cos\left(\omega_2 \cdot t - \gamma - \frac{4\pi}{3}\right) \cdot \sin\left(\omega_2 \cdot t + \alpha - \frac{4\pi}{3}\right)\}]$$

Here, the above equation may be rewritten using the expression $\cos(a) \cdot \sin(b) = \frac{1}{2} \{\sin(a+b) - \sin(a-b)\}$.

$$f_2 = \mu \cdot Im_2 \cdot [Im_1 \cdot \sin\{3(\omega_1 - \omega_2) \cdot t - 3\alpha\} + n \cdot Ic_1 \cdot \quad (52)$$

$$\left[\frac{1}{2} \cdot \{\sin(3\omega_1 \cdot t - 3\beta + 3\omega_2 \cdot t + 3\alpha) - \sin(3\omega_1 \cdot t - 3\beta + 3\omega_2 \cdot t - 3\alpha)\} + \frac{1}{2} \cdot \left\{\sin\left(3\omega_1 \cdot t - 3\beta - \frac{2\pi}{3} + 3\omega_2 \cdot t + 3\alpha - \frac{2\pi}{3}\right) - \sin\left(3\omega_1 \cdot t - 3\beta - \frac{2\pi}{3} - 3\omega_2 \cdot t - 3\alpha + \frac{2\pi}{3}\right)\right\} + \frac{1}{2} \cdot \left\{\sin\left(3\omega_1 \cdot t - 3\beta - \frac{4\pi}{3} + 3\omega_2 \cdot t + 3\alpha - \frac{4\pi}{3}\right) - \sin\left(3\omega_1 \cdot t - 3\beta - \frac{4\pi}{3} - 3\omega_2 \cdot t - 3\alpha + \frac{4\pi}{3}\right)\right\}\right] + n \cdot$$

-continued $$Ic_2(t) \cdot \left[\frac{1}{2} \cdot \{\sin(\omega_2 \cdot t - \gamma + \omega_2 \cdot t + \alpha) - \sin(\omega_2 \cdot t - \gamma - \omega_2 \cdot t - \alpha)\} + \frac{1}{2} \cdot \right.$$

$$\left\{\sin\left(\omega_2 \cdot t - \gamma - \frac{2\pi}{3} + \omega_2 \cdot t + \alpha - \frac{2\pi}{3}\right) - \sin\left(\omega_2 \cdot t - \gamma - \frac{2\pi}{3} - \omega_2 \cdot t - \alpha + \frac{2\pi}{3}\right)\right\} + \frac{1}{2} \cdot$$

$$\left\{\sin\left(\omega_2 \cdot t - \gamma - \frac{4\pi}{3} + \omega_2 \cdot t + \alpha - \frac{4\pi}{3}\right) - \sin\left(\omega_2 \cdot t - \gamma - \frac{4\pi}{3} + \omega_2 \cdot t - \alpha + \frac{4\pi}{3}\right)\right\}\right]$$

$$= \mu \cdot Im_2 \cdot \left[Im_1 \cdot \sin\{3(\omega_1 - \omega_2) \cdot t - 3\alpha\} + \frac{1}{2} \cdot n \cdot Ic_1 \cdot \right.$$

$$\{\sin(3\omega_1 \cdot t + 3\omega_2 \cdot t - 3\beta + 3\alpha) +$$

$$\sin\left(3\omega_1 \cdot t + 3\omega_2 \cdot t - 3\beta + 3\alpha - \frac{4\pi}{3}\right) +$$

$$\sin\left(3\omega_1 \cdot t + 3\omega_2 \cdot t - 3\beta + 3\alpha - \frac{8\pi}{3}\right) -$$

$$3\sin(3\omega_1 \cdot t - 3\beta + 3\omega_2 \cdot t - 3\alpha)\} + \frac{1}{2} \cdot n \cdot Ic_2(t) \cdot$$

$$\left\{\sin(2\omega_2 \cdot t - \gamma + \alpha) + \sin\left(2\omega_2 \cdot t - \gamma + \alpha - \frac{4\pi}{3}\right) + \right.$$

$$\left.\sin\left(2\omega_2 \cdot t - \gamma + \alpha - \frac{8\pi}{3}\right) + 3\sin(\gamma + \alpha)\right\}\right]$$

$$= \mu \cdot Im_2 \cdot \left[Im_1 \cdot \sin\{3(\omega_1 - \omega_2) \cdot t - 3\alpha\} + \frac{1}{2} \cdot n \cdot Ic_1 \cdot \right.$$

$$\{\sin(3\omega_1 \cdot t + 3\omega_2 \cdot t - 3\beta + 3\alpha) +$$

$$\sin\left(3\omega_1 \cdot t + 3\omega_2 \cdot t - 3\beta + 3\alpha - \frac{2\pi}{3}\right) +$$

$$\sin\left(3\omega_1 \cdot t + 3\omega_2 \cdot t - 3\beta + 3\alpha - \frac{4\pi}{3}\right) -$$

$$3\sin(3\omega_1 \cdot t - 3\beta - 3\omega_2 \cdot t - 3\alpha)\} + \frac{1}{2} \cdot n \cdot Ic_2(t) \cdot$$

$$\left\{\sin(2\omega_2 \cdot t - \gamma + \alpha) + \sin\left(2\omega_2 \cdot t - \gamma + \alpha - \frac{2\pi}{3}\right) + \right.$$

$$\left.\sin\left(2\omega_2 \cdot t - \gamma + \alpha - \frac{4\pi}{3}\right) + 3\sin(\gamma + \alpha)\right\}\right]$$

$$= \mu \cdot Im_2 \cdot \left[Im_1 \cdot \sin\{3(\omega_1 - \omega_2) \cdot t - 3\alpha\} - \frac{3}{2} \cdot n \cdot Ic_1 \cdot \right.$$

$$\left.\sin(3\omega_1 \cdot t - 3\beta - 3\omega_2 \cdot t - 3\alpha) + \frac{3}{2} \cdot n \cdot Ic_2(t) \cdot \sin(\gamma + \alpha)\right]$$

As described with regard to equation (48), $f_2$ is a constant value when there is no effect of the outer magnets $m_1$ and outer coils a, c, b as shown by the following equation (53).

$$f_2 = \frac{3}{2} \cdot \{n \cdot Ic_2(t) \cdot \sin(\gamma + \alpha)\} \quad (53)$$

Conversely, when there is an effect from the magnetic field due to the outer magnets $m_1$ and outer coils, if $Ic_2(t)$ is set by the following equation (54), $ff_2=C$ (constant) in the equation (52) and the motor/generator can be driven by a constant torque.

$$\frac{2}{3} \cdot \frac{C}{\mu \cdot Im_2} - Im_1 \cdot \sin\{3(\omega_1 - \omega_2)t - 3\alpha\} + \quad (54)$$

$$Ic_2(t) = \frac{n \cdot Ic_1 \cdot \sin(3\omega_1 \cdot t - 3\beta - 3\omega_2 \cdot t - 3\alpha)}{n \cdot \sin(\gamma + \alpha)}$$

Figure 16A:
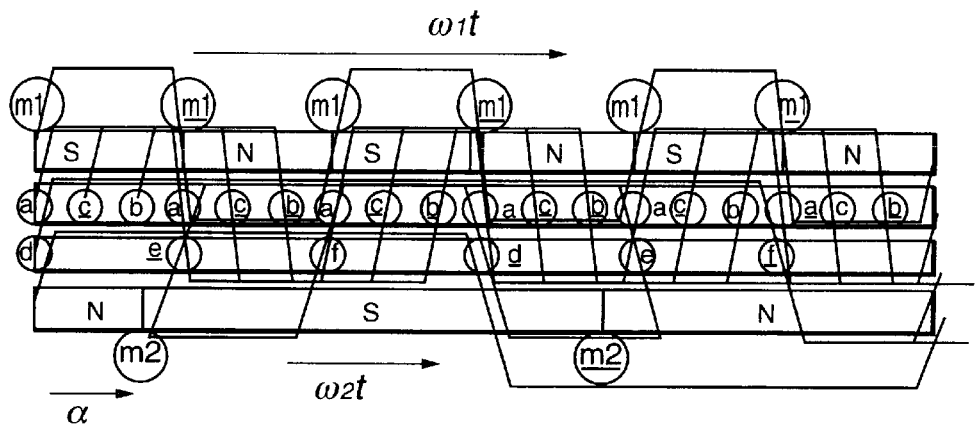
FIGS. 16A–16C are diagrams describing magnetic interference in the motor/generator of FIG. 14.
Figure 16B:
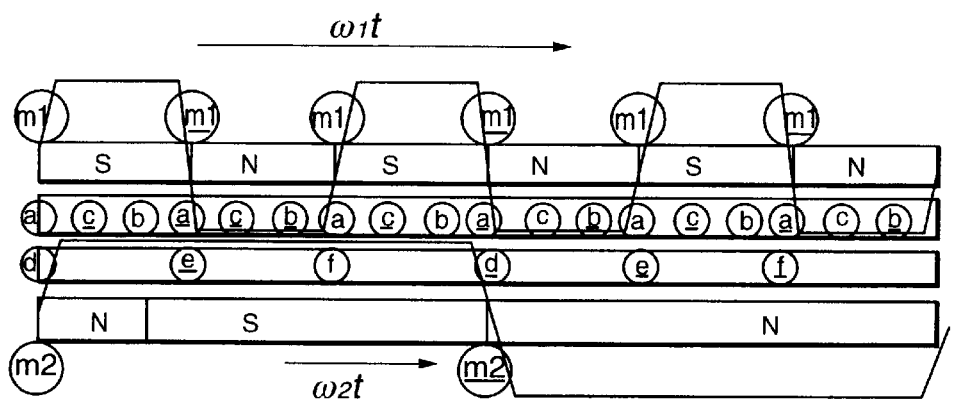
Figure 16C:
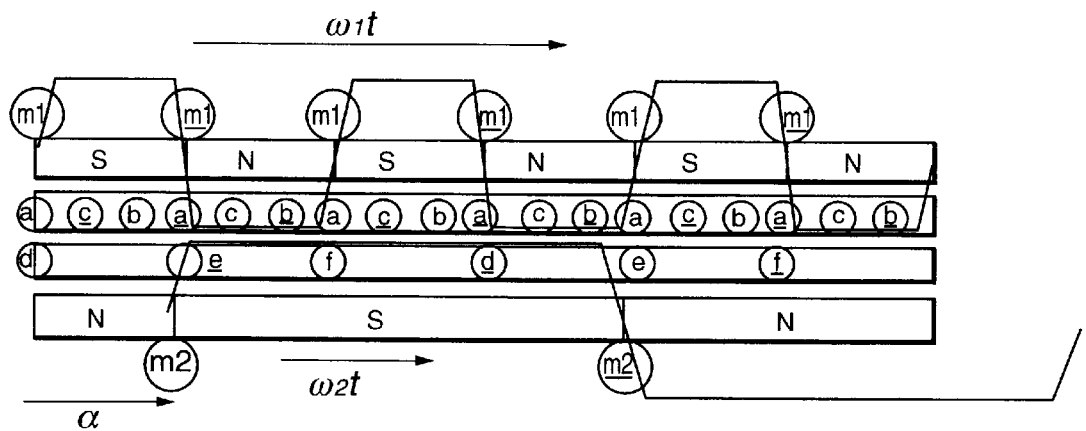

In other words, this means that according to equation (52), some effect of the outer magnets $m_1$ is generated relative to the rotation of the inner magnets $m_2$ when the magnetic pole number ratio is 3:1. More precisely, a constant torque fluctuation based on the phase difference ($\omega_1-\omega_2$) occurs in the rotational torque of the inner magnets $m_2$. This situation is shown in FIGS. 16A–16C.

If a magnetic field is assumed to be rectangular in a model representation, the magnetic force interference between the outer magnets and inner magnets may be clearly expressed.

Comparing state A with state B, as state B is stable, a torque is generated in state A which tends to shift to state B. This torque is an intermittent torque and is generated by a phase difference ($\omega_1-\omega_2$). Further, as a perfect sine wave cannot be realized due to the effect of distance between coils, it may be impossible to completely eliminate the effect of the outer magnets. The most extreme example of such case is expressed by equation (52). However, a torque fluctuation can be eliminated in most cases by applying amplitude modulation from equation (54), and the inner magnet can be driven with a constant torque even when the magnetic pole number ratio is 3:1.

(3-3) Summary

According to equations (51), (52), when currents are passed through the coils of the stator 2 in synchronism with the rotations of the outer magnets $m_1$ and inner magnets $m_2$, a rotational torque acts on both permanent magnets.

It will of course be understood that when currents are passed through the coils of the stator in synchronism with the rotation of the outer magnets $m_1$, a rotational torque acts only the outer magnets $m_1$, and when currents are passed through the coils of the stator in synchronism with the rotation of the inner magnets $m_2$, a rotational torque acts only the inner magnets $m_2$.

This fact shows that also in the case where the magnetic pole number ratio is 3:1, the two rotors 3, 4 can be driven as a generator and a motor using one series of the coils 6.

(3-4) Current Settings

In FIG. 14, one series of coils a, c, b are assumed to generate the outer rotating magnetic fields, and another series of coils d, f, e are assumed to generate the inner rotating magnetic fields.

Figure 17:
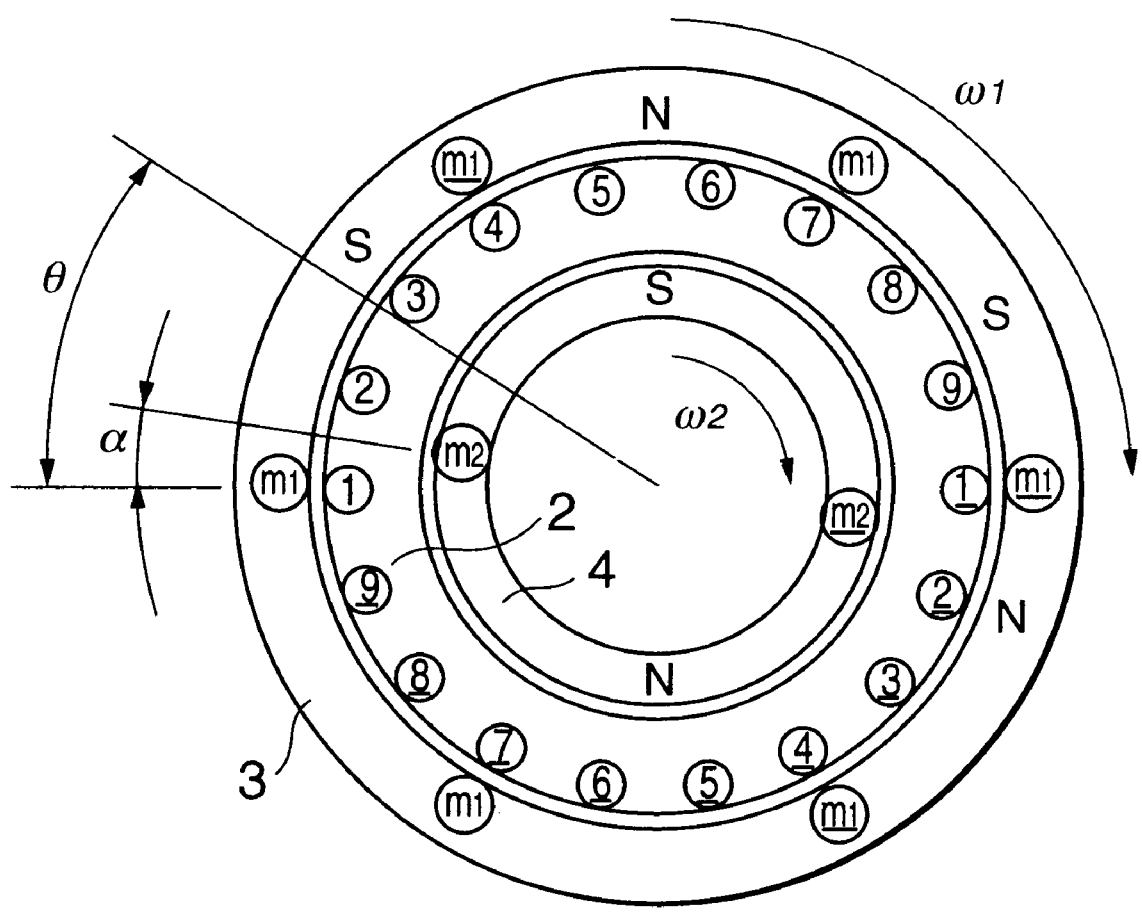
FIG. 17 is similar to FIG. 14, but showing a case where the coils of the inner circumference and the coil of the outer circumference of the stator are common.

In the real motor/generator according to this invention, these coils are integrated as shown in FIG. 17. Specifically, the coils a and d, a and f, a and e, a and d, a and f, a and e in FIG. 14 are respectively integrated to coils #1, #4, #7, #<u>1</u>, #<u>4</u> and #<u>7</u>.

In view of the construction of FIG. 17, the currents passing through the coils 6 of the stator 2 may be set as follows.

$I_1 = Ia + Id$    $I_{10} = \underline{I_1} = \underline{Ia} + \underline{Id}$ $I_2 = Ic$    $I_{11} = \underline{I_2} = Ic$ $I_3 = Ib$    $I_{12} = \underline{I_3} = \underline{Ib}$ $I_4 = Ia + \underline{If}$    $I_{13} = \underline{I_4} = Ia + If$ $I_5 = Ic$    $I_{14} = \underline{I_5} = \underline{Ic}$ $I_6 = \underline{Ib}$   $I_{15} = \underline{I_6} = Ib$ $I_7 = Ia + Ie$   $I_{16} = \underline{Ia + Ie}$ $I_8 = \underline{Ic}$   $I_{17} = \underline{I_8} = Ic$ $I_9 = Ib$   $I_{18} = \underline{I_9} = \underline{Ib}$ When the magnetic pole number ratio is 3:1, an eighteen-phase alternating current is required, but the phase is reversed over half the circumference, so a nine-phase alternating current (half of eighteen-phase) may be used.

In this case as the load on coils #1, #4, #7, #1, #4 and #7 is heavy, it is desirable to use also the remaining coils in order to form the inner rotating magnetic fields. For example, the following current settings are recommended.

$I_1 = Ia + Ii$   $I_{10} = \underline{I_1} = Ia + Ii$ $I_2 = Ic + \underline{Ivi}$   $I_{11} = \underline{I_2} = Ic + Ivi$ $I_3 = Ib + Iii$   $I_{12} = \underline{I_3} = Ib + \underline{Iii}$ $I_4 = Ia + Ivii$   $I_{13} = \underline{I_4} = Ia + Ivii$ $I_5 = Ic + Iiii$   $I_{14} = \underline{I_5} = Ic + \underline{Iiii}$ $I_6 = Ib + \underline{Iviii}$   $I_{15} = \underline{I_6} = Ib + Iviii$ $I_7 = Ia + Iiv$   $I_{16} = \underline{I_7} = Ia + \underline{Iiv}$ $I_8 = Ic + Iix$   $I_{17} = \underline{I_8} = Ic + Iix$ $I_9 = Ib + Iv$   $I_{18} = \underline{I_9} = Ib + Iv$ The phases of the currents Ii–Iix and <u>Ii</u>–<u>Iix</u> for forming the inner rotating magnetic fields are shown in FIGS. 18A and 18B.

(3-5) When the Inner Rotating Magnetic Fields with Nine-phase Alternating Current are Supplied (3-5-1) Magnetic Flux Density $Bc_2$ The magnetic flux density $Bc_2$ when the inner rotating magnetic fields are produced by nine-phase alternating current is expressed by the following equation (55).

$$Bc_2 = \mu \cdot n \cdot \{Ici(t) \cdot \sin\theta + Icii(t) \cdot \sin\left(\theta - \frac{2\pi}{9}\right) + Iciii(t) \cdot \sin\left(\theta - \frac{4\pi}{9}\right) + \quad (55)$$

$$Iciv(t) \cdot \sin\left(\theta - \frac{6\pi}{9}\right) + Icv(t) \cdot \sin\left(\theta - \frac{8\pi}{9}\right) +$$

$$Icvi(t) \cdot \sin\left(\theta - \frac{10\pi}{9}\right) + Icvii(t) \cdot \sin\left(\theta - \frac{12\pi}{9}\right) +$$

$$Icviii(t) \cdot \sin\left(\theta - \frac{14\pi}{9}\right) + Icix(t) \cdot \sin\left(\theta - \frac{16\pi}{9}\right)\}$$

The total magnetic flux density B is expressed as follows.

$$B = B_1 + B_2 + Bc_1 + Bc_2 \quad (56)$$

$$= \mu \cdot Im_1 \cdot \sin(3\omega_1 \cdot t - 3\theta) + \mu \cdot Im_2 \cdot \sin(\omega_2 \cdot t + \alpha - \theta) +$$

$$\mu \cdot n \cdot \{Ica(t) \cdot \sin(3\theta) + Icb(t) \cdot \sin\left(3\theta - \frac{2\pi}{3}\right) + Icc(t) \cdot$$

$$\sin\left(3\theta - \frac{4\pi}{3}\right)\} + \mu \cdot n \cdot \{Ici(t) \cdot \sin\theta + Icii(t) \cdot \sin\left(\theta - \frac{2\pi}{9}\right) +$$

$$Iciii(t) \cdot \sin\left(\theta - \frac{4\pi}{9}\right) + Iciv(t) \cdot \sin\left(\theta - \frac{6\pi}{9}\right) + Icv(t) \cdot$$

$$\sin\left(\theta - \frac{8\pi}{9}\right) + Icvi(t) \cdot \sin\left(\theta - \frac{10\pi}{9}\right) + Icvii(t) \cdot$$

$$\sin\left(\theta - \frac{12\pi}{9}\right) + Icviii(t) \cdot \sin\left(\theta - \frac{14\pi}{9}\right) + Icix(t) \cdot$$

$$\sin\left(\theta - \frac{16\pi}{9}\right)\}$$

$f_1$ is calculated by the following equation.

$$f_1 = Im_1 \cdot B_{1000} + Im_1 \cdot B_{2000} - Im_1 \cdot B_{3000}$$

where, $B_{1000}$ is magnetic flux density B at $\theta = \omega_1 \cdot t$, $B_{2000}$ is magnetic flux density B at $\theta = \omega_1 \cdot t + 2\pi/3$, and $B_{3000}$ is magnetic flux density B at $\theta = \omega_1 \cdot t + \pi/3$.

Therefore, the above equation can be rewritten as follows.

$$f_1 = \mu \cdot Im_1 \cdot [Im_1 \cdot \{\sin(3\omega_1 \cdot t - 3\omega_1 \cdot t) + \quad (57)$$

$$\sin(3\omega_1 \cdot t - 3\omega_1 \cdot t + 2\pi) - \sin(3\omega_1 \cdot t - 3\omega_1 \cdot t + \pi)\} +$$

$$Im_2 \cdot \{\sin(\omega_2 \cdot t + \alpha - \omega_1 \cdot t) +$$

$$\sin\left(\omega_2 \cdot t + \alpha - \omega_1 \cdot t - \frac{2\pi}{3}\right) -$$

$$\sin\left(\omega_2 \cdot t + \alpha - \omega_1 \cdot t - \frac{\pi}{3}\right)\} + n \cdot [Ica(t) \cdot \{\sin(3\omega_1 \cdot t) +$$

$$\sin(3\omega_1 \cdot t + 2\pi) - \sin(3\omega_1 \cdot t + \pi)\} + Icb(t) \cdot$$

$$\{\sin\left(3\omega_1 \cdot t - \frac{2\pi}{3}\right) + \sin\left(3\omega_1 \cdot t + 2\pi - \frac{2\pi}{3}\right) -$$

$$\sin\left(3\omega_1 \cdot t + \pi - \frac{2\pi}{3}\right)\} + Icc(t) \cdot \{\sin\left(3\omega_1 \cdot t - \frac{4\pi}{3}\right) +$$

$$\sin\left(3\omega_1 \cdot t + 2\pi - \frac{4\pi}{3}\right) - \sin\left(3\omega_1 \cdot t + \pi - \frac{4\pi}{3}\right)\}] + n \cdot$$

$$[Ici(t) \cdot \{\sin(\omega_1 \cdot t) + \sin\left(\omega_1 \cdot t + \frac{2\pi}{3}\right) +$$

$$\sin\left(\omega_1 \cdot t + \frac{\pi}{3}\right)\} + Icii(t) \cdot \{\sin\left(\omega_1 \cdot t - \frac{2\pi}{9}\right) +$$

$$\sin\left(\omega_1 \cdot t - \frac{2\pi}{9} + \frac{2\pi}{3}\right) - \sin\left(\omega_1 \cdot t - \frac{2\pi}{9} + \frac{\pi}{3}\right)\} +$$

$$Iciii(t) \cdot \{\sin\left(\omega_1 \cdot t - \frac{4\pi}{9}\right) + \sin\left(\omega_1 \cdot t - \frac{4\pi}{9} + \frac{2\pi}{3}\right) -$$

$$\sin\left(\omega_1 \cdot t - \frac{4\pi}{9} + \frac{\pi}{3}\right)\} +$$

$$Iciv(t) \cdot \{\sin\left(\omega_1 \cdot t - \frac{6\pi}{9}\right) + \sin\left(\omega_1 \cdot t - \frac{6\pi}{9} + \frac{2\pi}{3}\right) -$$

$$\sin\left(\omega_1 \cdot t - \frac{6\pi}{9} + \frac{\pi}{3}\right)\} +$$

$$Icv(t) \cdot \{\sin\left(\omega_1 \cdot t - \frac{8\pi}{9}\right) + \sin\left(\omega_1 \cdot t - \frac{8\pi}{9} + \frac{2\pi}{3}\right) -$$

$$\sin\left(\omega_1 \cdot t - \frac{8\pi}{9} + \frac{\pi}{3}\right)\} +$$

$$Icvi(t) \cdot \{\sin\left(\omega_1 \cdot t - \frac{10\pi}{9}\right) + \sin\left(\omega_1 \cdot t - \frac{10\pi}{9} + \frac{2\pi}{3}\right) -$$

$$\sin\left(\omega_1 \cdot t - \frac{10\pi}{9} + \frac{\pi}{3}\right)\} +$$

$$Icvii(t) \cdot \{\sin\left(\omega_1 \cdot t - \frac{12\pi}{9}\right) + \sin\left(\omega_1 \cdot t - \frac{12\pi}{9} + \frac{2\pi}{3}\right) -$$

$$\sin\left(\omega_1 \cdot t - \frac{12\pi}{9} + \frac{\pi}{3}\right)\} +$$

-continued $$Icviii(t) \cdot \left\{ \sin\left(\omega_1 \cdot t - \frac{14\pi}{9}\right) + \sin\left(\omega_1 \cdot t - \frac{14\pi}{9} + \frac{2\pi}{3}\right) - \sin\left(\omega_1 \cdot t - \frac{14\pi}{9} + \frac{\pi}{3}\right) \right\} +$$

$$Icix(t) \cdot \left\{ \sin\left(\omega_1 \cdot t - \frac{16\pi}{9}\right) + \sin\left(\omega_1 \cdot t - \frac{16\pi}{9} + \frac{2\pi}{3}\right) - \sin\left(\omega_1 \cdot t - \frac{16\pi}{9} + \frac{\pi}{3}\right) \right\} \Big] \Big]$$

$$= \mu \cdot Im_1 \cdot [Im_1 \cdot \{\sin(3\omega_1 \cdot t - 3\omega_1 \cdot t) + \sin(3\omega_1 \cdot t - 3\omega_1 \cdot t + 2\pi) - \sin(3\omega_1 \cdot t - 3\omega_1 \cdot t + \pi)\} + \quad (= 0)$$

$$Im_2 \cdot \{\sin(\omega_2 \cdot t + \alpha - \omega_1 \cdot t) + \sin\left(\omega_2 \cdot t + \alpha - \omega_1 \cdot t - \frac{2\pi}{3}\right) - \sin\left(\omega_2 \cdot t + \alpha - \omega_1 \cdot t + \frac{\pi}{3}\right)\} + \quad (= 0)$$

$$n \cdot [Ica(t) \cdot \{\sin(3\omega_1 \cdot t) + \sin(3\omega_1 \cdot t + 2\pi) - \sin(3\omega_1 \cdot t + \pi)\} + Icb(t) \cdot$$

$$\left\{ \sin\left(3\omega_1 \cdot t - \frac{2\pi}{3}\right) + \sin\left(3\omega_1 \cdot t + 2\pi - \frac{2\pi}{3}\right) - \sin\left(3\omega_1 \cdot t + \pi - \frac{2\pi}{3}\right) \right\} + Icc(t) \cdot$$

$$\left\{ \sin\left(3\omega_1 \cdot t - \frac{4\pi}{3}\right) + \sin\left(3\omega_1 \cdot t + 2\pi - \frac{4\pi}{3}\right) - \sin\left(3\omega_1 \cdot t + \pi - \frac{4\pi}{3}\right) \right\} \Big] + \quad (\neq 0)$$

$$n \cdot \left[ Ici(t) \cdot \left\{ \sin(\omega_1 \cdot t) + \sin\left(\omega_1 \cdot t + \frac{2\pi}{3}\right) - \sin\left(\omega_1 \cdot t + \frac{\pi}{3}\right) \right\} + \quad (= 0) \right.$$

$$Icii(t) \cdot \left\{ \sin\left(\omega_1 \cdot t - \frac{2\pi}{9}\right) + \sin\left(\omega_1 \cdot t - \frac{2\pi}{9} + \frac{2\pi}{3}\right) - \sin\left(\omega_1 \cdot t - \frac{2\pi}{9} + \frac{\pi}{3}\right) \right\} + \quad (= 0)$$

$$Iciii(t) \cdot \left\{ \sin\left(\omega_1 \cdot t - \frac{4\pi}{9}\right) + \sin\left(\omega_1 \cdot t - \frac{4\pi}{9} + \frac{2\pi}{3}\right) - \sin\left(\omega_1 \cdot t - \frac{4\pi}{9} + \frac{\pi}{3}\right) \right\} + \quad (= 0)$$

$$Iciv(t) \cdot \left\{ \sin\left(\omega_1 \cdot t - \frac{6\pi}{9}\right) + \sin\left(\omega_1 \cdot t - \frac{6\pi}{9} + \frac{2\pi}{3}\right) - \sin\left(\omega_1 \cdot t - \frac{6\pi}{9} + \frac{\pi}{3}\right) \right\} + \quad (= 0)$$

$$Icv(t) \cdot \left\{ \sin\left(\omega_1 \cdot t - \frac{8\pi}{9}\right) + \sin\left(\omega_1 \cdot t - \frac{8\pi}{9} + \frac{2\pi}{3}\right) - \sin\left(\omega_1 \cdot t - \frac{8\pi}{9} + \frac{\pi}{3}\right) \right\} + \quad (= 0)$$

$$Icvi(t) \cdot \left\{ \sin\left(\omega_1 \cdot t - \frac{10\pi}{9}\right) + \sin\left(\omega_1 \cdot t - \frac{10\pi}{9} + \frac{2\pi}{3}\right) - \sin\left(\omega_1 \cdot t - \frac{10\pi}{9} + \frac{\pi}{3}\right) \right\} + \quad (= 0)$$

$$Icvii(t) \cdot \left\{ \sin\left(\omega_1 \cdot t - \frac{12\pi}{9}\right) + \sin\left(\omega_1 \cdot t - \frac{12\pi}{9} + \frac{2\pi}{3}\right) - \sin\left(\omega_1 \cdot t - \frac{12\pi}{9} + \frac{\pi}{3}\right) \right\} + \quad (= 0)$$

$$Icviii(t) \cdot \left\{ \sin\left(\omega_1 \cdot t - \frac{14\pi}{9}\right) + \sin\left(\omega_1 \cdot t - \frac{14\pi}{9} + \frac{2\pi}{3}\right) - \sin\left(\omega_1 \cdot t - \frac{14\pi}{9} + \frac{\pi}{3}\right) \right\} + \quad (= 0)$$

$$Icix(t) \cdot \left\{ \sin\left(\omega_1 \cdot t - \frac{16\pi}{9}\right) + \sin\left(\omega_1 \cdot t - \frac{16\pi}{9} + \frac{2\pi}{3}\right) - \sin\left(\omega_1 \cdot t - \frac{16\pi}{9} + \frac{\pi}{3}\right) \right\} \Big] \Big] \quad (= 0)$$

$$= 3\mu \cdot n \cdot Im_1 \{Ica(t) \cdot \sin(3\omega_1 \cdot t) + Icb(t) \cdot$$

$$\sin\left(3\omega_1 \cdot t - \frac{2\pi}{3}\right) + Icc(t) \cdot \sin\left(3\omega_1 \cdot t - \frac{4\pi}{3}\right)\}$$

This is the same as equation (46) which is obtained when the inner rotating magnetic fields are supplied by a three-phase alternating current.

On the other hand, $f_2$ may be calculated as follows.

$$f_2 = Im_2 \cdot B$$

where, $\theta = \omega_2 \cdot t + \alpha$.

From this equation and equation (56), $f_2$ may be expressed by the following equation.

$$f_2 = \mu \cdot Im_2 \cdot [Im_1 \cdot \sin(3\omega_1 \cdot t - 3\omega_2 \cdot t - 3\alpha) + Im_2 \cdot \quad (58)$$

$$\sin(\omega_2 \cdot t + \alpha - \omega_2 \cdot t - \alpha) + n \cdot \{Ica(t) \cdot$$

$$\sin(3\omega_2 \cdot t + 3\alpha) + Icb(t) \cdot \sin\left(3\omega_2 \cdot t + 3\alpha - \frac{2\pi}{3}\right) +$$

$$Icc(t) \cdot \sin\left(3\omega_2 \cdot t + 3\alpha - \frac{4\pi}{3}\right)\} + n \cdot$$

$$\left\{ Ici(t) \cdot \sin(\omega_2 \cdot t + \alpha) + Icii(t) \cdot \sin\left(\omega_2 \cdot t + \alpha - \frac{2\pi}{9}\right) + \right.$$

$$Iciii(t) \cdot \sin\left(\omega_2 \cdot t + \alpha - \frac{4\pi}{9}\right) + Iciv(t) \cdot$$

$$\sin\left(\omega_2 \cdot t + \alpha - \frac{6\pi}{9}\right) + Icv(t) \cdot \sin\left(\omega_2 \cdot t + \alpha - \frac{8\pi}{9}\right) +$$

$$Icvi(t) \cdot \sin\left(\omega_2 \cdot t + \alpha - \frac{10\pi}{9}\right) + Icvii(t) \cdot$$

$$\sin\left(\omega_2 \cdot t + \alpha - \frac{12\pi}{9}\right) + Icviii(t) \cdot \sin\left(\omega_2 \cdot t + \alpha - \frac{14\pi}{9}\right) +$$

$$Icix(t) \cdot \sin\left(\omega_2 \cdot t + \alpha - \frac{16\pi}{9}\right)\} \Big]$$

$$= \mu \cdot Im_2 \cdot [Im_1 \cdot \sin(3\omega_1 \cdot t - 3\omega_2 \cdot t - 3\alpha) + n \cdot$$

$$\{Ica(t) \cdot \sin(3\omega_2 \cdot t + 3\alpha) + Icb(t) \cdot$$

$$\sin\left(3\omega_2 \cdot t + 3\alpha - \frac{2\pi}{3}\right) + Icc(t) \cdot$$

$$\sin\left(3\omega_2 \cdot t + 3\alpha - \frac{4\pi}{3}\right)\} + n \cdot \{Ici(t) \cdot \sin(\omega_2 \cdot t + \alpha) +$$

$$Icii(t) \cdot \sin\left(\omega_2 \cdot t + \alpha - \frac{2\pi}{9}\right) + Iciii(t) \cdot$$

$$\sin\left(\omega_2 \cdot t + \alpha - \frac{4\pi}{9}\right) + Iciv(t) \cdot \sin\left(\omega_2 \cdot t + \alpha - \frac{6\pi}{9}\right) +$$

$$Icv(t) \cdot \sin\left(\omega_2 \cdot t + \alpha - \frac{8\pi}{9}\right) + Icvi(t) \cdot$$

$$\sin\left(\omega_2 \cdot t + \alpha - \frac{10\pi}{9}\right) + Icvii(t) \cdot \sin\left(\omega_2 \cdot t + \alpha - \frac{12\pi}{9}\right) +$$

$$Icviii(t) \cdot \sin\left(\omega_2 \cdot t + \alpha - \frac{14\pi}{9}\right) +$$

$$Icix(t) \cdot \sin\left(\omega_2 \cdot t + \alpha - \frac{16\pi}{9}\right)\} \Big]$$

(3-5-2) When the Outer Rotating Magnetic Fields and Inner Rotating Magnetic Fields are Supplied Together The three-phase alternating currents Ica(t), Icb(t), Icc(t) mentioned above are expressed by the following equations (59A), (59B), (59C).

$$Ica(t) = Ic_1 \cdot \cos(3\omega_1 \cdot t - 3\beta) \qquad (59A)$$

$$Icb(t) = Ic_1 \cdot \cos\left(3\omega_1 \cdot t - 3\beta - \frac{2\pi}{3}\right) \qquad (59B)$$

$$Icc(t) = Ic_1 \cdot \cos\left(3\omega_1 \cdot t - 3\beta - \frac{4\pi}{3}\right) \qquad (59C)$$

The nine-phase alternating currents Ici(t)–Icix(t) mentioned above are set as follows.

$$IIci(t) = Ic_2(t) \cdot \cos(\omega_2 \cdot t - \gamma) \qquad (60A)$$

$$Icii(t) = Ic_2(t) \cdot \cos\left(\omega_2 \cdot t - \gamma - \frac{2\pi}{9}\right) \qquad (60B)$$

$$Iciii(t) = Ic_2(t) \cdot \cos\left(\omega_2 \cdot t - \gamma - \frac{4\pi}{9}\right) \qquad (60C)$$

$$Iciv(t) = Ic_2(t) \cdot \cos\left(\omega_2 \cdot t - \gamma - \frac{6\pi}{9}\right) \qquad (60D)$$

$$Icv(t) = Ic_2(t) \cdot \cos\left(\omega_2 \cdot t - \gamma - \frac{8\pi}{9}\right) \qquad (60E)$$

$$Icvi(t) = Ic_2(t) \cdot \cos\left(\omega_2 \cdot t - \gamma - \frac{10\pi}{9}\right) \qquad (60F)$$

$$Icvii(t) = Ic_2(t) \cdot \cos\left(\omega_2 \cdot t - \gamma - \frac{12\pi}{9}\right) \qquad (60G)$$

$$Icviii(t) = Ic_2(t) \cdot \cos\left(\omega_2 \cdot t - \gamma - \frac{14\pi}{9}\right) \qquad (60H)$$

$$Icix(t) = Ic_2(t) \cdot \cos\left(\omega_2 \cdot t - \gamma - \frac{16\pi}{9}\right) \qquad (60I)$$

Next, $f_2$ is calculated by substituting equations (59A)–(59C) and equations (60A)–(60I) into equation (58).

$$f_2 = \mu \cdot Im_2 \cdot [Im_1 \cdot \sin(3\omega_1 \cdot t - 3\omega_2 \cdot t - 3\alpha) + n \cdot$$

$$\{Ic_1 \cdot \cos(3\omega_1 \cdot t - 3\beta) \cdot \sin(3\omega_2 \cdot t - 3\alpha) +$$

$$Ic_1 \cdot \cos\left(3\omega_1 \cdot t - 3\beta - \frac{2\pi}{3}\right) \cdot \sin\left(3\omega_2 \cdot t + 3\alpha - \frac{2\pi}{3}\right) +$$

$$Ic_1 \cdot \cos\left(3\omega_1 \cdot t - 3\beta - \frac{4\pi}{3}\right) \cdot \sin\left(3\omega_2 \cdot t + 3\alpha - \frac{4\pi}{3}\right)\} +$$

$$n \cdot \{Ic_2(t) \cdot \cos(\omega_2 \cdot t - \gamma) \cdot \sin(\omega_1 \cdot t + \alpha) +$$

$$Ic_2(t) \cdot \cos\left(\omega_2 \cdot t - \gamma - \frac{2\pi}{9}\right) \cdot \sin\left(\omega_1 \cdot t + \alpha - \frac{2\pi}{9}\right) +$$

$$Ic_2(t) \cdot \cos\left(\omega_2 \cdot t - \gamma - \frac{4\pi}{9}\right) \cdot \sin\left(\omega_1 \cdot t + \alpha - \frac{4\pi}{9}\right) +$$

$$Ic_2(t) \cdot \cos\left(\omega_2 \cdot t - \gamma - \frac{6\pi}{9}\right) \cdot \sin\left(\omega_1 \cdot t + \alpha - \frac{6\pi}{9}\right) +$$

$$Ic_2(t) \cdot \cos\left(\omega_2 \cdot t - \gamma - \frac{8\pi}{9}\right) \cdot \sin\left(\omega_1 \cdot t + \alpha - \frac{8\pi}{9}\right) +$$

$$Ic_2(t) \cdot \cos\left(\omega_2 \cdot t - \gamma - \frac{10\pi}{9}\right) \cdot \sin\left(\omega_1 \cdot t + \alpha - \frac{10\pi}{9}\right) +$$

$$Ic_2(t) \cdot \cos\left(\omega_2 \cdot t - \gamma - \frac{12\pi}{9}\right) \cdot \sin\left(\omega_1 \cdot t + \alpha - \frac{12\pi}{9}\right) +$$

$$Ic_2(t) \cdot \cos\left(\omega_2 \cdot t - \gamma - \frac{14\pi}{9}\right) \cdot \sin\left(\omega_1 \cdot t + \alpha - \frac{14\pi}{9}\right) +$$

-continued $$Ic_2(t) \cdot \cos\left(\omega_2 \cdot t - \gamma - \frac{16\pi}{9}\right) \cdot \sin\left(\omega_1 \cdot t + \alpha - \frac{16\pi}{9}\right)\}]$$

Here, the above equation may be rewritten using the formula $$\cos(a) \cdot \sin(b) = \tfrac{1}{2} \cdot \{\sin(a+b) - \sin(a-b)\}.$$

$$f_2 = \mu \cdot Im_2 \cdot [Im_1 \cdot \sin(3\omega_1 \cdot t - 3\omega_2 \cdot t - 3\alpha) + n \cdot Ic_1 \cdot \qquad (61)$$

$$\left[\frac{1}{2} \cdot \{\sin(3\omega_1 \cdot t - 3\beta + 3\omega_2 \cdot t + 3\alpha) - \right.$$

$$\sin(3\omega_1 \cdot t - 3\beta - 3\omega_2 \cdot t - 3\alpha)\} + \frac{1}{2} \cdot$$

$$\left\{\sin\left(3\omega_1 \cdot t - 3\beta - \frac{2\pi}{3} + 3\omega_2 \cdot t + 3\alpha - \frac{2\pi}{3}\right) - \right.$$

$$\sin\left(3\omega_1 \cdot t - 3\beta - \frac{2\pi}{3} - 3\omega_2 \cdot t - 3\alpha + \frac{2\pi}{3}\right)\right\} + \frac{1}{2} \cdot$$

$$\left\{\sin\left(3\omega_1 \cdot t - 3\beta - \frac{4\pi}{3} + 3\omega_2 \cdot t + 3\alpha - \frac{4\pi}{3}\right) - \right.$$

$$\sin\left(3\omega_1 \cdot t - 3\beta - \frac{4\pi}{3} - 3\omega_2 \cdot t - 3\alpha + \frac{4\pi}{3}\right)\right\} +$$

$$n \cdot Ic_2(t) \cdot \left[\frac{1}{2} \cdot \{\sin(\omega_2 \cdot t - \gamma + \omega_2 \cdot t + \alpha) - \right.$$

$$\sin(\omega_2 \cdot t - \gamma - \omega_2 \cdot t - \alpha)\} + \frac{1}{2} \cdot$$

$$\left\{\sin\left(\omega_2 \cdot t - \gamma - \frac{2\pi}{9} + \omega_2 \cdot t + \alpha\right) - \right.$$

$$\sin\left(\omega_2 \cdot t - \gamma - \frac{2\pi}{9} - \omega_2 \cdot t - \alpha\right)\right\} + \frac{1}{2} \cdot$$

$$\left\{\sin\left(\omega_2 \cdot t - \gamma - \frac{4\pi}{9} + \omega_2 \cdot t + \alpha\right) - \right.$$

$$\sin\left(\omega_2 \cdot t - \gamma - \frac{4\pi}{9} - \omega_2 \cdot t - \alpha\right)\right\} + \frac{1}{2} \cdot$$

$$\left\{\sin\left(\omega_2 \cdot t - \gamma - \frac{8\pi}{9} + \omega_2 \cdot t + \alpha\right) - \right.$$

$$\sin\left(\omega_2 \cdot t - \gamma - \frac{6\pi}{9} - \omega_2 \cdot t - \alpha\right)\right\} + \frac{1}{2} \cdot$$

$$\left\{\sin\left(\omega_2 \cdot t - \gamma - \frac{10\pi}{9} + \omega_2 \cdot t + \alpha\right) - \right.$$

$$\sin\left(\omega_2 \cdot t - \gamma - \frac{8\pi}{9} - \omega_2 \cdot t - \alpha\right)\right\} + \frac{1}{2} \cdot$$

$$\left\{\sin\left(\omega_2 \cdot t - \gamma - \frac{12\pi}{9} + \omega_2 \cdot t + \alpha\right) - \right.$$

$$\sin\left(\omega_2 \cdot t - \gamma - \frac{10\pi}{9} - \omega_2 \cdot t - \alpha\right)\right\} + \frac{1}{2} \cdot$$

$$\left\{\sin\left(\omega_2 \cdot t - \gamma - \frac{14\pi}{9} + \omega_2 \cdot t + \alpha\right) - \right.$$

$$\sin\left(\omega_2 \cdot t - \gamma - \frac{12\pi}{9} - \omega_2 \cdot t - \alpha\right)\right\} + \frac{1}{2} \cdot$$

$$\left\{\sin\left(\omega_2 \cdot t - \gamma - \frac{16\pi}{9} + \omega_2 \cdot t + \alpha\right) - \right.$$

$$\sin\left(\omega_2 \cdot t - \gamma - \frac{14\pi}{9} - \omega_2 \cdot t - \alpha\right)\right\}]]$$

$$= \mu \cdot Im_2 \cdot \left[Im_1 \cdot \sin(3\omega_1 \cdot t - 3\omega_2 \cdot t - 3\alpha) + \frac{1}{2} \cdot n \cdot Ic_1 \cdot \right.$$

$$\{\sin(3\omega_1 \cdot t + 3\omega_2 \cdot t - 3\beta + 3\alpha) -$$

$$\sin(3\omega_1 \cdot t - 3\omega_2 \cdot t - 3\alpha - 3\beta) +$$

-continued $$\sin\left(3\omega_1 \cdot t + 3\omega_2 \cdot t - 3\beta + 3\alpha - \frac{4\pi}{3}\right) -$$

$$\sin(3\omega_1 \cdot t - 3\omega_2 \cdot t - 3\alpha - 3\beta) +$$

$$\sin\left(3\omega_1 \cdot t + 3\omega_2 \cdot t - 3\beta + 3\alpha - \frac{2\pi}{3}\right) -$$

$$\sin(3\omega_1 \cdot t - 3\omega_2 \cdot t - 3\alpha - 3\beta)\} + n \cdot Ic_2(t) \cdot$$

$$\left[\frac{1}{2} \cdot \{\sin(\omega_2 \cdot t - \gamma + \omega_2 \cdot t + \alpha) + \sin(\gamma + \alpha)\} + \frac{1}{2} \cdot \right.$$

$$\left\{\sin\left(\omega_2 \cdot t - \gamma + \omega_2 \cdot t + \alpha - \frac{4\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{8\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{12\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{16\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{2\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{6\pi}{9}\right) + \sin(\gamma + \alpha)\right\} +$$

$$\frac{1}{2} \cdot \left\{\sin\left(\omega_2 \cdot t - \gamma + \omega_2 \cdot t + \alpha - \frac{10\pi}{9}\right) + \sin(\gamma + \alpha)\right\} +$$

$$\left.\frac{1}{2} \cdot \left\{\sin\left(\omega_2 \cdot t - \gamma + \omega_2 \cdot t + \alpha - \frac{14\pi}{9}\right) + \sin(\gamma + \alpha)\right\}\right]\right]$$

$$= \mu \cdot Im_2 \cdot \left\{Im_1 \cdot \sin(3\omega_1 \cdot t - 3\omega_2 \cdot t - 3\alpha) - \frac{3}{2} \cdot n \cdot Ic_1 \cdot \right.$$

$$\sin(3\omega_1 \cdot t + 3\omega_2 \cdot t - 3\alpha - 3\beta) +$$

$$\left.\frac{9}{2} \cdot n \cdot Ic_2(t) \cdot \sin(\gamma + \alpha)\right\}$$

(3-5-3) Summary

As described in the case of equation (48), as in the case of three-phase alternating current, the first and second terms on the right-hand side of equation (61) are canceled when these terms in other phases are taken into account.

When this equation (61) for the case where the inner rotating magnetic fields are supplied by a nine-phase alternating current is compared with the above-mentioned equation (52) where the inner rotating magnetic fields are supplied by a three-phase alternating current, the fixed term of equation (61), i.e., the last term, is three times that of equation (52).

In other words, when the drive current of the inner magnets $m_2$ is a nine-phase alternating current (Ii–Iix), a drive force, i.e., drive torque, is three times that when the drive current of the inner magnet is a three-phase alternating current.

In other words, the drive torque required to generate the same drive torque for the inner magnets $m_2$ is only 1/3.

This completes the theoretical analysis of this invention.

Next, fifth–eleventh embodiments of this invention will be described referring to FIGS. 19–25.

In these embodiments, the outer rotor 3 is arranged outside the stator 2, and the inner rotor 4 is arranged inside the stator 2 as in the case of the above-mentioned first–fourth embodiments.

Figure 19:
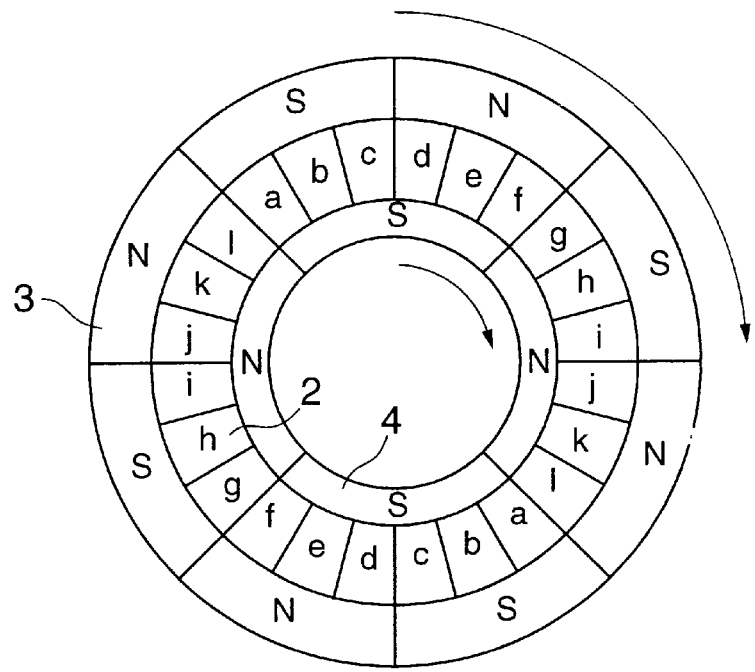
FIG. 19 is a schematic cross-sectional view of a motor/generator according to a fifth embodiment of this invention.
Figure 20:
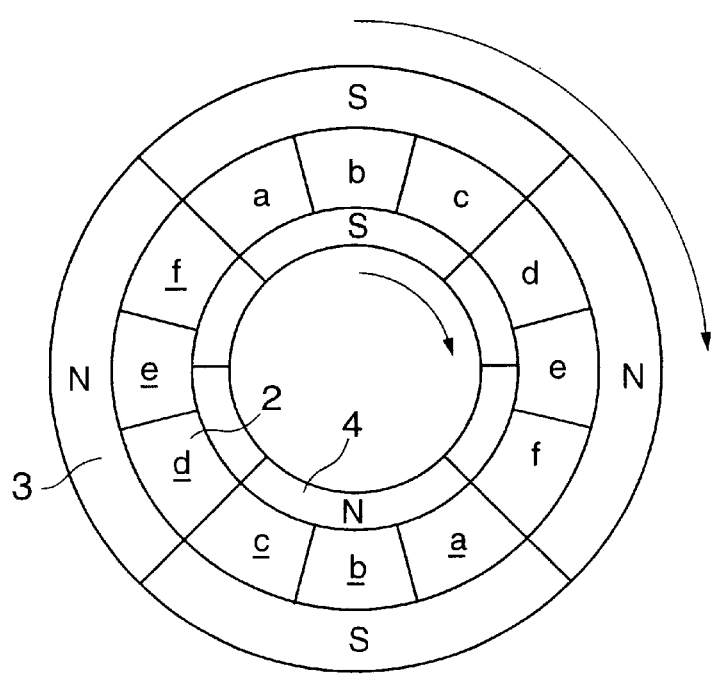
FIG. 20 is similar to FIG. 19, but showing a sixth embodiment of this invention.
Figure 21:
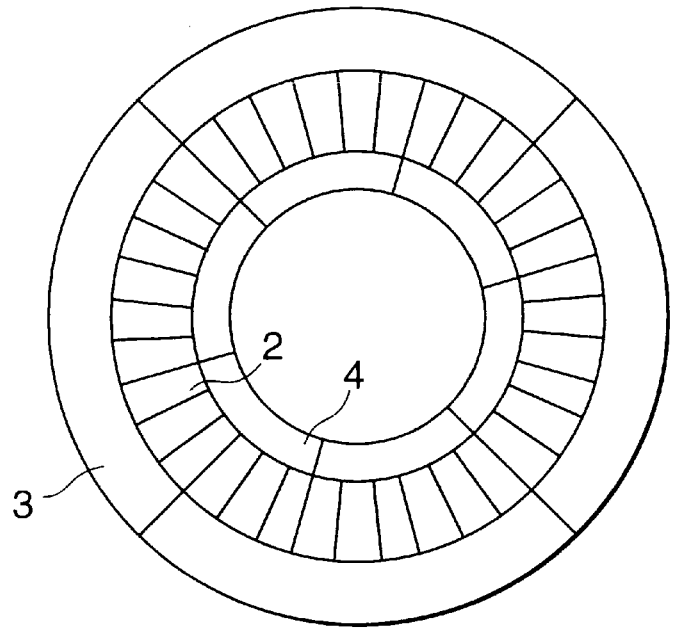
FIG. 21 is similar to FIG. 19, but showing a seventh embodiment of this invention.
Figure 22:
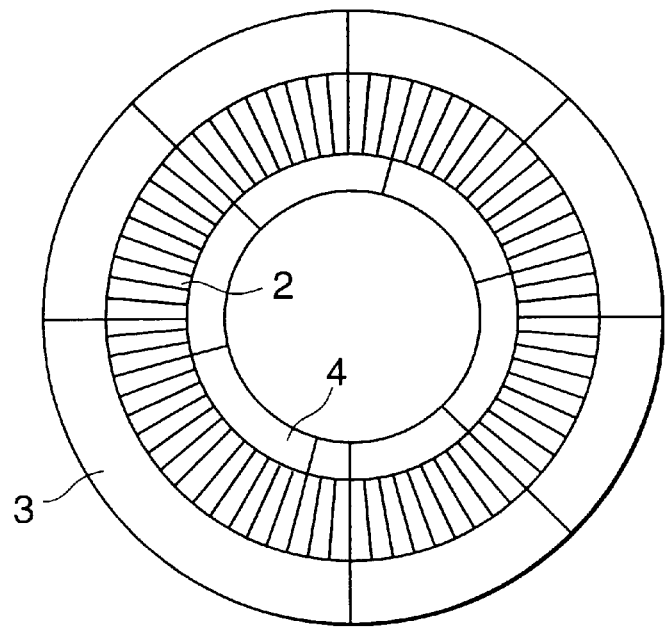
FIG. 22 is similar to FIG. 19, but showing an eighth embodiment of this invention.
Figure 23:
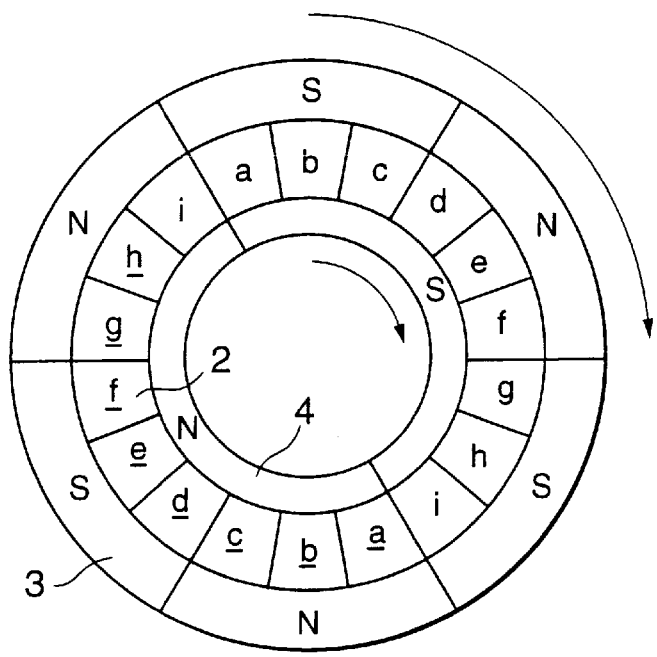
FIG. 23 is similar to FIG. 19, but showing a ninth embodiment of this invention.
Figure 24:
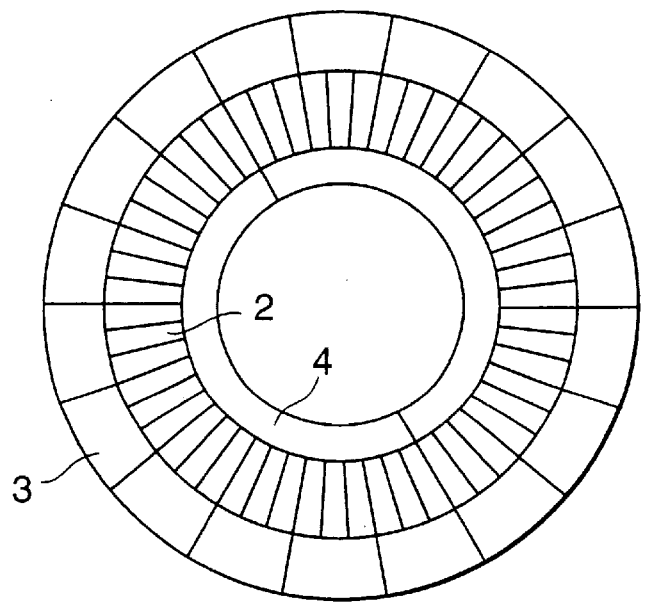
FIG. 24 is similar to FIG. 19, but showing a tenth embodiment of this invention.
Figure 25:
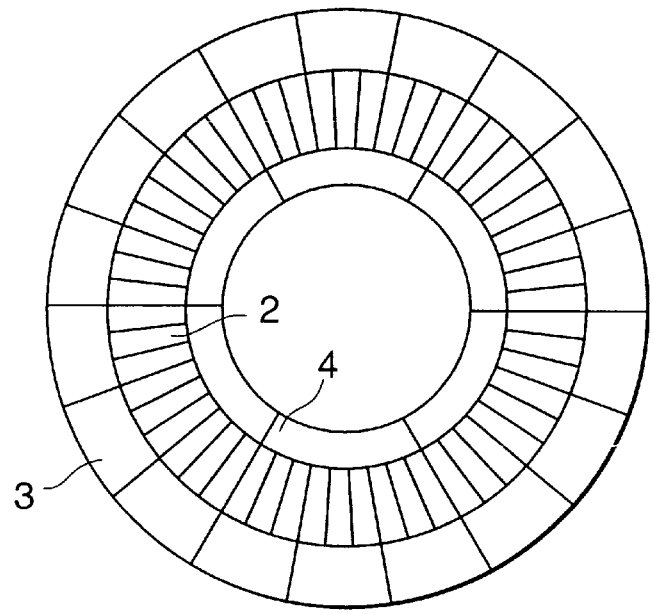
FIG. 25 is similar to FIG. 19, but showing an eleventh embodiment of this invention.

FIG. 19 and FIG. 20 show a motor/generator with a magnetic pole number ratio of 2:1, FIG. 21 shows a motor/generator with a magnetic pole number ratio of 2:3, FIG. 22 shows a motor/generator with a magnetic pole number ratio of 4:3, FIG. 23 and FIG. 25 show a motor/generator with a magnetic pole number ratio of 3:1, and FIG. 24 shows a motor/generator with a magnetic pole number ratio of 9:1.

As is clear from these embodiments, this invention is not limited to the case where the number of magnetic poles of the outer magnets $m_1$ is greater than the number of magnetic poles of the inner magnets $m_2$, and may be applied also to the case where the number of magnetic poles of the outer magnets $m_1$ is less than the number of magnetic poles of the inner magnets $m_2$.

However, it is simple to prevent torque fluctuation by setting the magnetic pole number ratio of the two rotors to an even number versus odd number.

Figure 26:
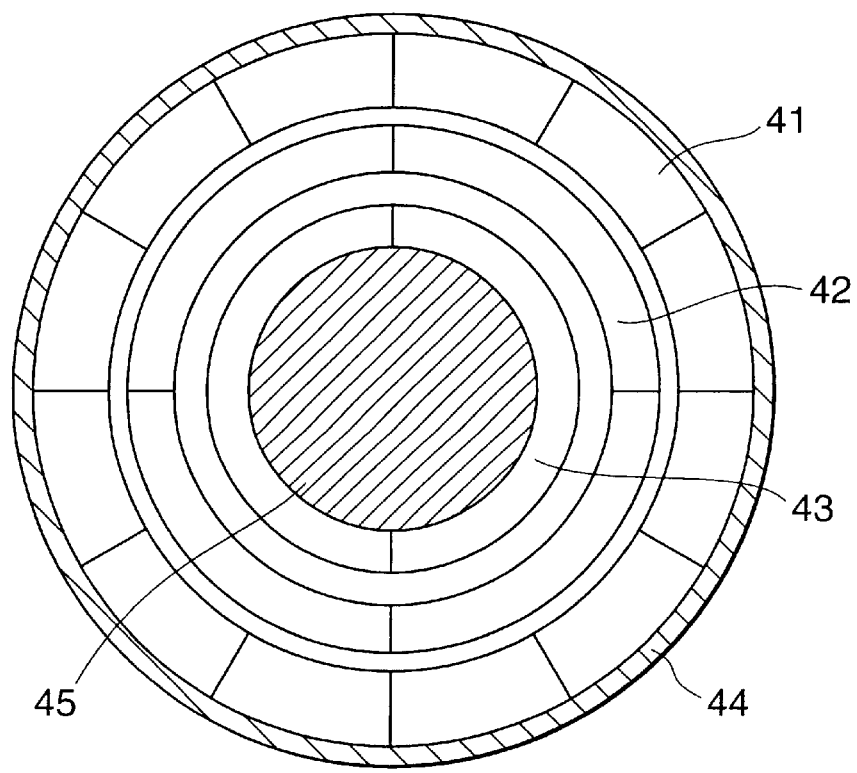
FIG. 26 is a schematic cross-sectional view of the motor/generator according to the twelfth embodiment of this invention.

Next, a twelfth embodiment of this invention will be described referring to FIG. 26.

In this embodiment, an intermediate rotor 42 and inner rotor 43 are arranged inside the stator 41. The inner rotor 43 is fixed on a rotation shaft 45. The intermediate rotor 42 is supported via a rotation shaft, not shown. The stator 41 is fixed to an iron frame 44.

In this way, the two rotors 42, 43 can be arranged inside the stator 41.

However, in this case, an iron frame is not interposed between the rotor 43 and stator 41 so that magnetic flux from the coil of the stator 41 reaches the inner rotor 43.

Further, the two rotors can also be arranged outside the stator. When the stator is arranged in the outermost or innermost position, cooling of the stator coil is facilitated.

In the above-mentioned embodiments, the magnetic poles of the rotor were produced by magnets, but solenoids can be used instead of permanent magnets.

Also, the signal output by the control circuit 15 to the inverter 12 is not limited to a PWM signal, and a pulse amplitude modulation (PAM) signal or other signals may be used.

This invention is not limited to a radial gap type motor/generator wherein the gap between the rotor and the stator is set in a radial direction, and may be applied to a motor/generator wherein the gap between the rotor and stator in an axial direction.

In the description of the aforesaid embodiments, the case was described where the rotors were driven as a motor, however they may of course also be used as generators, or one rotor may be used as a motor and the other one may be used as a generator to generate power.

Finally, a thirteenth embodiment of the invention will be described referring to FIGS. 27–32.

Figure 27:
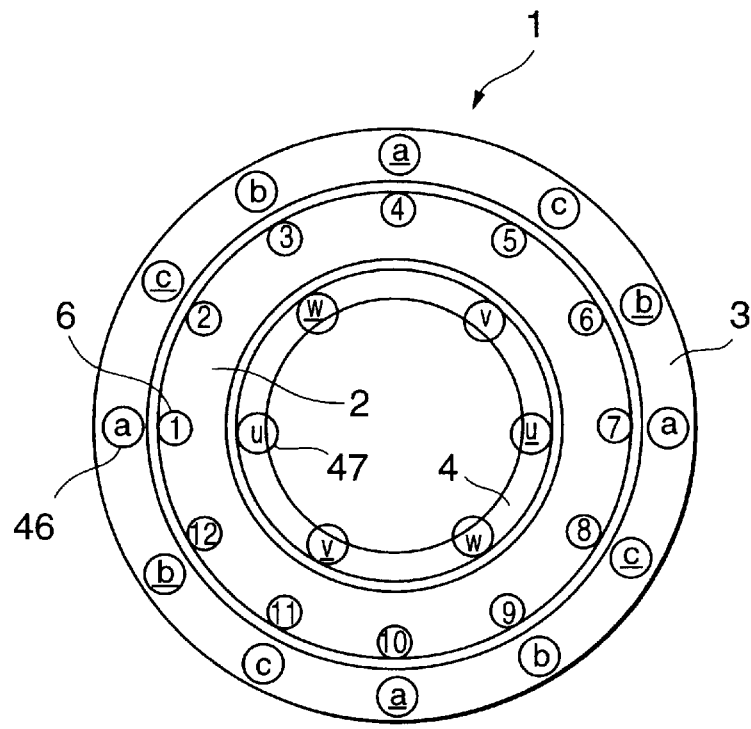
FIG. 27 is a schematic cross-sectional view of the motor/generator according to the thirteenth embodiment of this invention.

In this embodiment, as shown in FIG. 27, twelve induction coils 46 are provided at equal intervals instead of the permanent magnets of the outer rotor 3. Similarly, six induction coils 47 are provided at equal intervals in the inner rotor 4 instead of the permanent magnets.

Figure 29:
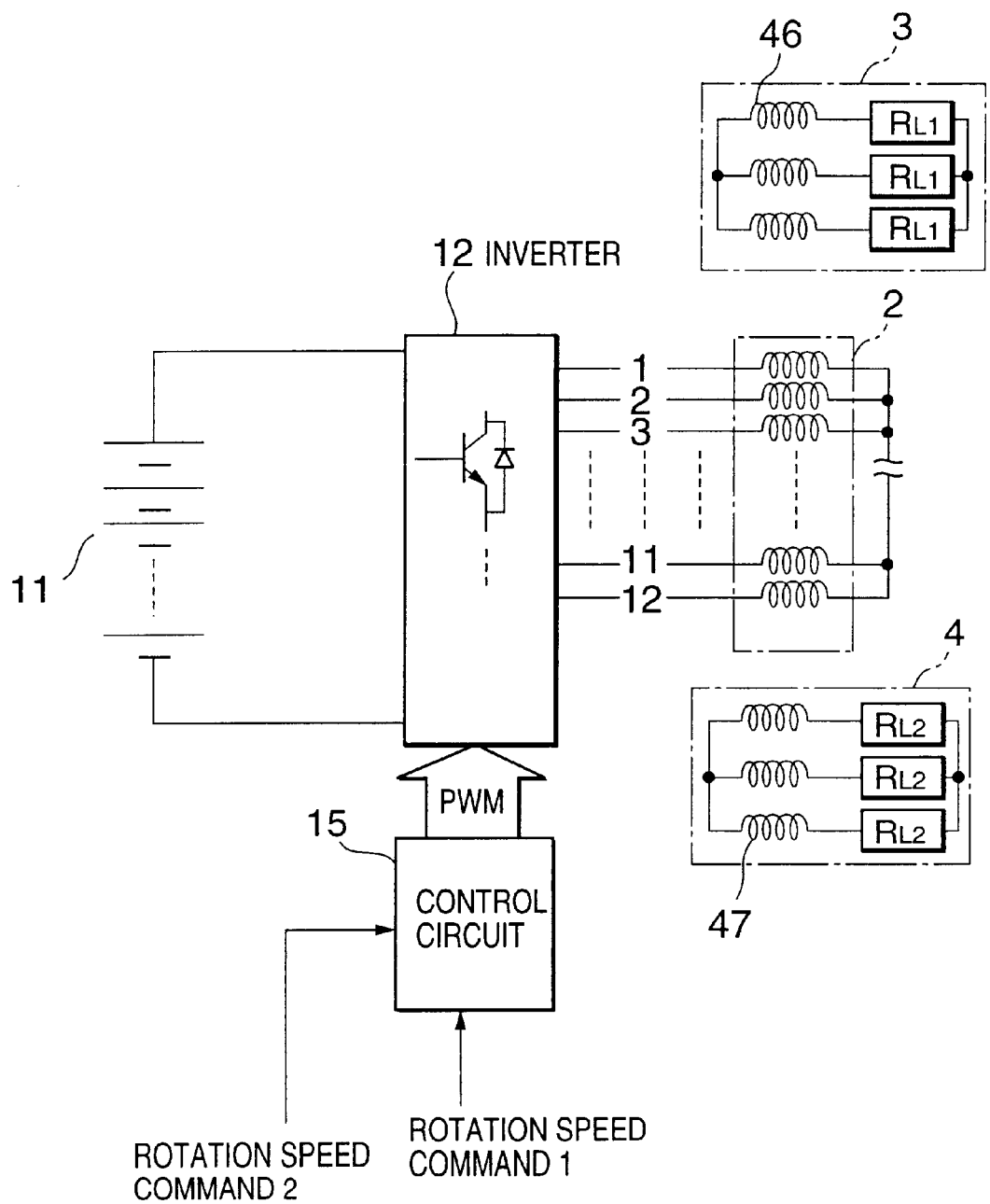
FIG. 29 is a diagram of the control circuit of the motor/generator of FIG. 27.

The induction coils 46 are connected with each other via resistors $RL_1$ as shown in FIG. 29. The induction coils 47 are also connected with each other via resistors $RL_2$.

The stator 2 comprises twelve coils 6 with equal spacing. The numbers #1–#12 are appended to these coils 6 in FIG. 27 in order to distinguish between each of the coils 6.

The construction of the inverter 12 is the same as that of the aforesaid first embodiment.

In this embodiment, the control circuit 15 generates a PWM signal based on rotation speed command values of the outer rotor 3 and inner rotor 4 input to the control circuit 15.

Next, a method will be described of setting the currents flowing through the coils 6.

Figure 28:
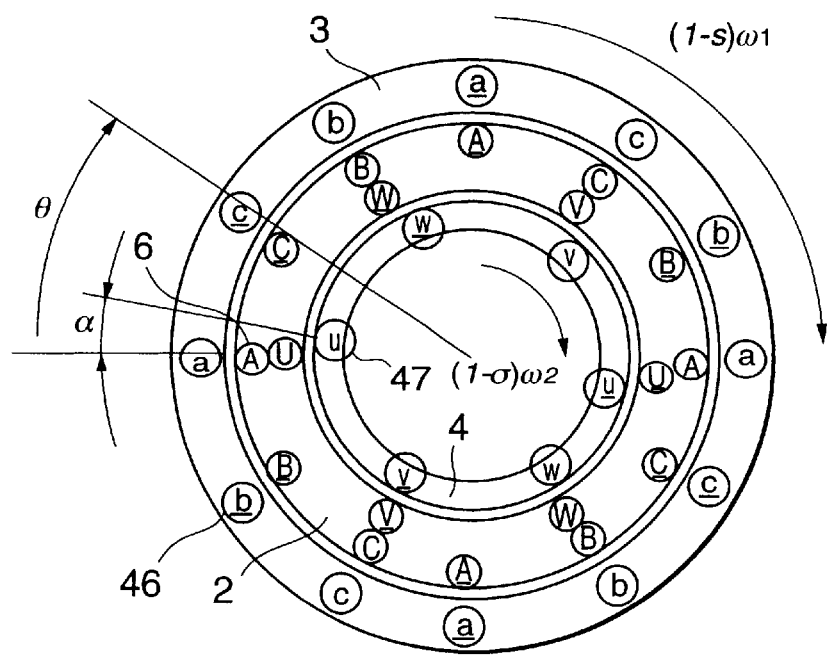
FIG. 28 is a schematic cross-sectional view of a motor/generator in which coils are arranged on the inner circumference and outer circumference of a stator for the purpose of describing a composite current supplied to the motor/generator of FIG. 27.

It will be supposed that there are four sets of coils A, C, B generating the rotating magnetic fields relative to the outer rotor 3 by passing a three-phase alternating current, and two sets of coils U, W, V generating the rotating magnetic fields relative to the inner rotor 4 by passing a three-phase alternating current as shown in FIG. 28. The number of these coils is equal to the number of induction coils 46, 47 of the outer rotor 3 and inner rotor 4.

To simplify the relations between the stator and the coils of different phase in the rotors, the coils 6 of the stator 2 will be represented by a capital letter, and the induction coils of the corresponding rotors 3, 4 will be represented by a corresponding small letter.

In FIG. 28, coils marked with an underlined letter indicate currents flowing in the opposite direction to coils marked by a letter without underlining. In coils arranged at an interval of 180 degrees, current flows in opposite directions.

In this way, a three-phase alternating current flowing through the outer coils A, C, B forms rotating magnetic fields relative to the induction coils a, b, c of the outer rotor 3, and a three-phase alternating current flowing through the inner coils U, W, V forms rotating magnetic fields relative to the induction coils u, w, v of the inner rotor 4.

In this case, the magnetic pole number of the outer rotor 3 is twelve, the magnetic pole number of the inner rotor 4 is six, and the magnetic pole number ratio of the two rotors is 2:1.

Next, the case will be considered where the neighboring coils A and U, B and W, C and V, A and U, B and W, C and V in FIG. 28 are integrated to coils #1, #3, #5, #7, #9, and #11 in FIG. 27.

The currents which should be passed through coils #1–#12 is as follows.

$$I_1 = IA + IU$$
$$I_2 = \underline{IC}$$
$$I_3 = IB + \underline{IW}$$
$$I_4 = \underline{IA}$$
$$I_5 = IC + IV$$
$$I_6 = \underline{IB}$$
$$I_7 = IA + \underline{IU}$$
$$I_8 = \underline{IC}$$
$$I_9 = IB + IW$$
$$I_{10} = \underline{IA}$$
$$I_{11} = IC + \underline{IV}$$
$$I_{12} = \underline{IB}$$

In this case, the load on the coils through which the currents $I_1, I_3, I_5, I_7, I_9, I_{11}$ are passed is greater than that of the remaining coils through which the currents $I_2, I_4, I_6, I_8, I_{10}, I_{12}$ are passed. Therefore, a separate current setting where the load is dispersed over the rest of the coils is considered.

For example, comparing FIG. 28 and FIG. 27, the coils in FIG. 28 corresponding to #1, #2 in FIG. 27 are A, C and U.

In this case, the coil U is slightly shifted in the clockwise direction of the figure. The shifted coil will be referred to as a coil U'.

Half of a current IU' flowing through the coil U' is assigned to each of the coils A and C. Similar processing is performed for the other coils.

Hence, the following composite current settings are possible.

$$I_1 = IA + \frac{1}{2} \cdot IU'$$
$$I_2 = \underline{IC} + \frac{1}{2} \cdot IU'$$
$$I_3 = IB + \frac{1}{2} \cdot \underline{IW'}$$
$$I_4 = \underline{IA} + \frac{1}{2} \cdot \underline{IW'}$$
$$I_5 = IC + \frac{1}{2} \cdot IV'$$
$$I_6 = \underline{IB} + \frac{1}{2} \cdot IV'$$
$$I_7 = IA + (1/2 \cdot)\underline{IU'}$$
$$I_8 = \underline{IC} + \frac{1}{2} \cdot \underline{IU'}$$
$$I_9 = IB + \frac{1}{2} \cdot IW'$$
$$I_{10} = \underline{IA} + \frac{1}{2} \cdot IW'$$
$$I_{11} = IC + \frac{1}{2} \cdot \underline{IV'}$$
$$I_{12} = \underline{IB} + \frac{1}{2} \cdot \underline{IV'}$$

FIGS. 31A–31C are illustrations of the above current settings.

The following composite current settings are also possible.

$$I_1 = IA + Ii$$
$$I_2 = \underline{IC} + Iii$$
$$I_3 = IB + Iiii$$
$$I_4 = \underline{IA} + Iiv$$
$$I_5 = IC + Iv$$
$$I_6 = \underline{IB} + Ivi$$
$$I_7 = IA + Ivii$$
$$I_8 = \underline{IC} + Iviii$$
$$I_9 = IB + Iix$$
$$I_{10} = \underline{IA} + Ix$$
$$I_{11} = IC + Ixi$$
$$I_{12} = \underline{IB} + Ixii$$

Figures 30A, 30B:
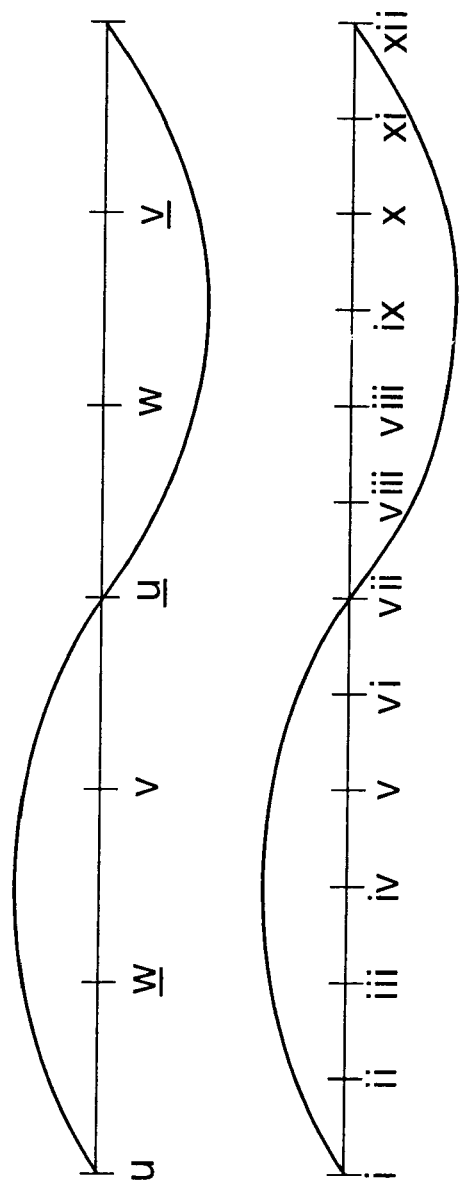
FIGS. 30A and 30B are diagrams which show the waveform of the composite current supplied to the motor/generator of FIG. 27, and the current induced in the inner rotor thereof.

Here, Ii–Ixii of the second term on the right-hand side of the equations is a twelve-phase alternating current as shown in FIG. 30B. FIG. 30A shows the phase of currents occurring in the coils u, w, v of the inner rotor 4.

When the composite current is set in this way, two rotating magnetic fields, i.e., the inner rotating magnetic fields and an outer rotating magnetic fields, are generated simultaneously, but a rotational torque due to the outer rotating magnetic fields do not act on the induction coils 47 of the inner rotor 4 and a rotational torque due to the inner rotating magnetic fields do not act on the induction coils 4 s of the outer rotor 3. This point is verified by theoretical analysis described hereafter.

First, referring to FIG. 28, the case will be described where the magnetic pole number ratio of the rotors 3, 4 is 2:1.

This corresponds to the case where the permanent magnets of the rotors 3, 4 of the above-mentioned (1) N(2p-2p) type are replaced by the same number of induction coils.

Here, writing the frequency of the three-phase alternating current for driving the outer rotor 3 as $fr_1$, and the frequency of the three-phase alternating current for driving the inner rotor 4 as $fr_2$, the angular velocity $\omega_1$ of the outer rotor 3 is $\omega_1 = 2\pi \cdot fr_1$, and the angular velocity $\omega_2$ of the outer rotor 4 is $\omega_2 = 2\pi \cdot fr_2$.

However, when a generator/motor which used induction coils in the rotors is driven as a motor, a deviation appears between the rotation speed of the rotating magnetic fields and the rotation speed of the induction coil, i.e., the rotation speed of the rotor. The ratio of the two is hereinafter referred to as a slip factor.

Therefore, if the slip factor of the outer rotor 3 is s, the true angular velocity of the outer rotor 3 is represented by $(1-s)\cdot\omega_1$.

Also, if the slip factor of the inner rotor 4 is $\sigma$, the true angular velocity of the inner rotor 4 is represented by $((1-\sigma)\cdot\omega_2$.

(4) Effect of Rotating Magnetic Fields of One Rotor on Rotation of the Other Rotor (4-1) Rotating Magnetic Field When a three-phase alternating current is passed into the inner coils U, V, W of the stator 2, the rotating magnetic fields relative to the inner rotor 4 are generated. The magnetic flux density $B_2(t, \theta)$ of the rotating magnetic fields is expressed by the following equation (62).

$$B_2(t,\theta) = Bm_2 \cdot \sin(\omega_2 \cdot t - \theta) \tag{62}$$

where, $Bm_2$ = amplitude of magnetic flux.

Similarly, when a three-phase alternating current is passed in the outer coils A, C, B of the stator 2, the rotating magnetic fields relative to the outer rotor 3 are generated. The magnetic flux density $B_1(t,\theta)$ of the rotating magnetic fields is expressed by the following equation (63).

$$B_1(t, \theta) = Bm_1 \cdot \sin(2\omega_2 \cdot t - 2\theta) \tag{63}$$

where, $Bm_1$ = magnitude of magnetic flux.

Time t in the above equations is so defined that t=0 denotes the instant when the induction coil a in the outer rotor 3 meets the outer coil A of the stator 2.

(4-2) Effect of Inner Rotating Magnetic Fields on Rotation of Outer Rotor

When the four induction coils a, four induction coils b and four induction coils C of the outer rotor 3 are respectively connected in series, the induced voltages Ea, Eb, Ec in the induction coils a, b, c are given by the following equations (64), (65), (66).

$$Ea = \frac{d}{dt} \cdot \left[ B_2\{t, (1-s)\cdot\omega_1 \cdot t\} - B_2 \cdot \left\{t, (1-s)\cdot\omega_1 \cdot t + \frac{\pi}{2}\right\} + \right. \tag{64}$$
$$\left. B_2\{t, (1-s)\cdot\omega_1 \cdot t + \pi\} - B_2 \cdot \left\{t, (1-s)\cdot\omega_1 \cdot t + \frac{3\pi}{2}\right\} \right]$$

$$Eb = \frac{d}{dt} \cdot \left[ B_2\left\{t, (1-s)\cdot\omega_1 \cdot t + \frac{\pi}{3}\right\} - B_2 \cdot \left\{t, (1-s)\cdot\omega_1 \cdot t + \frac{5\pi}{6}\right\} + \right. \tag{65}$$
$$\left. B_2\left\{t, (1-s)\cdot\omega_1 \cdot t + \frac{4\pi}{3}\right\} - B_2 \cdot \left\{t, (1-s)\cdot\omega_1 \cdot t + \frac{11\pi}{6}\right\} \right]$$

$$Ec = \frac{d}{dt} \cdot \left[ -B_2\left\{t, (1-s)\cdot\omega_1 \cdot t + \frac{\pi}{6}\right\} - B_2 \cdot \left\{t, (1-s)\cdot\omega_1 \cdot t + \frac{2\pi}{3}\right\} - \right. \tag{66}$$
$$\left. B_2\left\{t, (1-s)\cdot\omega_1 \cdot t + \frac{7\pi}{6}\right\} + B_2 \cdot \left\{t, (1-s)\cdot\omega_1 \cdot t + \frac{5\pi}{3}\right\} \right]$$

Substituting equation (62) in equations (64), (65), (66), the following equations (67), (68), (69) are obtained.

$$Ea = \frac{d}{dt} \cdot Bm_2 \cdot \left[ \sin\{\omega_2 \cdot t - (1-s)\cdot\omega_1 \cdot t\} - \right. \tag{67}$$
$$\sin\left\{\omega_2 \cdot t - (1-s)\cdot\omega_1 \cdot t - \frac{\pi}{2}\right\} +$$
$$\sin\{\omega_2 \cdot t - (1-s)\cdot\omega_1 \cdot t - \pi\} - \sin\left\{\omega_2 \cdot t - (1-s)\cdot\omega_1 \cdot t - \frac{3\pi}{2}\right\}\bigg]$$

$$Eb = \frac{d}{dt} \cdot Bm_2 \cdot \left[ \sin\left\{\omega_2 \cdot t - (1-s)\cdot\omega_1 \cdot t - \frac{\pi}{3}\right\} - \right. \tag{68}$$
$$\sin\left\{\omega_2 \cdot t - (1-s)\cdot\omega_1 \cdot t - \frac{5\pi}{6}\right\} +$$
$$\sin\left\{\omega_2 \cdot t - (1-s)\cdot\omega_1 \cdot t - \frac{4\pi}{3}\right\} -$$
$$\sin\left\{\omega_2 \cdot t - (1-s)\cdot\omega_1 \cdot t - \frac{11\pi}{6}\right\}\bigg]$$

$$Ec = \frac{d}{dt} \cdot Bm_2 \cdot \left[ -\sin\left\{\omega_2 \cdot t - (1-s)\cdot\omega_1 \cdot t - \frac{\pi}{6}\right\} + \right. \tag{69}$$
$$\sin\left\{\omega_2 \cdot t - (1-s)\cdot\omega_1 \cdot t - \frac{2\pi}{3}\right\} -$$
$$\sin\left\{\omega_2 \cdot t - (1-s)\cdot\omega_1 \cdot t - \frac{7\pi}{6}\right\} +$$
$$\sin\left\{\omega_2 \cdot t - (1-s)\cdot\omega_1 \cdot t - \frac{5\pi}{3}\right\}\bigg]$$

The above equation can be rewritten as follows.

$$Ea = \frac{d}{dt} \cdot Bm_2 \cdot [\sin\{\omega_2 \cdot t - (1-s)\cdot\omega_1 \cdot t\} -$$
$$\sin\{\omega_2 \cdot t - (1-s)\cdot\omega_1 \cdot t\} - \sin\left\{\omega_2 \cdot t - (1-s)\cdot\omega_1 \cdot t - \frac{\pi}{2}\right\} +$$
$$\sin\left\{\omega_2 \cdot t - (1-s)\cdot\omega_1 \cdot t - \frac{\pi}{2}\right\}\bigg]$$
$$= 0$$

$$Eb = \frac{d}{dt} \cdot Bm_2 \cdot \left[ \sin\left\{\omega_2 \cdot t - (1-s)\cdot\omega_1 \cdot t - \frac{\pi}{3}\right\} - \right.$$
$$\sin\left\{\omega_2 \cdot t - (1-s)\cdot\omega_1 \cdot t - \frac{\pi}{3}\right\} -$$
$$\sin\left\{\omega_2 \cdot t - (1-s)\cdot\omega_1 \cdot t - \frac{5\pi}{6}\right\} +$$
$$\sin\left\{\omega_2 \cdot t - (1-s)\cdot\omega_1 \cdot t - \frac{5\pi}{6}\right\}\bigg]$$
$$= 0$$

$$Ec = \frac{d}{dt} \cdot Bm_2 \cdot \left[ -\sin\left\{\omega_2 \cdot t - (1-s)\cdot\omega_1 \cdot t - \frac{\pi}{6}\right\} + \right.$$
$$\sin\left\{\omega_2 \cdot t - (1-s)\cdot\omega_1 \cdot t - \frac{\pi}{6}\right\} +$$
$$\sin\left\{\omega_2 \cdot t - (1-s)\cdot\omega_1 \cdot t - \frac{2\pi}{3}\right\} -$$
$$\sin\left\{\omega_2 \cdot t - (1-s)\cdot\omega_1 \cdot t - \frac{2\pi}{3}\right\}\bigg]$$
$$= 0$$

Therefore, the currents which produces the inner rotating magnetic fields does not act on the induction coil 46 of the outer rotor 3, and current does not flow into the induction coil 46. Therefore, the inner rotating magnetic fields do not give a rotational torque to the outer rotor 3.

(4-3) Effect of Outer Rotating Magnetic Fields on Rotation of Inner Rotor

When the two induction coils u, two induction coils w and two induction coils v of the inner rotor 4 are respectively connected in series, the voltages Eu, Ew, Ev induced by the outer rotating magnetic fields in the induction coils u, w, v of the inner rotor 4 are given by the following equations (70), (71), (72).

$$Eu = \frac{d}{dt} \cdot [B_1\{t, (1-\sigma)\cdot\omega_2 \cdot t + \alpha\} - B_1\{t, (1-\sigma)\cdot\omega_2 \cdot t + \pi + \alpha\}] \tag{70}$$

$$Ev = \frac{d}{dt} \cdot \left[B_1\left\{t, (1-\sigma)\cdot\omega_2 \cdot t + \frac{2\pi}{3} + \alpha\right\} - B_1\left\{t, (1-\sigma)\cdot\omega_2 \cdot t + \frac{5\pi}{3} + \alpha\right\}\right] \tag{71}$$

$$Ew = \frac{d}{dt} \cdot \left[-B_1\left\{t, (1-\sigma)\cdot\omega_2 \cdot t + \frac{\pi}{3} + \alpha\right\} + B_1\left\{t, (1-\sigma)\cdot\omega_2 \cdot t + \frac{4\pi}{3} + \alpha\right\}\right] \tag{72}$$

where, α=phase difference of coil u and coil A when phase of induction coil a and coil A coincide.

Substituting equation (63) in equations (70), 71), (72), the following equations (74), (75), (76) are obtained.

$$Eu = \frac{d}{dt} \cdot Bm_1 \cdot [\sin\{2\omega_1 \cdot t - 2(1-\sigma)\cdot\omega_2 \cdot t - 2\alpha\} - \sin[2\omega_1 \cdot t - 2\{(1-\sigma)\cdot\omega_2 \cdot t + \pi\} - 2\alpha]] \tag{74}$$

$$Ev = \frac{d}{dt} \cdot Bm_1 \cdot \left[\sin\left\{2\omega_1 \cdot t - 2\left\{(1-\sigma)\cdot\omega_2 \cdot t + \frac{2\pi}{3}\right\} - 2\alpha\right\} - \sin\left[2\omega_1 \cdot t - 2\left\{(1-\sigma)\cdot\omega_2 \cdot t + \frac{5\pi}{3}\right\} - 2\alpha\right]\right] \tag{75}$$

$$Ew = \frac{d}{dt} \cdot Bm_1 \cdot \left[\sin\left[2\omega_1 \cdot t - 2\left\{(1-\sigma)\cdot\omega_2 \cdot t + \frac{4\pi}{3}\right\} - 2\alpha\right] - \sin\left[2\omega_1 \cdot t - 2\left\{(1-\sigma)\cdot\omega_2 \cdot t + \frac{\pi}{3}\right\} - 2\alpha\right]\right] \tag{76}$$

Equations (74), (75), (76) may be rewritten as follows.

$$Eu = \frac{d}{dt} \cdot Bm_1 \cdot [\sin\{2\omega_1 \cdot t - 2(1-\sigma)\cdot\omega_2 \cdot t - 2\alpha\} - \sin\{2\omega_1 \cdot t - 2(1-\sigma)\cdot\omega_2 \cdot t - 2\pi - 2\alpha\}]$$
$$= 0$$

$$Ev = \frac{d}{dt} \cdot Bm_1 \cdot \left[\sin\left\{2\omega_1 \cdot t - 2(1-\sigma)\cdot\omega_2 \cdot t - \frac{4\pi}{3} - 2\alpha\right\} - \sin\left\{2\omega_1 \cdot t - 2(1-\sigma)\cdot\omega_2 \cdot t - \frac{10\pi}{3} - 2\alpha\right\}\right]$$
$$= 0$$

$$Ew = \frac{d}{dt} \cdot Bm_1 \cdot \left[\sin\left\{2\omega_1 \cdot t - 2(1-\sigma)\cdot\omega_2 \cdot t - \frac{8\pi}{3} - 2\alpha\right\} - \sin\left\{2\omega_1 \cdot t - 2(1-\sigma)\cdot\omega_2 \cdot t - \frac{2\pi}{3} - 2\alpha\right\}\right]$$
$$= 0$$

Therefore, the currents which produce the outer rotating magnetic fields do not act on the induction coil 47 of the inner rotor 4, and the outer rotating magnetic fields do not give a rotational torque to the inner rotor 4.

(4-4) Summary

The currents which drive the inner rotor 4 has no effect on the rotation of the outer rotor 3, and the currents which drives the outer rotor 3 has no effect on the rotation of the inner rotor 4, so the inner rotor 4 can be controlled solely by the inner rotor drive current, and the outer rotor 3 can be controlled solely by the outer rotor drive currents.

(5) Calculation of Drive Force of Outer Rotor

The drive force of the outer rotor 3 is calculated from the relation between the induction coils 46 of the outer rotor 3 and the drive currents of the outer rotor 3.

(5-1) Voltage Induced in the Induction Coil of the Outer Rotor

When the four induction coils a, four induction coils b and four induction coils c of the outer rotor 3 are respectively connected in series, the voltages Ea, Eb, Ec induced in the induction coils a, b, c are given by the following equations (77), (78), (79).

$$Ea = \frac{d}{dt} \cdot \left[B_1\{t, (1-s)\cdot\omega_1 \cdot t\} - B_1\left\{t, (1-s)\cdot\omega_1 \cdot t + \frac{\pi}{2}\right\} + B_1\{t, (1-s)\cdot\omega_1 \cdot t + \pi\} - B_1\left\{t, (1-s)\cdot\omega_1 \cdot t + \frac{3\pi}{2}\right\}\right] \tag{77}$$

$$Eb = \frac{d}{dt} \cdot \left[B_1\left\{t, (1-s)\cdot\omega_1 \cdot t + \frac{\pi}{3}\right\} - B_1\left\{t, (1-s)\cdot\omega_1 \cdot t + \frac{5\pi}{6}\right\} + B_1\left\{t, (1-s)\cdot\omega_1 \cdot t + \frac{4\pi}{3}\right\} - B_1\left\{t, (1-s)\cdot\omega_1 \cdot t + \frac{11\pi}{6}\right\}\right] \tag{78}$$

$$Ec = \frac{d}{dt} \cdot \left[-B_1\left\{t, (1-s)\cdot\omega_1 \cdot t + \frac{\pi}{6}\right\} + B_1\left\{t, (1-s)\cdot\omega_1 \cdot t + \frac{2\pi}{3}\right\} - B_1\left\{t, (1-s)\cdot\omega_1 \cdot t + \frac{7\pi}{6}\right\} + B_1\left\{t, (1-s)\cdot\omega_1 \cdot t + \frac{5\pi}{3}\right\}\right] \tag{79}$$

Substituting equation (63) in equations (77), (78), (79), the following equations (80), (81), (82) are obtained.

$$Ea = \frac{d}{dt} \cdot Bm_1 \cdot \left[\sin\{2\omega_1 \cdot t - 2(1-s)\cdot\omega_1 \cdot t\} - \sin\left[2\omega_1 \cdot t - 2\left\{(1-s)\cdot\omega_1 \cdot t + \frac{\pi}{2}\right\}\right] + \sin[2\omega_1 \cdot t - 2\{(1-s)\cdot\omega_1 \cdot t + \pi\}] - \sin\left[2\omega_1 \cdot t - 2\left\{(1-s)\cdot\omega_1 \cdot t + \frac{3\pi}{2}\right\}\right]\right]$$

$$= \frac{d}{dt} \cdot Bm_1 \cdot \left[\sin(2s\cdot\omega_1 \cdot t) - \sin\left\{2\left(s\cdot\omega_1 \cdot t + \frac{\pi}{2}\right)\right\} + \sin\{2(s\cdot\omega_1 \cdot t + \pi)\} - \sin\left\{2\left(s\cdot\omega_1 \cdot t + \frac{3\pi}{2}\right)\right\}\right]$$

$$= \frac{d}{dt} \cdot Bm_1 \cdot \{\sin(2s\cdot\omega_1 \cdot t) - \sin(2s\cdot\omega_1 \cdot t + \pi) + \sin(2s\cdot\omega_1 \cdot t + 2\pi) - \sin(2s\cdot\omega_1 \cdot t + 3\pi)\}$$

$$= \frac{d}{dt} \cdot 4B_1 \cdot \{\sin(2s\cdot\omega_1 \cdot t)\}$$

$$= 8s\cdot\omega_1 \cdot Bm_1 \cdot \{\cos(2s\cdot\omega_1 \cdot t)\}$$ (80)

$$Eb = \frac{d}{dt} \cdot Bm_1 \cdot \left[\sin\left[2\omega_1 \cdot t - 2\left\{(1-s)\cdot\omega_1 \cdot t + \frac{\pi}{3}\right\}\right] - \sin\left[2\omega_1 \cdot t - 2\left\{(1-s)\cdot\omega_1 \cdot t + \frac{5\pi}{6}\right\}\right] + \sin\left[2\omega_1 \cdot t - 2\left\{(1-s)\cdot\omega_1 \cdot t + \frac{4\pi}{3}\right\}\right] -$$ (81)

-continued $$\sin\left[\omega_1 \cdot 2t - 2\left\{(1-s)\cdot\omega_1 \cdot t + \frac{11\pi}{6}\right\}\right]\right]$$

$$= \frac{d}{dt} \cdot Bm_1 \cdot \left[\sin\left\{2\left(s\cdot\omega_1 \cdot t + \frac{\pi}{3}\right)\right\} - \right.$$

$$\sin\left\{2\left(s\cdot\omega_1 \cdot t + \frac{5\pi}{6}\right)\right\} + \sin\left\{2\left(s\cdot\omega_1 \cdot t + \frac{4\pi}{3}\right)\right\} -$$

$$\left.\sin\left\{2\left(s\cdot\omega_1 \cdot t + \frac{11\pi}{6}\right)\right\}\right]$$

$$= \frac{d}{dt} \cdot Bm_1 \cdot \left\{\sin\left(2s\cdot\omega_1 \cdot t + \frac{2\pi}{3}\right) - \sin\left(2s\cdot\omega_1 \cdot t + \frac{5\pi}{3}\right) + \right.$$

$$\left.\sin\left(2s\cdot\omega_1 \cdot t + \frac{8\pi}{3}\right) - \sin\left(2s\cdot\omega_1 \cdot t + \frac{11\pi}{3}\right)\right\}$$

$$= \frac{d}{dt} \cdot 4Bm_1 \cdot \left\{\sin\left(2s\cdot\omega_1 \cdot t + \frac{2\pi}{3}\right)\right\}$$

$$= 8s\cdot\omega_1 \cdot Bm_1 \cdot \left\{\cos\left(2s\cdot\omega_1 \cdot t + \frac{2\pi}{3}\right)\right\}$$

$$Ec = \frac{d}{dt} \cdot Bm_1 \cdot \left[-\sin\left[2\omega_1 \cdot t - 2\left\{(1-s)\cdot\omega_1 \cdot t + \frac{\pi}{6}\right\}\right] + \right. \quad (82)$$

$$\sin\left[2\omega_1 \cdot t - 2\left\{(1-s)\cdot\omega_1 \cdot t + \frac{2\pi}{3}\right\}\right] -$$

$$\sin\left[2\omega_1 \cdot t - 2\left\{(1-s)\cdot\omega_1 \cdot t + \frac{7\pi}{6}\right\}\right] +$$

$$\left.\sin\left[2\omega_1 \cdot t - 2\left\{(1-s)\cdot\omega_1 \cdot t + \frac{5\pi}{3}\right\}\right]\right]$$

$$= \frac{d}{dt} \cdot Bm_1 \cdot \left[-\sin\left\{2\left(s\cdot\omega_1 \cdot t + \frac{\pi}{6}\right)\right\} + \right.$$

$$\sin\left\{2\left(s\cdot\omega_1 \cdot t + \frac{2\pi}{3}\right)\right\} - \sin\left\{2\left(s\cdot\omega_1 \cdot t + \frac{7\pi}{6}\right)\right\} +$$

$$\left.\sin\left\{2\left(s\cdot\omega_1 \cdot t + \frac{5\pi}{3}\right)\right\}\right]$$

$$= \frac{d}{dt} \cdot Bm_1 \cdot \left\{-\sin\left(2s\cdot\omega_1 \cdot t + \frac{\pi}{3}\right) + \sin\left(2s\cdot\omega_1 \cdot t + \frac{4\pi}{3}\right) - \right.$$

$$\left.\sin\left(2s\cdot\omega_1 \cdot t + \frac{7\pi}{3}\right) + \sin\left(2s\cdot\omega_1 \cdot t + \frac{10\pi}{3}\right)\right\}$$

$$= \frac{d}{dt} \cdot 4Bm_1 \cdot \left\{\sin\left(2s\cdot\omega_1 \cdot t + \frac{4\pi}{3}\right)\right\}$$

$$= 8s\cdot\omega_1 \cdot Bm_1 \cdot \left\{\cos\left(2s\cdot\omega_1 \cdot t + \frac{2\pi}{3}\right)\right\}$$

(5-2) Current Flowing into Induction Coils of Outer Rotor

When a load of impedance $Z_1$ acts on the induction coils a, b, c, the currents Ia, Ib, Ic flowing in the induction coils a, b, c of the outer rotor 3 have a predetermined phase difference η. This relation is expressed by the following equations (83), (84), (85).

$$Ia = 8I_1 \cdot s \cdot \omega_1 \cdot \cos(2s\cdot\omega_1 \cdot t + \eta) \quad (83)$$

$$Ib = 8I_1 \cdot s \cdot \omega_1 \cdot \cos\left(2s\cdot\omega_1 \cdot t + \frac{2\pi}{3} + \eta\right) \quad (84)$$

$$Ic = 8I_1 \cdot s \cdot \omega_1 \cdot \cos\left(2s\cdot\omega_1 \cdot t + \frac{4\pi}{3} + \eta\right) \quad (85)$$

where, $I_1$=magnitude of induced current.

A value of the impedance $Z_1$ is determined to have sufficient magnitude such that the amplitude $Bm_1$ of the magnetic flux produced by the outer coils A, B, C of the stator 2 becomes equivalent to the amplitude $I_1$ of the induced current, i.e., $I_1 = Bm_1/|Z_1|$ holds.

(5-3) Magnetic Field Experienced by Induction Coils of Outer Rotor

The magnetic fields Ba(t), Bb(t), Bc(T) experienced by the induction coils a, b, c of the outer rotor 3 may be obtained by substituting $(1-s)\cdot\omega_1\cdot t$, $(1-s)\cdot\omega_1\cdot t - 2\pi/3$, $(1-s)\cdot\omega_1\cdot t - 4\pi/3$ for θ of expression (63).

$$Ba(t) = Bm_1 \cdot \sin\{2\omega_1 \cdot t - 2(1-s)\cdot\omega_1 \cdot t\} \quad (86)$$
$$= B_1 \cdot \sin(2s\cdot\omega_1 \cdot t)$$

$$Bb(t) = Bm_1 \cdot \sin\left[2\omega_1 \cdot t - 2\left\{(1-s)\cdot\omega_1 \cdot t - \frac{2\pi}{3}\right\}\right] \quad (87)$$
$$= B_1 \cdot \sin\left(2s\cdot\omega_1 \cdot t - \frac{4\pi}{3}\right)$$

$$Bc(t) = Bm_1 \cdot \sin\left[2\omega_1 \cdot t - 2\left\{(1-s)\cdot\omega_1 \cdot t - \frac{4\pi}{3}\right\}\right] \quad (88)$$
$$= B_1 \cdot \sin\left(2s\cdot\omega_1 \cdot t - \frac{8\pi}{3}\right)$$

From equations (83), (84), (85) and equations (86), (87), (88), forces fa, fb, fc which the induction coils a, b, c of the outer rotor 3 are subject due to the magnetic field are expressed by the following equation.

$$fa = Ia \cdot Ba$$
$$= 8I_1 \cdot s \cdot \omega_1 \cdot \cos(2s\cdot\omega_1 \cdot t + \eta) \cdot Bm_1 \cdot \sin(2s\cdot\omega_1 \cdot t)$$
$$= 8I_1 \cdot Bm_1 \cdot s \cdot \omega_1 \cdot \cos(2s\cdot\omega_1 \cdot t + \eta) \cdot \sin(2s\cdot\omega_1 \cdot t)$$

$$fb = Ib \cdot Bb$$
$$= 8I_1 \cdot s \cdot \omega_1 \cdot \cos\left(2s\cdot\omega_1 \cdot t + \frac{2\pi}{3} + \eta\right) \cdot Bm_1 \cdot \sin\left(2s\cdot\omega_1 \cdot t - \frac{4\pi}{3}\right)$$
$$= 8I_1 \cdot Bm_1 \cdot s \cdot \omega_1 \cdot \cos\left(2s\cdot\omega_1 \cdot t + \frac{2\pi}{3} + \eta\right) \cdot \sin\left(2s\cdot\omega_1 \cdot t - \frac{4\pi}{3}\right)$$

$$fc = Ic \cdot Bc$$
$$= 8I_1 \cdot s \cdot \omega_1 \cdot \cos\left(2s\cdot\omega_1 \cdot t + \frac{4\pi}{3} + \eta\right) \cdot Bm_1 \cdot \sin\left(2s\cdot\omega_1 \cdot t - \frac{8\pi}{3}\right)$$
$$= 8I_1 \cdot Bm_1 \cdot s \cdot \omega_1 \cdot \cos\left(2s\cdot\omega_1 \cdot t + \frac{4\pi}{3} + \eta\right) \cdot \sin\left(2s\cdot\omega_1 \cdot t - \frac{8\pi}{3}\right)$$

If the above equations are rewritten using the formula $$\cos(a)\cdot\sin(b) = \frac{1}{2}\{\sin(a+b) - \sin(a-b)\},$$

the following equations (89), (90), (91) are obtained.

$$fa = 4I_1 \cdot Bm_1 \cdot s \cdot \omega_1 \cdot \{\sin(2s\cdot\omega_1 \cdot t + \eta + 2s\cdot\omega_1 \cdot t) - \quad (89)$$
$$\sin(2s\cdot\omega_1 \cdot t + \eta - 2s\cdot\omega_1 \cdot t)\}$$
$$= 4I_1 \cdot Bm_1 \cdot s \cdot \omega_1 \cdot \{\sin(4s\cdot\omega_1 \cdot t + \eta) - \sin(\eta)\}$$

$$fb = 4I_1 \cdot Bm_1 \cdot s \cdot \omega_1 \cdot \quad (90)$$
$$\left\{\sin\left(2s\cdot\omega_1 \cdot t + \frac{2\pi}{3} + \eta + 2s\cdot\omega_1 \cdot t - \frac{4\pi}{3}\right) - \right.$$
$$\left.\sin\left(2s\cdot\omega_1 \cdot t + \frac{2\pi}{3} + \eta - 2s\cdot\omega_1 \cdot t + \frac{4\pi}{3}\right)\right\}$$
$$= 4I_1 \cdot Bm_1 \cdot s \cdot \omega_1 \cdot \left\{\sin\left(4s\cdot\omega_1 \cdot t - \frac{2\pi}{3} + \eta\right) - \sin(2\pi + \eta)\right\}$$

$$fc = 4I_1 \cdot Bm_1 \cdot s \cdot \omega_1 \cdot \quad (91)$$
$$\left\{\sin\left(2s\cdot\omega_1 \cdot t + \frac{4\pi}{3} + \eta + 2s\cdot\omega_1 \cdot t - \frac{8\pi}{3}\right) - \right.$$
$$\left.\sin\left(2s\cdot\omega_1 \cdot t + \frac{4\pi}{3} + \eta - 2s\cdot\omega_1 \cdot t + \frac{8\pi}{3}\right)\right\}$$
$$= 4I_1 \cdot Bm_1 \cdot s \cdot \omega_1 \cdot \left\{\sin\left(4s\cdot\omega_1 \cdot t - \frac{4\pi}{3} + \eta\right) - \sin(4\pi + \eta)\right\}$$

(5-4) Drive Force of Outer Rotor

The drive force F of the outer rotor 3 is found by multiplying the sum total of the above forces fa, fb, fc by the number of coils.

$$F = (fa + fb + fc) \cdot 4 \qquad (92)$$

$$= 4 \cdot 4I_1 \cdot Bm_1 \cdot s \cdot \omega_1 \cdot \{\sin(4s \cdot \omega_1 \cdot t + \eta) +$$

$$\sin\left(4s \cdot \omega_1 \cdot t - \frac{2\pi}{3} + \eta\right) + \sin\left(4s \cdot \omega_1 \cdot t - \frac{4\pi}{3} + \eta\right) -$$

$$3\sin(\eta)\}$$

$$= -4 \cdot 8I_1 \cdot B_1 \cdot s \cdot \omega_1 \cdot \sin(\eta)$$

(5-5) Summary

According to equation (92), the drive force of the outer rotor 3 can be controlled by a three-phase alternating current passed through the outer coils A, C, B of the stator 2.

(6) Calculation of Drive Force of Inner Rotor

This analysis is similar to the calculation of drive force of the inner rotor in (5) above.

(6-1) Voltage Induced in Induction Coils of Inner Rotor

When the two induction coils u, two induction coils w and two induction coils v of the inner rotor 4 are respectively connected in series, the voltages Eu, Ev, Ew induced in the induction coils u, v, w are given by the following equations (93), (94), (95).

$$Eu = \frac{d}{dt} \cdot [B_2\{t, (1-\sigma) \cdot \omega_2 \cdot t + \alpha\} - B_2\{t, (1-\sigma) \cdot \omega_2 \cdot t + \pi + \alpha\}] \qquad (93)$$

$$Ev = \frac{d}{dt} \cdot \left[B_2\left\{t, (1-\sigma) \cdot \omega_2 \cdot t + \frac{2\pi}{3} + \alpha\right\} - B_2\left\{t, (1-\sigma) \cdot \omega_2 \cdot t + \frac{5\pi}{3} + \alpha\right\}\right] \qquad (94)$$

$$Ew = \frac{d}{dt} \cdot \left[-B_2\left\{t, (1-\sigma) \cdot \omega_2 \cdot t + \frac{\pi}{3} + \alpha\right\} + B_2\left\{t, (1-\sigma) \cdot \omega_2 \cdot t + \frac{4\pi}{3} + \alpha\right\}\right] \qquad (95)$$

Substituting equation (62) in equations (93), (94), (95), the following equations (96), (97), (98) are obtained.

$$Eu = \frac{d}{dt} \cdot Bm_2 \cdot [\sin\{\omega_2 \cdot t - (1-\sigma) \cdot \omega_2 \cdot t - \alpha\} - \sin\{\omega_2 \cdot t - (1-\sigma) \cdot \omega_2 \cdot t - \pi - \alpha\}] \qquad (96)$$

$$= \frac{d}{dt} \cdot 2Bm_2 \cdot \sin(\sigma \cdot \omega_2 \cdot t - \alpha)$$

$$= 2Bm_2 \cdot \sigma \cdot \omega_2 \cdot \cos(\sigma \cdot \omega_2 \cdot t - \alpha)$$

$$Ev = \frac{d}{dt} \cdot Bm_2 \cdot \left[\sin\left\{\omega_2 \cdot t - (1-\sigma) \cdot \omega_2 \cdot t - \frac{2\pi}{3} - \alpha\right\} - \sin\left\{\omega_2 \cdot t - (1-\sigma) \cdot \omega_2 \cdot t - \frac{5\pi}{3} - \alpha\right\}\right] \qquad (97)$$

$$= \frac{d}{dt} \cdot 2Bm_2 \cdot \sin\left(\sigma \cdot \omega_2 \cdot t - \frac{2\pi}{3} - \alpha\right)$$

$$= 2Bm_2 \cdot \sigma \cdot \omega_2 \cdot \cos\left(\sigma \cdot \omega_2 \cdot t - \frac{2\pi}{3} - \alpha\right)$$

$$Ew = \frac{d}{dt} \cdot Bm_2 \cdot \left[\sin\left\{\omega_2 \cdot t - (1-\sigma) \cdot \omega_2 \cdot t - \frac{\pi}{3} - \alpha\right\} - \sin\left\{\omega_2 \cdot t - (1-\sigma) \cdot \omega_2 \cdot t - \frac{4\pi}{3} - \alpha\right\}\right] \qquad (98)$$

$$= \frac{d}{dt} \cdot 2Bm_2 \cdot \sin\left(\sigma \cdot \omega_2 \cdot t + \frac{4\pi}{3} - \alpha\right)$$

$$= 2Bm_2 \cdot \sigma \cdot \omega_2 \cdot \cos\left(\sigma \cdot \omega_2 \cdot t - \frac{4\pi}{3} - \alpha\right)$$

(6-2) Current Flowing in Induction Coils of Inner Rotor

When a load of impedance $Z_2$ acts on the induction coils u, v, w, the currents Iu, Iv, Iw flowing in the induction coils u, v, w of the inner rotor 4 have a predetermined phase difference γ. This relation is expressed by the following equations (99), 100), (101).

$$Iu = 2I_2 \cdot \sigma \cdot \omega_2 \cdot \cos(\sigma \cdot \omega_2 \cdot t - \alpha + \gamma) \qquad (99)$$

$$Iv = 2I_2 \cdot \sigma \cdot \omega_2 \cdot \cos\left(\sigma \cdot \omega_2 \cdot t - \frac{2\pi}{3} - \alpha + \gamma\right) \qquad (100)$$

$$Iw = 2I_2 \cdot \sigma \cdot \omega_2 \cdot \cos\left(\sigma \cdot \omega_2 \cdot t - \frac{4\pi}{3} - \alpha + \gamma\right) \qquad (101)$$

where, $I_2$=magnitude of induced current.

A value of the impedance $Z_2$ is determined to have sufficient magnitude such that the amplitude $Bm_2$ of the magnetic flux produced by the inner coils U, V, W of the stator 2 becomes equivalent to the amplitude $I_2$ of the induced current.

(6-3) Magnetic Field Experienced by Induction Coils of Inner Rotor

The magnetic fields Bu(t), Bv(t), Bw(t) experienced by the induction coils u, v, w of the inner rotor 4 may be obtained by substituting $(1-\sigma)\cdot\omega_2\cdot t-\alpha$, $(1-\sigma)\cdot\omega_2\cdot t-\alpha-2\pi/3$bk, $(1-\sigma)\cdot\omega_2\cdot t-\alpha-4\pi/3$ for θ of equation (62).

$$Bu(t) = Bm_2 \cdot \sin\{\omega_2 \cdot t - (1-\sigma) \cdot \omega_2 \cdot t - \alpha\} \qquad (102)$$

$$= Bm_2 \cdot \sin(\sigma \cdot \omega_2 \cdot t - \alpha)$$

$$Bv(t) = Bm_2 \cdot \sin\left\{\omega_2 \cdot t - (1-\sigma) \cdot \omega_2 \cdot t - \alpha - \frac{2\pi}{3}\right\} \qquad (103)$$

$$= Bm_2 \cdot \sin\left(\sigma \cdot \omega_2 \cdot t - \alpha - \frac{2\pi}{3}\right)$$

$$Bw(t) = Bm_2 \cdot \sin\left\{\omega_2 \cdot t - (1-\sigma) \cdot \omega_2 \cdot t - \alpha - \frac{4\pi}{3}\right\} \qquad (104)$$

$$= Bm_2 \cdot \sin\left(\sigma \cdot \omega_2 \cdot t - \alpha - \frac{4\pi}{3}\right)$$

From equations (99), (100), (101) and equations (102), (103), (104), forces fu, fv, fw which the magnetic field exerts on the current flowing through the induction coils of the inner rotor 4 may be expressed as follows.

$$fu = Iu \cdot Bu = 2I_2 \cdot \sigma \cdot \omega_2 \cdot \cos(\sigma \cdot \omega_2 \cdot t - \alpha + \eta) \cdot Bm_2 \cdot$$

$$\sin(\sigma \cdot \omega_2 \cdot t - \alpha)$$

$$= 2I_2 \cdot Bm_2 \cdot \sigma \cdot \omega_2 \cdot \cos(\sigma \cdot \omega_2 \cdot t - \alpha + \eta) \cdot \sin(\sigma \cdot \omega_2 \cdot t - \alpha)$$

$$fv = Iv \cdot Bv = 2I_2 \cdot \sigma \cdot \omega_2 \cdot \cos\left(\sigma \cdot \omega_2 \cdot t - \alpha + \eta - \frac{2\pi}{3}\right) \cdot Bm_2 \cdot$$

$$\sin\left(\sigma \cdot \omega_2 \cdot t - \alpha - \frac{2\pi}{3}\right)$$

-continued $$= 2I_2 \cdot Bm_2 \cdot \sigma \cdot \omega_2 \cdot \cos\left(\sigma \cdot \omega_2 \cdot t - \alpha + \eta - \frac{2\pi}{3}\right) \cdot$$

$$\sin\left(\sigma \cdot \omega_2 \cdot t - \alpha - \frac{2\pi}{3}\right)$$

$$fw = Iw \cdot Bw = 2I_2 \cdot \sigma \cdot \omega_2 \cdot \cos\left(\sigma \cdot \omega_2 \cdot t - \alpha + \eta - \frac{4\pi}{3}\right) \cdot Bm_2 \cdot$$

$$\sin\left(\sigma \cdot \omega_2 \cdot t - \alpha - \frac{4\pi}{3}\right)$$

$$= 2I_2 \cdot Bm_2 \cdot \sigma \cdot \omega_2 \cdot \cos\left(\sigma \cdot \omega_2 \cdot t - \alpha + \eta - \frac{4\pi}{3}\right) \cdot$$

$$\sin\left(\sigma \cdot \omega_2 \cdot t - \alpha - \frac{4\pi}{3}\right)$$

Rewriting the above equations using the formula $\cos(a)\cdot\sin(b) = \frac{1}{2}\cdot\{\sin(a+b) - \sin(a-b)\}$, the following equations (105), (106), (107) are obtained.

$$fu = 2I_2 \cdot Bm_2 \cdot \sigma \cdot \omega_2 \cdot \frac{1}{2} \cdot \quad (105)$$

$$\{\sin(\sigma \cdot \omega_2 \cdot t - \alpha + \eta + \sigma \cdot \omega_2 \cdot t - \alpha) -$$
$$\sin(\sigma \cdot \omega_2 \cdot t - \alpha + \eta - \sigma \cdot \omega_2 \cdot t + \alpha)\}$$
$$= I_2 \cdot Bm_2 \cdot \sigma \cdot \omega_2 \cdot \{\sin(2\sigma \cdot \omega_2 \cdot t + \eta - 2\alpha) - \sin\gamma\}$$

$$fv = 2I_2 \cdot Bm_2 \cdot \sigma \cdot \omega_2 \cdot \frac{1}{2} \cdot \left\{\sin\left(\sigma \cdot \omega_2 \cdot t - \alpha + \eta - \frac{2\pi}{3} + \sigma \cdot \right. \right. \quad (106)$$

$$\left. \omega_2 \cdot t - \alpha - \frac{2\pi}{3}\right) - \sin\left(\sigma \cdot \omega_2 \cdot t - \alpha + \eta - \frac{2\pi}{3} - \sigma \cdot \omega_2 \cdot \right.$$

$$\left. \left. t + \alpha + \frac{2\pi}{3}\right)\right\}$$

$$= I_2 \cdot Bm_2 \cdot \sigma \cdot \omega_2 \cdot$$

$$\left\{\sin\left(2\sigma \cdot \omega_2 \cdot t + \eta - 2\alpha - \frac{4\pi}{3}\right) - \sin\gamma\right\}$$

$$fw = 2I_2 \cdot Bm_2 \cdot \sigma \cdot \omega_2 \cdot \frac{1}{2} \cdot \left\{\sin\left(\sigma \cdot \omega_2 \cdot t - \alpha + \eta - \frac{4\pi}{3} + \sigma \cdot \right. \right. \quad (107)$$

$$\left. \omega_2 \cdot t - \alpha - \frac{4\pi}{3}\right) - \sin\left(\sigma \cdot \omega_2 \cdot t - \alpha + \eta - \frac{4\pi}{3} - \sigma \cdot \omega_2 \cdot \right.$$

$$\left. \left. t + \alpha + \frac{4\pi}{3}\right)\right\}$$

$$= I_2 \cdot Bm_2 \cdot \sigma \cdot \omega_2 \cdot$$

$$\left\{\sin\left(2\sigma \cdot \omega_2 \cdot t + \eta - 2\alpha - \frac{8\pi}{3}\right) - \sin\gamma\right\}$$

(6-4) Drive Force of Inner Rotor

The drive force F of the inner rotor 4 is found by multiplying the sum total of the above forces fu, fv, fw by the number of coils.

$$F = 2(fu + fv + fw)$$

$$= 2 \cdot I_2 \cdot Bm_2 \cdot \sigma \cdot \omega_2 \cdot \left\{\sin(2\sigma \cdot \omega_2 \cdot t + \eta - 2\alpha) + \right.$$

$$\sin\left(2\sigma \cdot \omega_2 \cdot t + \eta - 2\alpha - \frac{4\pi}{3}\right) +$$

$$\left. \sin\left(2\sigma \cdot \omega_2 \cdot t + \eta - 2\alpha - \frac{2\pi}{3}\right) - 3\sin\gamma\right\}$$

$$= -6I_2 \cdot Bm_2 \cdot \sigma \cdot \omega_2 \cdot \sin\gamma$$

(6-5) Summary

The three-phase alternating current passed through the outer coils A, C, B of the stator 2 acts only on the induction coils a, b, c of the outer rotor 3.

Therefore, a phase difference η occurs between A-a, B-b, C-c according to the impedance $Z_2$ as in an ordinary induction motor, and consequently, a drive force acts on the outer rotor 3.

Similarly, a three-phase alternating current passing through the inner coils U, V, W of the stator 2 acts only on the induction coils u, v, w of the inner rotor 4.

Therefore, a phase difference γ is generated between U-u, V-v, W-w according to the impedance $Z_2$, and consequently a drive force acts on the inner rotor 4.

This fact shows that also in the case where the magnetic pole number ratio is 2:1, the two rotors 3, 4 can be driven as a generator/motor using one series of coils 6.

As described in the embodiments of a motor/generator using permanent magnets, the situation where the currents for driving one rotor do not affect the rotation of the other rotor is not limited to the case where the magnetic pole number ratio of the two rotors is 2:1, but is also a common feature when the magnetic pole number ratio is an even number versus odd number.

Also, when the magnetic pole number ratio is an even number versus odd number, and in particular when the even number is 2 and the odd number is 1, the number of rotor coils can be minimized.

For example, as two coils are necessary for a pole number of 2, and three times that number of coils is required to pass a three-phase alternating current, the total number of inner rotor coils is 2×3=6. Similarly, the total number of outer rotor coils is 12.

For cases except when the pole number ratio is 2:1, however, the minimum number of total coils for both rotors exceeds 12.

As was described in the embodiments of a motor/generator using permanent magnets, the magnetic pole number ratio may be an even number versus even number or odd number versus odd number.

In this case, the drive currents for one rotor causes a fluctuation in the rotation torque of the other rotor, but this fluctuation may be eliminated by a method such as the aforesaid amplitude modulation.

The contents of Tokugan Hei 10-77449, Tokugan Hei 10-77478, Tokugan Hei 10-77508 with a filing date of Mar. 25, 1998 in Japan, and Tokugan Hei 10-162380 with a filing date of Jun. 10, 1998 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in this embodiment both rotors were provided with induction coils, and in the first-thirteenth embodiments both rotors were provided with permanent magnets, however the magnetic poles of one rotor may comprise induction coils and the magnetic poles of the other rotor may comprise permanent magnets.

The embodiments of this invention in which an exclusive property or privilege is claimed are defined as follows:

What is claimed is:

1. A motor/generator comprising:
   a first rotor comprising plural magnetic poles and supported free to rotate,
   a second rotor comprising plural magnetic poles and supported free to rotate coaxially with said first rotor,
   a stator fixed co-axially with said first rotor,
   a coil unit comprising plural coils disposed at equal angular intervals on said stator, wherein said coil unit forms rotating magnetic fields of equal number to the number of magnetic poles of said first rotor according to a first alternating current provided thereto, and forms rotating magnetic fields of equal number to the number of magnetic poles of said second rotor according to a second alternating current provided thereto, and a controller functioning to supply a composite electrical current comprising said first alternating current and said second alternating current to said coil unit.

2. A motor/generator as defined in claim 1, wherein said controller comprises a sensor for detecting a rotation phase of said first rotor, and a sensor for detecting a rotation phase of said second rotor, and said controller further functions to control said composite electrical current based on the rotation phases of said first rotor and said second rotor.

3. A motor/generator as defined in claim 2, wherein said controller further comprises an inverter for supplying said composite electrical current to said coil unit.

4. A motor/generator as defined in claim 1, wherein either one of the magnetic poles of said first rotor and the magnetic poles of said second rotor is provided in the form of a permanent magnet.

5. A motor/generator as defined in claim 1, wherein the magnetic poles of said first rotor and said second rotor are both provided in the form of permanent magnets.

6. A motor/generator as defined in claim 1, wherein said first rotor, said second rotor and said stator are respectively formed in a cylindrical shape, said first rotor is arranged outside said stator, and said second rotor is arranged inside said stator.

7. A motor/generator as defined in claim 1, wherein said stator is arranged outside said first rotor and said second rotor.

8. A motor/generator as defined in claim 1, wherein said stator is arranged inside said first rotor and said second rotor.

9. A motor/generator as defined in claim 1, wherein the number of magnetic poles of said first rotor is set to an even number and the number of magnetic poles of said second rotor is set to an odd number.

10. A motor/generator as defined in claim 9, wherein the drive current for said second rotor is an alternating current having phases corresponding to six times an odd number.

11. A motor/generator as defined in claim 1, wherein either one of the magnetic poles of said first rotor and the magnetic poles of said second rotor is provided in the form of an induction coil.

12. A motor/generator as defined in claim 1, wherein the magnetic poles of said first rotor and said second rotor are both provided in the form of induction coils.

* * * * *